US009309332B2

(12) United States Patent
Chen et al.

(10) Patent No.: US 9,309,332 B2
(45) Date of Patent: Apr. 12, 2016

(54) POLYMERIZATION CATALYSTS, METHODS AND PRODUCTS

(71) Applicant: Colorado State University Research Foundation, Fort Collins, CO (US)

(72) Inventors: Eugene Y. Chen, Fort Collins, CO (US); Yangjian Hu, Fort Collins, CO (US); Yuetao Zhang, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 172 days.

(21) Appl. No.: 14/010,235

(22) Filed: Aug. 26, 2013

(65) Prior Publication Data

US 2014/0058041 A1 Feb. 27, 2014

Related U.S. Application Data

(60) Provisional application No. 61/693,021, filed on Aug. 24, 2012, provisional application No. 61/726,946, filed on Nov. 15, 2012.

(51) Int. Cl.
| | | |
|---|---|---|
| C08F 4/44 | (2006.01) | |
| C08F 4/78 | (2006.01) | |
| C08F 4/76 | (2006.01) | |
| C08F 24/00 | (2006.01) | |
| C08F 124/00 | (2006.01) | |
| C08F 4/6592 | (2006.01) | |

(52) U.S. Cl.
CPC .............. *C08F 4/44* (2013.01); *C08F 4/65927* (2013.01); *C08F 4/76* (2013.01); *C08F 24/00* (2013.01); *C08F 124/00* (2013.01)

(58) Field of Classification Search
CPC .......... C08F 124/00; C08F 24/00; C08F 4/44; C08F 4/65927; C08F 4/76
USPC .......................... 526/270, 206, 126, 134, 204
See application file for complete search history.

(56) References Cited

U.S. PATENT DOCUMENTS

| 6,992,141 B2 | 1/2006 | Brandenburg et al. |
| 7,465,498 B2 | 12/2008 | Pickett et al. |
| 7,512,309 B2 | 3/2009 | Aoyagi et al. |
| 2004/0230019 A1 | 11/2004 | Brandenburg |
| 2012/0142905 A1 | 6/2012 | Thuilliez et al. |

OTHER PUBLICATIONS

Zhang et al. (Alane-Based Classical and Frustrated Lewis Pairs in Polymer Synthesis: Rapid Polymerization of MMA and Naturally Renewable Methylene Butyrolactones into High-Molecular-Weight Polymers, Angew. Chem. Int. Ed. 2010, 49, 10158-10162).*
Miyake et al. (Coordination polymerization of renewable butyrolactone-based vinyl monomers by lanthanide and early metal catalysts, Dalton Trans., 2010, 39, 6710-6718).*
Pittman et al. (Radical-initiated polymerization of β-methyl-α-methylene-γ-butyrolactone, Journal of Polymer Science: Part A: Polymer Chemistry, vol. 41, 1759-1777 (2003)).*
Caporaso et al. (Stereospecificity in Metallocene Catalyzed Acrylate Polymerizations : The Chiral Orientation of the Growing Chain Selects its Own Chain End Enantioface, J. Am. Chem. Soc. 2006, 128, 16649-16654).*
Chen, "Coordination Polymerization of Polar Vinyl Monomers by Single-Site Metal Catalysts," Chemical Reviews (Sep. 9, 2009) 109 (11): 5157-5214.
Chen et al., "Stereoselectivity in Metallocene-Catalyzed Coordination Polymerization of Renewable Methylene Butyrolactones: From Stereo-random to Stereo-perfect Polymers," J. Am. Chem. Soc. (2012) 134: 7278-7281.
Cockburn et al., "An Investigation of Free Radical Copolymerization Kinetics of the Bio-renewable Monomer γ-Methyl-α-methylene-γ-butyrolactone with Methyl methacrylate and Styrene," Macromolecular Chemistry and Physics (Feb. 18, 2010) 211: 501-509.
Hu et al., "Ansa-Rare-Earth-Metal Catalysts for Rapid and Stereoselective Polymerization of Renewable Methylene Methylbutyrolactones," Chem. Eur. J. (Feb. 1, 2012) 18: 3345-3354.
Hu et al., "Polymerization of Naturally Renewable Methylene Butyrolactones by Half-Sandwich Indenyl Rare Earth Metal Dialkyls with Exceptional Activity," Macromolecules (Oct. 22, 2010) 43 (22): 9328-9336.
Miyake et al., "Coordination polymerization of renewable butyrolactone-based vinyl monomers by lanthanide and early metal catalysts," Dalton Transactions Issue 29 (Mar. 25, 2010) 39: 6710-6718.
Miyake et al., "Living Polymerization of Naturally Renewable Butyrolactone-Based Vinylidene Monomers by Ambiphilic Silicon Propagators," Macromolecules (May 12, 2010) 43 (11): 4902-4908.
Mosn•ček et al., "Atom Transfer Radical Polymerization of Tulipalin A: A Naturally Renewable Monomer," Macromolecules; Communications to the Editor (Aug. 12, 2008) vol. 41 (15): 5509-5511.
Pittman et al., "Radical-Initiated Polymerization of β-Methyl-α-methylene-γ-butyrolactone," Journal of Polymer Science: Part A: Polymer Chemistry (2003) vol. 41: 1759-1777.
Suenaga et al., "Polymerization of (RS)-and (R)-α-Methylene-γ-methyl-γ-butyrolactone," Macromolecules (1984) 17 (12): 2913-2916.
Zhang et al., "Conjugate-Addition Organopolymerization: Rapid Production of Acrylic Bioplastics by N-Heterocyclic Carbenes," Angew. Chem. Int. Ed. (Jan. 23, 2012) 51: 2465-2469.
Zhang et al., "Dinuclear Silylium-enolate Bifunctional Active Species: Remarkable Activity and Stereoselectivity toward Polymerization of Methacrylate and Renewable Methylene Butyrolactone Monomers," J. Am. Chem. Soc. (Aug. 5, 2011) 133: 13674-13684.

\* cited by examiner

*Primary Examiner* — Bijan Ahvazi
*Assistant Examiner* — Chun-Cheng Wang
(74) *Attorney, Agent, or Firm* — Haukaas Fortius PLLC; Michael Haukaas

(57) ABSTRACT

The invention provides novel polymer compositions and methods for preparing such compositions. The invention also provides methods for polymerizing various unsaturated monomers, including naturally occurring or plant biomass-derived renewable acrylic monomers. The monomers can be rapidly polymerized using various organic catalysts or organometallic catalysts, as described herein. In one embodiment, nearly perfectly isotactic polymers (mmmm>99%) can be prepared using a $C_2$-symmetric zirconocenium catalyst.

21 Claims, 14 Drawing Sheets

A)

B)

C)

POLYMERIZATION CATALYSTS, METHODS AND PRODUCTS

RELATED APPLICATIONS

This application claims priority under 35 U.S.C. §119(e) to U.S. Provisional Patent Application Nos. 61/693,021, filed Aug. 24, 2012, and 61/726,946, filed Nov. 15, 2012, which applications are incorporated herein by reference.

GOVERNMENT SUPPORT

This invention was made with government support under Grant Nos. CHE1012326 and CHE0848845 awarded by the National Science Foundation. The government has certain rights in the invention.

BACKGROUND OF THE INVENTION

Organocatalysis by N-heterocyclic carbenes (NHCs) has attracted growing interest due to its unique reactivity and selectivity observed in many different types of organic reactions. The utility of the NHC-mediated reactions has also been expanded to polymer synthesis, via predominantly the ring-opening polymerization (ROP) of cyclic monomers, such as cyclic esters, epoxides, cyclic siloxanes, and N-carboxyl-anhydrides. NHC-catalyzed step-growth polymerization has been reported as well. Polymerization of α,β-unsaturated esters (acrylics) such as methyl methacrylate (MMA) has also been recently realized through the classic group-transfer polymerization (GTP) initiated by silyl ketene acetals, using NHCs as alternative nucleophilic catalysts to activate the acetal initiator.

In addition, acrylic monomers can be rapidly polymerized by frustrated Lewis pairs (FLPs) consisting of bulky NHC bases, such as the Arduengo carbenes 1,3-di-tert-butylimidazolin-2-ylidene (I$^t$Bu) and 1,3-di-mesityl-butyl-imidazolin-2-ylidene (IMes), and the strongly acidic, sterically encumbered perfluoroaryl alane, via the proposed zwitterionic imidazolium enolaluminate intermediates. Using such Arduengo NHCs alone, no MMA conversion was observed in either toluene or THF. On the other hand, the Enders triazolylidene carbene TPT (1,3,4-triphenyl-4,5-dihydro-1H-1,2,4-triazol-5-ylidene), which is estimated to be $10^3$ times less nucleophilic than the imidazolylidene carbene (IMes), catalyzes tail-to-tail dimerization (umpolung) of MMA and other methacrylate substrates, while the common imidazolylidene carbenes are ineffective.

Although the NHC-mediated ROP of cyclic monomers has been highly successful, the NHC-mediated conjugate-addition polymerization of functionalized alkenes such as acrylics still requires the use of a nucleophilic initiator in the case of GTP or a Lewis acid catalyst in the case of the FLP polymerization. Efficient conjugate-addition polymerization of such monomers directly by NHCs (i.e., in the absence of any other initiator or catalyst components) had not been previously achieved, to the best of the inventors' knowledge. Thus, new methodologies are needed for efficient direct NHC conjugate-addition polymerization of acrylic monomers to provide improved methods to prepare polymers and new materials.

Additionally, rare-earth metal (REM) complexes have been utilized to catalyze various types of small molecular transformations. In polymerization catalysis, neutral REM complexes and their isoelectronic, cationic group IV metal complexes are the two best-known classes of highly active and efficient catalysts for the coordination-addition polymerization of polar conjugated olefins such as MMA, acrylates, and acrylamides. Comparatively speaking, group IV metallocenium catalysts have an advantage of achieving high activity and precise control over stereochemistry of polymerization for some substrates, while REM catalysts typically require no co-catalysts and are more effective for acrylate polymerization and more tolerant towards polar donor media. While new methods are needed to provide effective polymerization of biomass-derived, oxygenated polar feedstocks, the reactivities of which resemble acrylates more than methacrylates, and polar donor solvents (e.g., DMF) are needed for polymerization due to solubility constraints of the resulting polymers, few effective polymerizations of such biomass-derivived feedstocks are currently available.

Furthermore, sustainability is an emerging issue of global importance, while stereoselectivity is a perpetual fundamental objective in chemical synthesis. Synthetic polymers, predominantly petroleum-based at present, are essential to modern life and the global economy; as petroleum resources continue to be depleted, an imminent challenge exists to gradually replace petroleum-based synthetic polymers with those derived from renewable resources in a technologically and economically competitive fashion. An important approach to advanced synthetic polymers is to control stereoselectivity of polymerization, which can provide stereoregular polymers that often exhibit superior physical and mechanical properties to the stereorandom counterparts (for a recent review, see Miyake and Chen, *Polym. Chem.,* 2011, 2, 2462-2480). Thus, new stereoselective polymerization methods are needed.

SUMMARY

The invention provides a highly isotactic polymer of Formula (I):

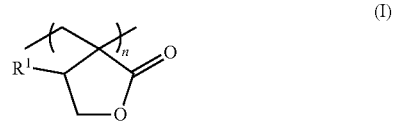

wherein n is about 10 to about 45,000; and $R^1$ is $(C_1-C_6)$alkyl, aryl, or benzyl; and each of the carbons having substituent $R^1$ has an (R) stereochemical configuration, or each of the carbons having substituent $R^1$ has an (S) stereochemical configuration; wherein the polymer of Formula (I) comprises at least 80% isotactic triads with respect to the quaternary carbons of the polymer chain.

In some embodiments, n is about 20 to about 10,000, about 40 to about 5,000, about 40 to about 1,000, or about 80 to about 900.

In some embodiments, $R^1$ is methyl, ethyl, propyl, butyl, phenyl, or benzyl, where any of the $R^1$ groups can be substituted with one or more substituents, as described below.

In some embodiments, the polymer has at least 85% isotactic triads, at least 90% isotactic triads, at least 95% isotactic triads, at least 98% isotactic triads, at least 99% isotactic triads, or at least 99.9% isotactic triads, with respect to the quaternary carbons of the polymer chain. In certain embodiments, the polymer comprises at least 95%, at least 98%, or at least 99%, isotactic pentads with respect to the quaternary carbons of the polymer chain.

The polymer can be highly scratch resistant and/or solvent resistant. In some embodiments, the polymer is insoluble in water, methanol, toluene, methylene chloride, 1,2-dichlorobenzene, acetonitrile, THF, DMSO, and/or DMF, for example, at room temperature (~21-25° C.). In various embodiments, the polymer is insoluble in 1,2-dichlorobenzene at 180° C., THF at 60° C., DMSO at 100° C., and/or DMF at 100° C.

In some embodiments, the polymer has a glass transition temperature ($T_g$) of at least about 250° C. In other embodiments, the polymer has a $T_g$ of at least about 280° C., at least about 290° C. or at least about 295° C.

The invention also provides a composition comprising one or more of the polymers described herein, such as the polymers described above. Thus, the invention also provides a composition comprising highly isotactic polymers of Formula (I):

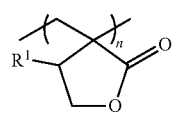
(I)

wherein n is about 10 to about 45,000; and $R^1$ is ($C_1$-$C_6$)alkyl, aryl, or benzyl; and the composition comprises both isotactic (R) and isotactic (S) polymers of Formula (I) (with respect to the carbon comprising $R^1$), wherein the polymers of Formula (I) comprise at least 90% isotactic triads with respect to the quaternary carbons of the polymer chain. In some embodiments, the polymers of the composition comprise at least 99% isotactic pentads with respect to the quaternary carbons of the polymer chains.

The invention also provides a method for preparing a polymer of Formula (II):

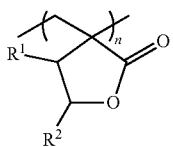
(II)

wherein
n is about 10 to about 45,000; $R^1$ is H, ($C_1$-$C_6$)alkyl, phenyl, or benzyl; $R^2$ is H, ($C_1$-$C_6$)alkyl, phenyl, or benzyl; and one or both of $R^1$ and $R^2$ is H;
the method comprising polymerizing a monomer of Formula (III):

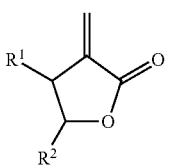
(III)

wherein $R^1$ is H, ($C_1$-$C_6$)alkyl, phenyl, or benzyl; $R^2$ is H, ($C_1$-$C_6$)alkyl, phenyl, or benzyl;
in the presence of an effective amount of a catalyst, wherein the catalyst is: (a) an N-heterocyclic carbene described herein, such as a catalyst illustrated in FIG. 1A; (b) a rare earth metal catalyst described herein, such as a catalyst illustrated in FIG. 1B; or (c) a zirconocenium catalyst described herein such as a catalyst illustrated in FIG. 1C;

wherein polymer of Formula (II) is formed by coordination polymerization with catalysts (b) and (c) or by conjugate-addition polymerization with catalyst (a), and the glass transition temperature ($T_g$) of the product polymer is greater than about 190° C. In some embodiments, one or both of $R^1$ and $R^2$ is H. The polymers formed by these methods can also have the properties of the polymers discussed above.

In some embodiments, the polymer prepared can be atactic, or isotactic biased. In other embodiments, the polymer can be highly isotactic, as described herein.

In one embodiment, the catalyst is a $C_2$-symmetric zirconocenium catalyst. In various embodiments, the monomer of Formula (II) can be β-methyl-α-methylene-γ-butyrolactone ($_\beta$MMBL), and the polymer of Formula (I) can be highly isotactic at the main chain quaternary carbons, comprising at least 90% isotactic triads, or higher tacticity, as described above.

In one embodiment, the $C_2$-symmetric zirconocenium catalyst is (1) or (2):

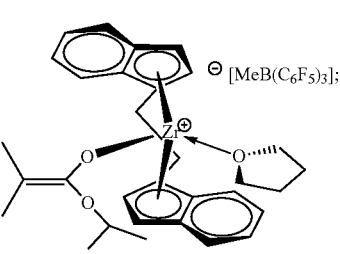
(1)

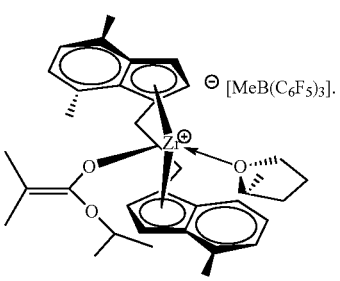
(2)

In one embodiment, the $C_2$-symmetric zirconocenium catalyst is (1) and the polymer of Formula (I) comprises at least 99% isotactic pentads. In some embodiments, the polymer of Formula (I) is insoluble in water, methanol, toluene, methylene chloride, 1,2-dichlorobenzene, acetonitrile, THF, DMSO, and DMF at room temperature, and/or insoluble in 1,2-dichlorobenzene at 180° C., THF at 60° C., DMSO at 100° C., and DMF at 100° C.

In one embodiment, the catalyst is an N-heterocyclic carbene, wherein the N-heterocyclic carbene is a 1,3-di-tert-butylimidazol-2-ylidene (I$^t$Bu) catalyst or a 1,3-bis(2,4,6-trimethyl-phenyl)imidazol-2-ylidene (IMes) catalyst. In various embodiments, the polymerization can be carried out without the aid of initiating or catalyzing components other than the N-heterocyclic carbene catalyst. In some embodiments, the polymerization includes up to 3000 equivalents of monomer per I$^t$Bu, and greater than 99% of the monomers are converted to the product polymer in less than about one minute from contacting the monomer with the catalyst. In another embodiment, the polymerization includes up to 10,000 equivalents of monomer per I$^t$Bu, and greater than 99% of the monomers are converted to the product polymer in less than about five minutes from contacting the monomer with the catalyst.

In various embodiments, the monomer of Formula (III) can be, for example, α-methylene-γ-butyrolactone (MBL), γ-methyl-α-methylene-γ-butyrolactone (γMMBL), or β-methyl-α-methylene-γ-butyrolactone (βMMBL), or one of a variety of substituted α-methylene-γ-butyrolactones (MBLs).

The methods can provide polymers of a variety of molecular weights, as described herein. In one embodiment, the polymer product has a molecular weight polymer of at least 10 kDa. In some embodiments, the polymer product has a molecular weight polymer of up to about 5,000 kDa. The polymerization can be carried out in any suitable and effective organic solvent as described herein. In some embodiments, the polymerizing is carried out in a polar organic solvent system (e.g., a polar organic solvent or a combination of organic solvents comprising at least one polar organic solvent).

Various amounts of catalyst can be used in the methods described herein. A suitable and effective amount of a catalyst is an amount that is effective to provide polymer products, for example, a polymer of Formula (I) or (II). The catalyst loading can be, for example, about 0.001 mol %, about 0.01 mol %, about 0.03 mol %, about 0.1 mol %, about 0.5 mol %, about 1 mol %, about 2 mol %, about 5 mol %, or about 10 mol %, or another value as described herein, or a range from any one to another of any of the aforementioned values, with respect to the amount of monomer used a reaction.

The methods can provide a polymer product having a low polydispersity index (PDI; $M_w/M_n$). The PDI can be determined by various methods, such as by GPC in DMF relative to PMMA standards. The PDI of the polymer compositions prepared by the methods described herein can be less than about 2.5, less than about 2.2, less than about 2, less than about 1.9, less than about 1.8, less than about 1.7, less than about 1.6, less than about 1.5, less than about 1.4, or less than about 1.2.

The polymers formed by these methods can also have various properties of the polymers discussed above.

In one specific embodiment, the invention provides a method for preparing a polymer of Formula (I):

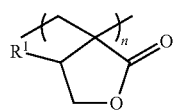

(I)

wherein n is about 10 to about 45,000; and $R^1$ is $(C_1-C_6)$alkyl, aryl, or benzyl; and the polymer of Formula (I) is highly isotactic at the quaternary carbon of the polymer main chain, comprising at least 90% isotactic triads; the method comprising polymerizing β-methyl-α-methylene-γ-butyrolactone (βMMBL) by coordination polymerization by contacting the βMMBL and a $C_2$-symmetric zirconocenium catalyst in an organic solvent system under an inert atmosphere.

The invention further provides a method of polymerizing an optionally substituted α-methylene-γ-butyrolactone, the method comprising contacting an optionally substituted α-methylene-γ-butyrolactone monomer that includes an exocyclic methylene, and an N-heterocyclic carbene catalyst. The N-heterocyclic carbene catalyst can be, for example, a 1,3-di-tert-butylimidazol-2-ylidene ($I^tBu$) catalyst or a 1,3-bis(2,4,6-trimethyl-phenyl)imidazol-2-ylidene (IMes) catalyst. The reaction can be carried out in a suitable and effective solvent to provide the corresponding polymer product (e.g., a poly(α-methylene-γ-butyrolactone), optionally substituted at the butyrolactone 3-position (β) or 4-position (γ)).

The invention yet further provides a method to polymerize β-methyl-α-methylene-γ-butyrolactone (βMMBL) comprising contacting βMMBL and a catalytic amount of a complex of Formula (B):

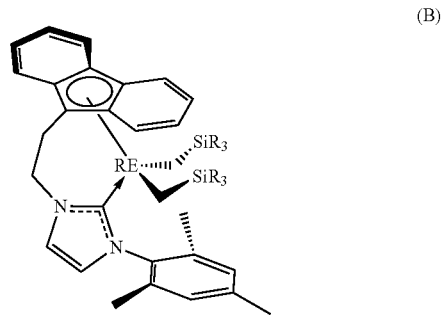

(B)

wherein RE is Y or Lu; and each R is independently alkyl or aryl; to provide poly(β-methyl-α-methylene-γ-butyrolactone) ($P_\beta$MMBL), wherein the $P_\beta$MMBL is highly isotactic at the quaternary carbon, comprising at least 90% isotactic triads.

Representative catalysts for polymerizing monomers that can be derived from biomass include the catalysts illustrated in FIG. 1. The metals and ligands of the illustrated complexes can be modified, as described herein below.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
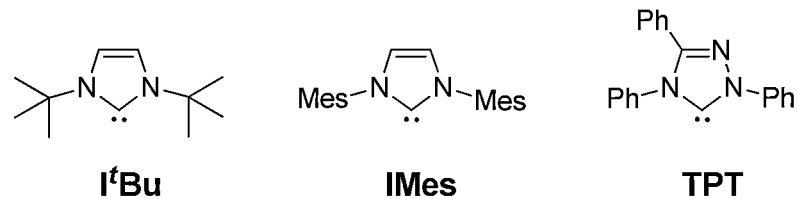
FIG. 1. Polymerization catalysts according to various embodiments: A) N-heterocyclic carbenes; B) ansa-rare earth metal (REM) catalysts (where each R is independently alkyl (e.g., methyl), aryl, alkoxy, or aryloxy); and C) $C_2$-symmetric zirconocenium catalysts.
Figure 1:
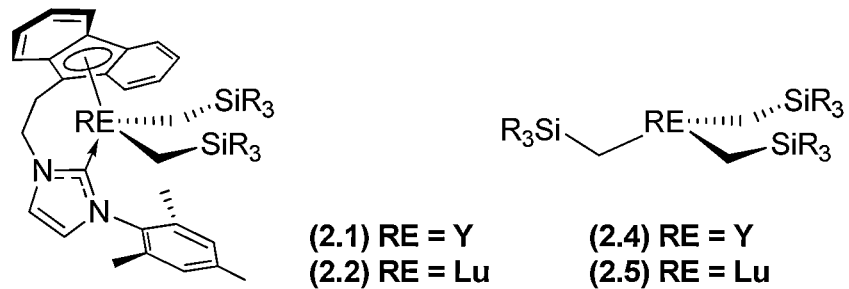
Figure 1:
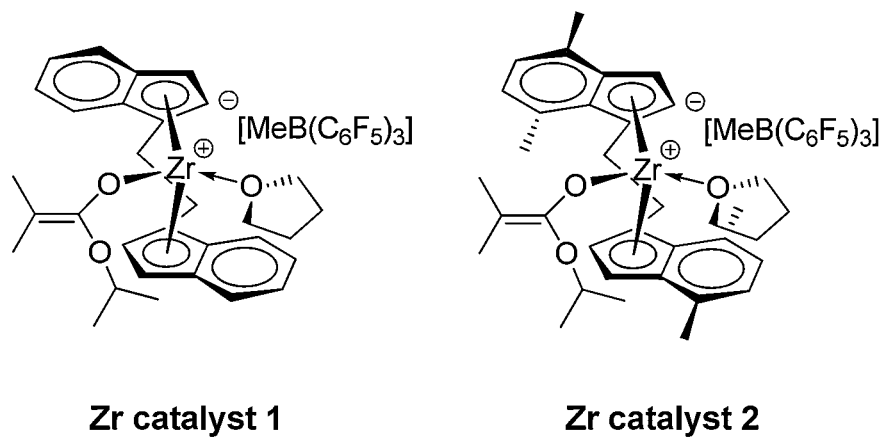

The invention provides catalysts and methods for polymerizing monomers using the various catalysts. Suitable monomers can include certain types of biomass-derived, oxygenated polar feedstocks, such as α-methylene-γ-butyrolactone (MBL), β-methyl-α-methylene-γ-butyrolactone ($_\beta$MMBL), and γ-methyl-α-methylene-γ-butyrolactone ($_\gamma$MMBL). In addition, other monomers may be utilized in the various reactions described herein, and will produce the corresponding polymers. These embodiments include butyrolactones with R groups other than methyl, where R can be any straight chain or branched alkyl group, aliphatic or unsaturated ring, and include heteroatom substitutions (i.e., R can be any of the chemical substituents that are frequently included in the definition of R by those of skill in the art). The R groups may be in either or both of the β and γ positions of the butyrolactone ring. When R groups are present in both positions, they may be selected independently of one another.

The polymers synthesized by the polymerization reactions described herein, including coordination polymerization reactions, can be any of the three stereoisomeric forms: isotactic, syndiotactic, and atactic polymers. The isotactic, syndiotactic, and atactic polymers have stereogenic centers on the backbone arranged in a meso (mmmmm . . . ), racemic (rrrrr . . . ), or random (mrmmr . . . ) fashion, respectively. In a catalyst site-controlled polymerization, the polymer tacticity is predominantly determined by the symmetry of the catalyst, with those exhibiting C$_2$ or C$_1$, Cs, and C$_2$v symmetries generally resulting in isotactic, syndiotactic, and atactic polymers, respectively. On the other hand, a chain-end controlled polymerization can lead to polymers with any of the above three stereoisomeric forms, irrespective of the catalyst symmetry.

Another aspect of the invention is that the catalysts described herein may be used in processes that convert biomass derived renewable feedstocks to technologically important stereoregular polymers.

DEFINITIONS

As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrase "one or more" is readily understood by one of skill in the art, particularly when read in context of its usage. For example, one or more substituents on a phenyl ring refers to one to five, or one to four, for example if the phenyl ring is disubstituted.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values, e.g., weight percentages, proximate to the recited range that are equivalent in terms of the functionality of the individual ingredient, the composition, or the embodiment. The term about can also modify the end-points of a recited range as discuss above in this paragraph.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. Thus, an "effective amount" generally means an amount that provides the desired effect.

The terms "inhibit", "inhibiting", and "inhibition" refer to the slowing, halting, or reversing the growth or progression of a reaction, polymerization, or the like. The terms "enhance" or "increase" have the opposite meanings. The inhibition or enhancement can be greater than about 20%, 40%, 60%, 80%, 90%, 95%, or 99%, for example, compared to the progression that occurs in the absence of the treatment or contacting rendering the inhibition or enhancement.

The polymers of the invention, and the methods used to prepare them, can provide low molecular weight polymers, medium molecular weight polymers, or high molecular weight polymers, depending on the amount of monomers used in the reaction, the amount of catalyst loading, and the reaction time, among other parameters, such as temperature.

A "low molecular weight" oligomer or polymer refers to a compound comprising repeating units that has a molecular weight of about 400 Da (g/mol) to about 10 kDa (kg/mol), typically about 1 kDa to about 5 kDa.

A "medium molecular weight" polymer refers to a polymer that has a molecular weight of about 10 kDa to about 50 kDa.

A "high molecular weight" polymer refers to a polymer that has a molecular weight of about 50 kDa to about 5,000 kDa. The high molecular weight polymers described herein typically have a molecular weight of about 60 kDa to about 300 kDa.

The polymers described herein can have high glass transition temperatures ($T_g$). A high $T_g$ refers to a $T_g$ of at least 250° C., at least about 260° C., at least about 270° C., at least about 280° C., at least about 285° C., or at least about 290° C., up to about 350° C.

The "end group" or "terminal group" of a polymer refers to the atom or moiety at the beginning (an initiation end) or the end (a termination end) of a polymer. As would be readily recognized by one of skill in the art, the end groups of a polymer depend upon the conditions employed for their synthesis, including the catalysts and quenching (reaction halting) reagents used. One end group of a polymer is typically a hydrogen atom, because the polymerization reaction is typically stopped by addition of acidified alcohol. An initiation end group of a polymer is typically an initiator moiety and/or is dependent upon the type of catalyst used, and can be, for example, a non-spectator ligand of the catalyst system, such as an NHC moiety, an enolate group (e.g., a —OC($O_i$Pr)=$CMe_2$ group, typical for metallocene catalysis), or a methylsilane moiety (e.g., —$CH_2$-TMS, typical for REM catalysis). Of course, as would be readily recognized by one of skill in the art, chain transfer reactions can provide other end groups as well. However, the end groups do not typically change the physical properties of the polymers described herein.

A polar organic solvent refers to an organic solvent that has a high dielectric constant. Examples of such polar organic solvent include DMF, DMA, DMSO, DME, or 1,4-dioxane. It was surprisingly discovered that the use of polar organic solvents significantly changes the reactivity of several monomers and catalysts, as described herein.

The polymers described herein can have high solvent resistance. High solvent resistance refers to the property of a polymer wherein the polymer is insoluble in water and organic solvents such as methanol, toluene, methylene chloride, 1,2-dichlorobenzene, acetonitrile, THF, DMSO, and DMF at room temperature (~25° C.). Highly solvent resistant polymers can also be insoluble in 1,2-dichlorobenzene at 180° C., THF at 60° C., DMSO at 100° C., and DMF at 100° C. The property of insolubility is well understood in the art and can refer to the property of a compound that has a solubility of less than 0.01 mg/mL in a particular solvent, typically at 25° C. or at another recited temperature.

The term "alkyl" refers to a branched or unbranched hydrocarbon having, for example, from 1-20 carbon atoms, and often 1-12, 1-10, 1-8, 1-6, or 1-4 carbon atoms. Examples include, but are not limited to, methyl, ethyl, 1-propyl, 2-propyl (iso-propyl), 1-butyl, 2-methyl-1-propyl (isobutyl), 2-butyl (sec-butyl), 2-methyl-2-propyl (t-butyl), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, hexyl, octyl, decyl, dodecyl, and the like. The alkyl can be unsubstituted or substituted, for example, with a substituent described below. The alkyl can also be optionally partially or fully unsaturated. As such, the recitation of an alkyl group can include both alkenyl and alkynyl groups. The alkyl can be a monovalent hydrocarbon radical, as described and exemplified above, or it can be a divalent hydrocarbon radical (i.e., an alkylene).

The term "cycloalkyl" refers to cyclic alkyl groups of, for example, from 3 to 10 carbon atoms having a single cyclic ring or multiple condensed rings. Cycloalkyl groups include, by way of example, single ring structures such as cyclopropyl, cyclobutyl, cyclopentyl, cyclooctyl, and the like, or multiple ring structures such as adamantyl, and the like. The cycloalkyl can be unsubstituted or substituted. The cycloalkyl group can be monovalent or divalent, and can be optionally substituted as described for alkyl groups. The cycloalkyl group can optionally include one or more cites of unsaturation, for example, the cycloalkyl group can include one or more carbon-carbon double bonds, such as, for example, 1-cyclopent-1-enyl, 1-cyclopent-2-enyl, 1-cyclopent-3-enyl, cyclohexyl, 1-cyclohex-1-enyl, 1-cyclohex-2-enyl, 1-cyclohex-3-enyl, and the like.

The term "aryl" refers to an aromatic hydrocarbon group derived from the removal of at least one hydrogen atom from a single carbon atom of a parent aromatic ring system. The radical attachment site can be at a saturated or unsaturated carbon atom of the parent ring system. The aryl group can have from 6 to 20 carbon atoms, for example, about 6 to about 10 carbon atoms. The aryl group can have a single ring (e.g., phenyl) or multiple condensed (fused) rings, wherein at least one ring is aromatic (e.g., naphthyl, dihydrophenanthrenyl, fluorenyl, or anthryl). Typical aryl groups include, but are not limited to, radicals derived from benzene, naphthalene, anthracene, biphenyl, and the like. The aryl can be unsubstituted or optionally substituted, as described for alkyl groups.

The term "substituted" indicates that one or more hydrogen atoms on the group indicated in the expression using "substituted" is replaced with a "substituent". The number referred to by 'one or more' can be apparent from the moiety on which the substituents reside. For example, one or more can refer to, e.g., 1, 2, 3, 4, 5, or 6; in some embodiments 1, 2, or 3; and in other embodiments 1 or 2, and if the substituent is an oxo group, two hydrogen atoms are replace by the presence of the substituent. The substituent can be one of a selection of indicated groups, or it can be a suitable group recited below or known to those of skill in the art, provided that the substituted atom's normal valency is not exceeded, and that the substitution results in a stable compound. Suitable substituent groups include, e.g., alkyl, alkenyl (e.g., vinyl, or allyl), alkynyl, alkoxy, halo, haloalkyl, hydroxy, hydroxyalkyl, aryl, aroyl, (aryl)alkyl (e.g., benzyl or phenylethyl), heteroaryl, heterocycle, cycloalkyl, alkanoyl, alkoxycarbonyl, alkylcarbonyloxy, amino, alkylamino, dialkylamino, trifluoromethyl, trifluoromethoxy, trifluoromethylthio, difluoromethyl, acylamino, nitro, carboxy, carboxyalkyl, keto, thioxo, alkylthio, alkylsulfinyl, alkylsulfonyl, arylsulfinyl, arylsulfonyl, heteroarylsulfinyl, heteroarylsulfonyl, heterocyclesulfinyl, heterocyclesulfonyl, phosphate, sulfate, hydroxylamine, hydroxyl (alkyl)amine, and cyano, as well as the moieties illustrated in the schemes and Figures of this disclosure; or combinations thereof. Additionally, suitable substituent groups can be, e.g., —X, —R, —O$^-$, —OR, —SR, —S$^-$, —NR$_2$, —NR$_3$, =NR, —CX$_3$, —CN, —OCN, —SCN, —N=C=O, —NCS, —NO, —NO$_2$, =N$_2$, —N$_3$, —NC(=O)R, —C(=O)R, —C(=O)NRR, —S(=O)$_2$O$^-$, —S(=O)$_2$OH, —S(=O)$_2$R, —OS(=O)$_2$OR, —S(=O)$_2$NR, —S(=O)R, —OP(=O)(OR)$_2$, —P(=O)(OR)$_2$, —OP(=O)(OH)(OR), —P(=O)(OH)(OR), —P(=O)(O$^-$)$_2$, —P(=O)(OH)$_2$, —C(=O)R, —C(=O)X, —C(S)R, —C(O)OR, —C(O)O$^-$, —C(S)OR, —C(O)SR, —C(S)SR, —C(O)NRR, —C(S)NRR, or —C(NR)NRR, where each X is independently a halogen ("halo"): F, Cl, Br, or I; and each R is independently H, alkyl, cycloalkyl, aryl, (aryl)alkyl (e.g., benzyl), heteroaryl, (heteroaryl)alkyl, heterocycle, heterocycle(alkyl), or a protecting group. As would be readily understood by one skilled in the art, when a substituent is keto (=O) or thioxo (=S), or the like, then two hydrogen atoms on the substituted atom are replaced. In some embodiments, one or more substituents above can be excluded from the group of potential values for substituents on the substituted group. The various R groups in the schemes and figures of this disclosure can be one or more of the substituents recited above, thus the listing of certain variables for such R groups (including $R^1$, $R^2$, $R^3$, etc.) are representative and not exhaustive, and can be supplemented with one or more of the substituents above.

The metal catalysts described herein can have a variety of ligands, as described below. Other useful ligands are described by, for example, Chen, *Chem. Rev.* 2009, 109, 5157; Zhang et al., *J. Am. Chem. Soc.* 2011, 133, 13674; Miyake et al., *Dalton Trans.* 2010, 39, 6710; Hu et al., *Macromolecules* 2010, 43, 9328; and U.S. Patent Publication No. 2012/0142905 (Thuilliez et al.). Many of these ligands can be obtained commercially from suppliers such as Sigma-Aldrich (Milwaukee, Wis.), Strem Chemicals, Inc. (Newburyport, Mass.), and Alfa Aesar (Ward Hill, Mass.).

The variables and limitations described for one general or specific embodiment for any polymer described herein can also be applied to other embodiments, for example, other variations of a polymer or formula described herein, and variations of the embodiments provided in the Examples.

A. Conjugate-Addition Organopolymerization

The invention provides a rapid conjugate-addition polymerization of α,β-unsaturated esters by NHCs alone, with the most active catalyst achieving quantitative monomer conversion in ≤1 minute of reaction. Of the NHC catalysts initially investigated (Scheme A1), the most nucleophilic NHC (I$^t$Bu) directly polymerizes a large excess (e.g., >800 equiv) of renewable methylene butyrolactone monomers, including naturally occurring α-methylene-γ-butyrolactone (MBL) and plant biomass-derived γ-methyl-α-methylene-γ-butyrolactone (MMBL), at room temperature (RT) to medium (10-50 kg/mol) or high (>50 kg/mol) molecular weight polymers in less than 1 minute, giving a high turn-over frequency (TOF) of >4.8×10$^4$ h$^{-1}$.

Scheme A1. Rapid polymerization of the renewable MMBL.

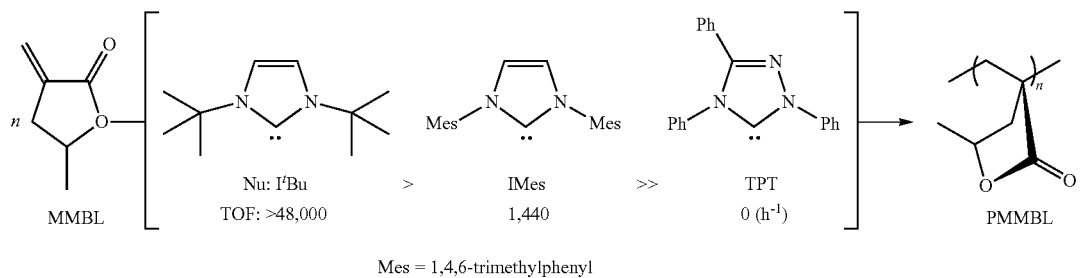

Mes = 1,4,6-trimethylphenyl

The rapid polymerization of the renewable MMBL by I'Bu in DMF at RT and correlation of the polymerization activity of NHCs with their relative nucleophilicity is illustrated in Scheme A1. The rate of the polymerization is strongly affected by the relative nucleophilicity of NHC catalysts employed herein (e.g., the catalysts of FIG. 1A), and there exists a remarkable selectivity of the NHC for substrate structures, thus leading to three different modes of reaction involving acrylics.

The inventors hypothesized that NHCs, although they showed no activity in the polymerization of the commonest acrylic monomer methyl methacrylate (MMA) in toluene or THF, could directly polymerize renewable monomers MBL and MMBL because such α-methylene-γ-butyrolactones exhibit greater reactivity in chain-growth polymerization than typical alkyl methacrylates such as MMA, attributable to the presence of both the nearly planar five-membered lactone ring (which provides resonance stabilization for the active species) and the higher energy exocyclic C=C double bond (as a result of the ring strain and the fixed s-cis conformation). Indeed, with a monomer [M]-to-initiator [NHC] ratio of 200, rather fast polymerization of MMBL by I'Bu (0.5 mol %) was observed even in toluene at RT, achieving 93% and 99% conversions in 30 minutes and 1 hour, respectively (run 1, Table A1). The polymerization was heterogeneous, producing PMMBL with a number average molecular weight (MO of 58.4 kg/mol at 93% conversion, which is about three times higher than the calculated $M_n$. The less nucleophilic IMes showed noticeably lower activity (run 2), while the least nucleophilic NHC of this series, TPT, exhibited the lowest activity (run 3). The polymerization by I'Bu in THF was still heterogeneous and slower, producing PMMBL with a considerably lower $M_n$ of 23.0 kg/mol (polydispersity index, PDI=1.69, run 4). A similar trend was also observed for IMes (run 5), whereas TPT showed no polymerization activity in THF up to 24 hours (run 6).

TABLE A1

Selected Results of Polymerization by NHCs.[a]

| run no. | monomer | NHC | [M]/[NHC] | solvent | temp (°C.) | time (min) | conv.[b] (%) | TOF (h⁻¹) | $M_n$[c] (kg/mol) | PDI[c] ($M_w/M_n$) |
|---|---|---|---|---|---|---|---|---|---|---|
| 1 | MMBL | I'Bu | 200 | TOL | RT | (30)60 | (93)99 | (372)198 | (58.4)[d] | n.d. |
| 2 | MMBL | IMes | 200 | TOL | RT | (60)1440 | (84)98 | (168)8 | 51.2[d] | n.d. |
| 3 | MMBL | TPT | 200 | TOL | RT | (60)1440 | (20)79 | (40)7 | 38.9[d] | n.d. |
| 4 | MMBL | I'Bu | 200 | THF | RT | (60)1440 | (79)100 | (158)8 | 23.0 | 1.69 |
| 5 | MMBL | IMes | 200 | THF | RT | (540)1440 | (76)87 | (17)7 | 29.4 | 1.54 |
| 6 | MMBL | TPT | 200 | THF | RT | 1440 | 0 | 0 | — | — |
| 7 | MMBL | I'Bu | 200 | DMF | RT | 1 | 100 | 12000 | 38.5 | 1.68 |
| 8 | MMBL | I'Bu | 400 | DMF | RT | 1 | 100 | 24000 | 69.0[e] | 1.93 |
| 9 | MMBL | I'Bu | 800 | DMF | RT | 1 | 100 | 48000 | 84.7[e] | 2.11 |
| 10 | MMBL | IMes | 200 | DMF | RT | (1)1440 | (12)100 | (1440)8 | 17.8 | 1.46 |
| 11 | MMBL | TPT | 200 | DMF | RT | 1440 | 0 | 0 | — | — |
| 12 | MMBL | I'Bu | 200 | DMF | 0 | 60 | 100 | 200 | 40.6 | 1.66 |
| 13 | MMBL | I'Bu | 200 | DMF | −60 | 600 | >99 | 20 | 45.8 | 1.84 |
| 14 | MMBL | I'Bu | 200[f] | DMF | RT | 1 | 100 | 12000 | 29.3[e] | 1.78 |
| 15 | MMBL | I'Bu | 200[g] | DMF | RT | 1 | 100 | 12000 | 19.1[e] | 1.80 |
| 16 | MBL | I'Bu | 200 | DMF | RT | (1)1440 | (70)100 | (8400)8 | 27.0[e] | 1.59 |
| 17 | MBL | IMes | 200 | DMF | RT | (300)1440 | (89)100 | (36)8 | 10.6 | 1.36 |
| 18 | MBL | TPT | 200 | DMF | RT | 1440 | 0 | 0 | — | — |
| 19 | MMA | I'Bu | 200 | DMF | RT | (60)210 | (68)87 | (136)50 | 33.2 | 1.99 |
| 20 | MMA | IMes | 20 | DMF | RT or 80 | 1440 | <1 | — | — | — |
| 21 | MMA | TPT | 20 | DMF | RT or 80 | 1440 | <1 | — | — | — |
| 22 | FMA | I'Bu | 200 | DMF | RT | (60)1440 | (48)100 | (96)8 | 14.7 | 1.94 |

[a]Solvents: TOL (toluene), THF (tetrahydrofuran), or DMF (N,N-dimethylformamide), all in 4.5 mL, except for the MMA polymerization where 8.0 mL solvent was used; RT (room temperature, ~25° C.); n.d. (not determined).
[b]Conv. = % monomer conversion measured by $^1$H NMR.
[c]Number-average molecular weight ($M_n$) and polydispersity index (PDI = $M_w/M_n$) determined by GPC in DMF relative to PMMA standards.
[d]The reaction was heterogeneous in toluene, giving the polymer that contained a small left (higher MW) shoulder peak.
[e]Contained a small (~1-2%) high MW tail peak.
[f]In the presence of 10 equiv of 3-methyl-2-butanone (MBO).
[g]In the presence of 50 equiv of MBO.

Remarkably, the homogeneous polymerization by I'Bu in the much more polar solvent DMF is extremely rapid. Thus, all 200, 400, or 800 equivalents of MMBL were rapidly polymerized in ≤1 minute (runs 7-9), giving a high TOF of >4.8×10$^4$ h$^{-1}$ (run 9). The $M_n$ of the resulting PMMBL increased from 38.5 kg/mol to 69.0 kg/mol to 84.7 kg/mol with an increase in the [M]/[NHC] ratio from 200 to 400 to 800 (runs 7-9), demonstrating the ability of the system to control $M_n$ by adjusting the [M]/[NHC] ratio.

As in the polymerization of MMBL mediated by metal- and metalloid-based catalysts or initiators (see, e.g., (a) Zhang et al., *J. Am. Chem. Soc.* 2011, 133, 13674; (b) Miyake et al., *Macromolecules* 2010, 43, 4902; (c) Miyake et al., *Dalton Trans.* 2010, 39, 6710; (d) Hu et al., *Macromolecules* 2010, 43, 9328; (e) Cockburn et al., *Macromol. Chem. Phys.* 2010, 211, 501; and (f) Mosnáček et al., *Macromolecules* 2008, 41, 5509), no ring-opening of the butyrolactone ring was observed; control runs using NHCs or NHC/Lewis acid pairs for the ROP of five-membered lactones, γ-butyrolactone and γ-valerolactone, also showed no polymerization activity.

The use of IMes resulted in a considerable initial polymerization rate reduction by more than 30-fold, and the polymer $M_n$ at 100% conversion was also lowered by more than 2-fold (run 10 vs. 9), while the least nucleophilic TPT in the series exhibited again no polymerization activity up to 24 hours (run 11). Lowering the temperature of the MMBL polymerization, run with ItBu in DMF, from room temperature to either 0 or −60° C. decreased the TOF values (runs 12 and 13 vs. 7). The PMMBL tacticity was not noticeably affected by the reaction temperature: mm=20.6%, 21.6%; mr=43.3%, 43.8 at 25° C. and −60° C., respectively. Interestingly, an enolizable organic acid, 3-methyl-2-butanone (MBO), can be used to modulate the polymer $M_n$; thus, addition of 10 equiv of MBO lowered the $M_n$ by 24% relative to the same run without MBO (29.3 kg/mol in run 14 vs. 38.5 kg/mol in run 7), and 50 equiv of MBO reduced the $M_n$ by one half to 19.1 kg/mol (run 15); in both cases, the high polymerization activity was maintained.

Having achieved high activity for the polymerization of MMBL by I'Bu, five other conjugated acrylic monomers were examined for their reactivity toward the present NHCs. The β-methyl derivative, β-methyl-α-methylene-γ-butyrolactone, can also be rapidly polymerized by I'Bu in DMF at RT. Likewise, the parent MBL was quickly polymerized by I'Bu in DMF at RT, achieving 70% conversion in 1 minute (run 16). The reactivity trend similar to the MMBL polymerization was observed for the MBL polymerization. Thus, substituting I'Bu by IMes resulted in a much less active polymerization (89% conversion in 100 min, run 17), whereas TPT exhibited no activity for MBL polymerization up to 24 hours (run 18). Interestingly, although I'Bu showed no activity for polymerization of MMA in toluene or THF at RT, good activity (68% conversion in 1 hour, TOF=136 h$^{-1}$, run 19) was observed for this polymerization in DMF. Thus, the invention also provides methods for polymerizing non-cyclic α,β-unsaturated esters, such as MMA, using the catalysts and methods described herein, wherein the polymerization is carried out in a polar organic solvent such as DMF, DMA, DMSO, DME, or 1,4-dioxane.

The PMMA produced at RT is a syndio-rich atactic material with mm=4.7%, mr=39.6%, and rr=55.7%. Not surprisingly, either IMes or TPT showed negligible activity for MMA polymerization in DMF (runs 20 and 21). Polymerization of the biomass-derived furfuryl methacrylate (FMA) (Moreau et al., *Top. Catal.* 2004, 27, 11-30) by I'Bu in DMF was also successful, achieving 48% monomer conversion in 1 hour (run 22). The PFMA produced herein is also a syndio-biased atactic material with mm=4.7%, mr=35.1%, and rr=60.2%. On the other hand, no polymerization was observed for N,N-dimethyl acrylamide at RT up to 24 hours, presumably due to the higher basicity of the amide enolate arising from addition of the nucleophile, relative to that of the ester enolate.

Additional experiments were carried out to provide the γ-MMBL polymerization results shown in Table A2.

TABLE A2

Selected γ-MMBL Polymerization Results by I'Bu in DMF at 25° C.[a]

| run no. | [I'Bu] (mmol/L) | [MMBL]$_o$/ [I'Bu]$_o$ | time (s) | conv.[b] (%) | $M_n$[c] (kg/ mol) | PDI[c] ($M_w/M_n$) | I*[d] (%) |
|---|---|---|---|---|---|---|---|
| 1 | 4.68 | 200 | 60 | 100 | 38.5 | 1.68 | 58.1 |
| 2 | 2.34 | 400 | 60 | 100 | 69.0 | 1.93 | 64.9 |
| 3 | 1.17 | 800 | 60 | 100 | 84.7 | 2.11 | 106 |
| 4 | 0.936 | 1000 | 60 | >99 | 71.9 | 1.80 | 154 |
| 5 | 0.312 | 3000 | 60 | >99 | 88.7 | 1.45 | 375 |
| 6 | 0.187 | 5000 | 120 | >99 | 81.2 | 1.48 | 683 |
| 7 | 0.117 | 8000 | 15 | 33.4 | 52.6 | 2.10 | 569 |
| 8 | | | 30 | 58.3 | 67.1 | 2.00 | 778 |
| 9 | | | 45 | 69.6 | 72.9 | 2.00 | 855 |
| 10 | | | 60 | 81.8 | 76.3 | 1.99 | 961 |
| 11 | | | 80 | 88.6 | 78.1 | 1.97 | 1016 |
| 12 | | | 100 | 93.5 | 77.7 | 1.98 | 1078 |
| 13 | | | 120 | 95.5 | 79.0 | 1.97 | 1083 |
| 14 | | | 150 | 97.2 | 78.8 | 1.97 | 1105 |
| 15 | | | 180 | 99.0 | 79.9 | 1.93 | 1110 |
| 16 | 0.0936 | 10000 | 20 | 18.3 | 44.3 | 1.98 | 463 |
| 17 | | | 40 | 55.2 | 64.6 | 2.03 | 957 |
| 18 | | | 60 | 69.4 | 73.4 | 1.96 | 1059 |
| 19 | | | 80 | 78.2 | 76.8 | 1.96 | 1140 |
| 20 | | | 100 | 81.7 | 79.5 | 1.92 | 1151 |
| 21 | | | 120 | 86.3 | 78.8 | 1.94 | 1226 |
| 22 | | | 180 | 94.6 | 81.0 | 1.92 | 1308 |
| 23 | | | 250 | 97.3 | 78.6 | 1.98 | 1386 |
| 24 | | | 300 | 98.5 | 79.3 | 1.96 | 1391 |
| 25 | 0.0780 | 12000 | 20 | 19.5 | 45.9 | 2.33 | 571 |
| 26 | | | 40 | 30.8 | 53.1 | 2.07 | 780 |
| 27 | | | 60 | 33.8 | 53.5 | 1.98 | 849 |
| 28 | | | 80 | 36.0 | 55.7 | 2.00 | 869 |
| 39 | | | 100 | 47.2 | 59.8 | 2.05 | 1061 |
| 30 | | | 120 | 50.1 | 64.0 | 1.97 | 1052 |
| 31 | | | 150 | 56.8 | 65.7 | 2.00 | 1162 |
| 32 | | | 180 | 61.5 | 69.1 | 2.00 | 1196 |
| 33 | | | 210 | 68.9 | 69.3 | 2.01 | 1336 |
| 34 | | | 240 | 71.1 | 71.3 | 1.96 | 1340 |
| 35 | | | 300 | 75.1 | 70.9 | 1.99 | 1424 |
| 36 | | | 360 | 79.3 | 74.1 | 1.95 | 1438 |
| 37 | | | 420 | 81.5 | 72.6 | 1.96 | 1509 |
| 38 | | | 600 | 85.3 | 72.9 | 1.96 | 1573 |
| 39 | | | 900 | 88.3 | 74.2 | 1.95 | 1599 |

[a]Carried out at ambient temperature (~25° C.) in 4.5 mL DMF and 0.5 mL γ-MMBL solution with fixed [γ-MMBL]$_0$ = 0.936M.
[b]Monomer conversions measured by $^1$H NMR.
[c]$M_n$ and PDI determined by gel-permeation chromatography (GPC) in DMF relative to PMMA standards. A small high molecular weight peak (0.1-2%) was present in some of the samples.
[d]Initiator efficiency (I*) = $M_n$ (calcd)/$M_n$ (exptl), where $M_n$ (calcd) = MW (M) × [M]/[I] × conversion (%) + MW (chain-end groups).

To gain insight into the above described polymerization behavior as a function of NHC and monomer structures, stoichiometric reactions of NHCs and α,β-unsaturated ester substrates were investigated. As (M)MBL monomers are quickly polymerized by imidazolylidene carbenes, the model reaction on MMA was tested. The triazolylidene carbene TPT was found to undergo efficient dimerization (umpolung) of MMA, while other common imidazolylidene NHCs such as I$^t$Bu and IMes were ineffective. This intermolecular umpolung of MMA was proposed to proceed through the initial conjugate addition of TPT to MMA to form the corresponding ester enolate that undergoes proton transfer (tautomerization) affording an enamine intermediate similar to the Breslow intermediate in the benzoin reaction; addition of the enamine to another molecule of MMA leads to the tail-to-tail dimerization product, via again the ester enolate intermediate that undergoes proton transfer and release of TPT. This mechanism bears a close resemblance to the one proposed for the intramolecular umpolung of Michael acceptors catalyzed by NHCs (Fisher et al., *J. Am. Chem. Soc.* 2006, 128, 1472).

Figure 2:
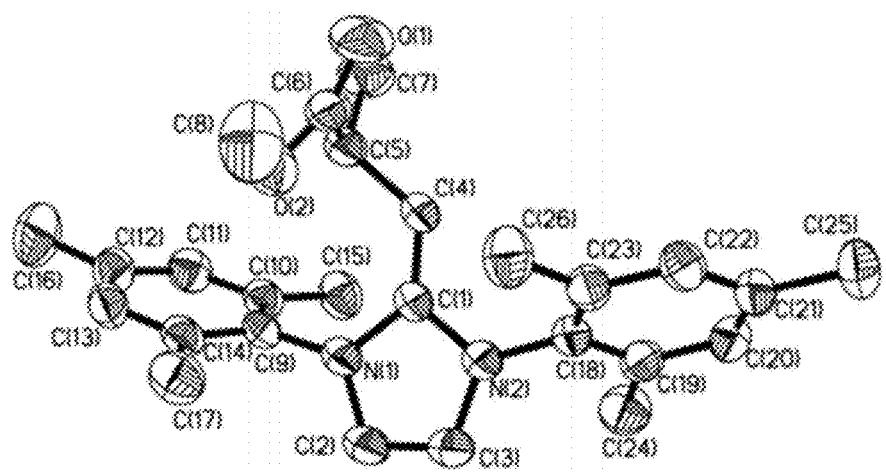
FIG. 2. X-ray crystal structure of a single-addition product enamine 1 of Scheme A2. Hydrogen atoms have been omitted for clarity and ellipsoids drawn at 50% probability. Selected bond lengths [Å]: C1-C4 1.353(2), C2-C3 1.316(2), C4-C5 1.508(2).

It was found that, despite the fact that the imidazolylidene I$^t$Bu did not react with MMA in toluene at RT (up to 3 days), another common NHC, IMes, reacted smoothly with MMA at RT to form a single-addition product, enamine 1 (Scheme A2 and FIG. 2). Unlike the TPT-derived enamine intermediate involved in the dimerization of MMA, the enamine derived from IMes is stable, isolable, and nonreactive toward additional MMA, presumably due to its strong, irreversible binding of IMes with MMA. Enamine 1 has been characterized spectroscopically by NMR (see Example 1 below) and structurally by X-ray diffraction analysis (CCDC-853379 contains the supplementary crystallographic data for this structure; these data can be obtained free of charge from The Cambridge Crystallographic Data Centre via www.ccdc.cam.ac.uk/data_request/cif). The molecular structure of 1 (FIG. 2) clearly displays a C═C double bond formed between C1 and C4 carbons, with a bond distance of 1.353(2) Å. This single-addition product resembles those enamines derived from the 1:1 addition of TPT to more highly (doubly) activated Michael acceptors (see Enders et al., *Synthesis* 2003, 1292; Enders et al., *Angew. Chem. Int. Ed.* 1995, 34, 1021; Enders et al., *J. Prakt. Chem.* 1997, 339 397).

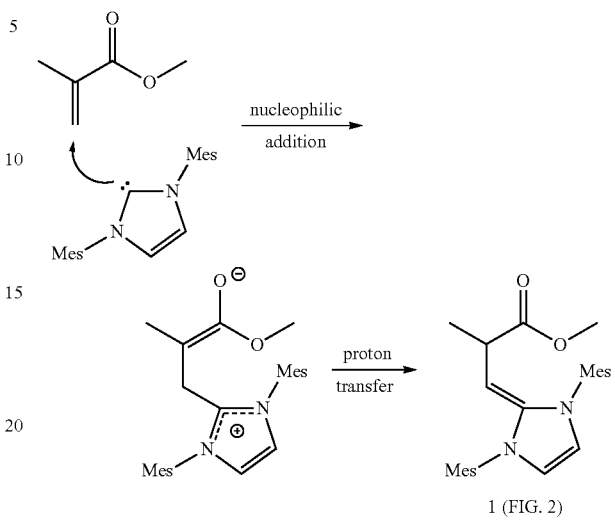

Scheme A2. A mechanism for the reaction between IMes and MMA resulting in single addition product enamine 1.

1 (FIG. 2)

Possible mechanistic scenarios for the above described remarkable selectivity of NHC structure for three types of reactions involving α,β-unsaturated esters, including single addition, dimerization, and polymerization, are outlined in Scheme A3. Based on the results available to date, it appears that dimerization (scenario A) is unique to the triazolylidene carbine TPT, the least nucleophilic NHC in the series, and to linear (meth)acrylates, as no dimerization for methylene butyrolactones with fixed s-cis conformation was found. On the other hand, the more nucleophilic IMes reacts with methacrylates such as MMA in toluene to afford selectively the single-addition product (scenario B), while the most nucleophilic NHC in the series, I$^t$Bu, does not react with MMA in the same solvent. Instead, I$^t$Bu rapidly polymerizes methylene butyrolactones (scenario C), especially MMBL in DMF, and also polymerizes methacrylates (e.g., MMA and FMA) in DMF.

Scheme A3. Possible mechanistic scenarios for the observed selectivity of NHC structure for three types of reactions involving α,β-unsaturated esters.

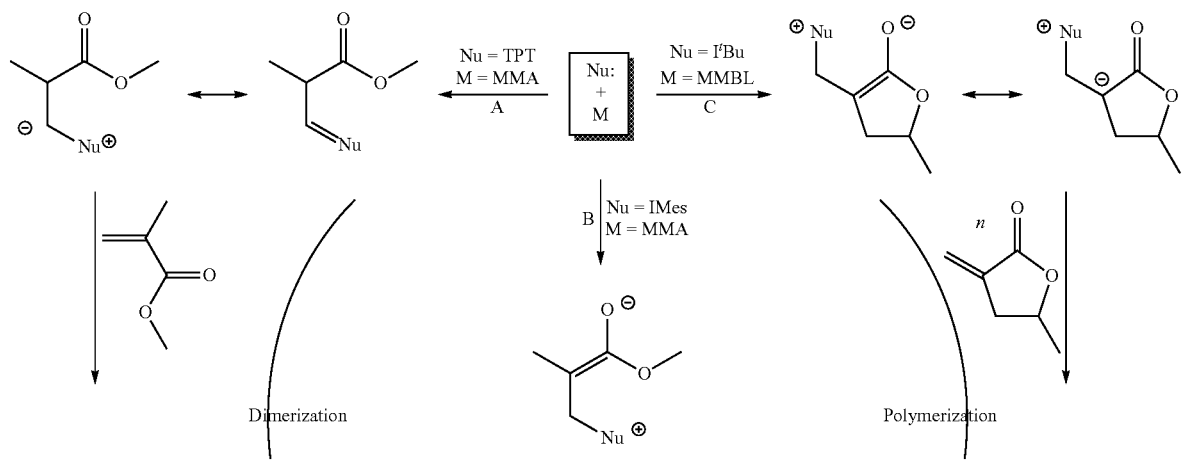

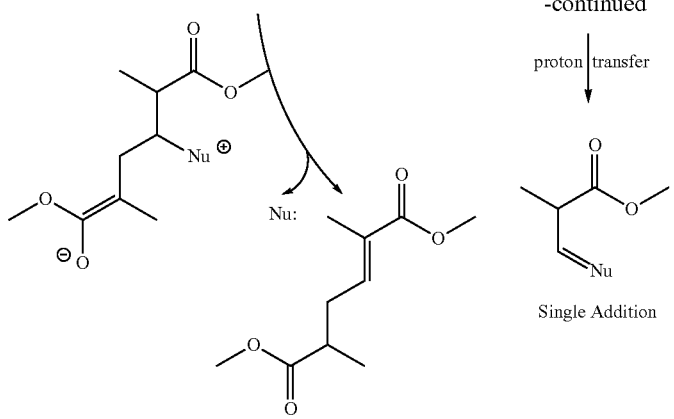
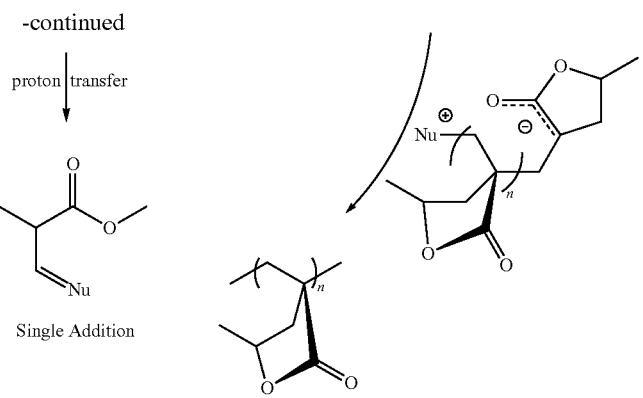

The polymerization scenario is proposed to proceed through reiterative 1,4-conjugate addition of the propagating ester enolate to the incoming monomer (pathway C, Scheme A3), following the well-established conjugate-addition mechanism for the controlled anionic polymerization of acrylics using discrete or in situ generated metal ester enolates (see Chen, *Chem. Rev.* 2009, 109, 5157).

Thus, in contrast to dimerization (umpolung) of α,β-unsaturated esters (acrylics) by the triazolylidene carbene TPT, the more nucleophilic imidazolylidene carbene IMes forms selectively the single-addition product, while I'Bu, the most nucleophilic carbene of the series, polymerizes acrylics, especially the biomass-derived methylene butyrolactones, producing medium to high molecular weight bioplastics rapidly (100% in ≤1 minute) at ambient temperature.

In conclusion, a rapid organopolymerization of acrylic monomers at RT has been developed, through the proposed conjugate-addition propagation cycle mediated by NHCs alone (with no any other initiating or catalyzing components). This polymerization is especially effective for the biomass-derived renewable methylene butyrolactones such as MMBL, quantitatively converting the monomer to the corresponding bioplastics in typically less than 1 minute. This polymerization pathway also adds a new mode of the NHC-mediated reactions involving Michael acceptor α,β-unsaturated esters, that is, dimerization (intra- and intermolecular umpolung) and single addition (although the previously reported single addition applied to doubly activated Michael acceptors).

Also noteworthy is the apparent correlation between the activity of polymerization and the nucleophilicity of NHCs employed in this study, with the most nucleophilic I'Bu in the series exhibiting the highest activity, the less nucleophilic IMes displaying much lower activity, and the least nucleophilic TPT often showing no activity at all. Intriguingly, there exists a remarkable selectivity of the NHC for the substrate structures, thus leading to three different modes of reaction involving acrylic substrates: IMes forms selectively the single-addition product with methacrylates (MMA); TPT promotes dimerization of methacrylates (MMA); and I'Bu mediates rapid polymerization of methylene butyrolactones (MBL, MMBL). Selectivity may rest on the relative reversibility of NHC binding with substrates (in the case of single addition vs. dimerization) and the relative propensity for tautomerization of the ester enolate intermediate generated by Nu addition vs. subsequent conjugate addition to the monomer (in the case of dimerization vs. polymerization).

Accordingly, the invention provides methods for the rapid production of acrylic bioplastics by N-heterocyclic carbene initiation. In one embodiment, naturally occurring or plant biomass-derived renewable acrylic monomers can be rapidly polymerized using readily available organic catalysts, such as N-heterocyclic carbenes, into high molecular weight sustainable polymers. Such polymers have great potential to offer not only renewable alternatives to the petroleum-based acrylic plastics but also enhanced or new material properties such as high thermal stability, high $T_g$, and high solvent resistance.

In one embodiment, the invention provides a rapid organopolymerization of acrylic monomers at room temperature (~23-25° C.). The reaction can occur though a conjugate-addition propagation cycle mediated by NHCs alone, and the reaction does not require any other initiating or catalyzing components. This polymerization is especially effective for the biomass-derived renewable methylene butyrolactones such as MMBL, quantitatively converting the monomer to the corresponding bioplastics in typically less than 1 minute (see Tables A1 and A2), for example, when the catalyst loading is greater than about 0.033 mol %. This polymerization pathway also adds a new, third mode of the NHC-mediated reactions involving Michael acceptor α,β-unsaturated esters to the two known modes of reaction, dimerization (intra- and intermolecular umpolung) and single addition (although the previously reported single addition applied to doubly activated Michael acceptors).

Various embodiments of the invention can be successfully utilized to polymerize or co-polymerize a variety of monomers, including methylene butyrolactones (including α-methylene-γ-butyrolactone, γ-alkyl or aryl-α-methylene-γ-butyrolactones, β-alkyl or aryl-α-methylene-γ-butyrolactones, β,γ-disubstituted alkyl- or aryl-α-methylene-γ-butyrolactones) and other acrylates or methacrylates (including alkylmethacrylates and alkyl acrylates).

Embodiments of the invention may utilize a variety of organic catalysts, including NHCs (including but not limited to imidazolylidene carbenes, imidazolinylidene carbenes, triazolylidene carbenes, thiazolylidene carbenes, pyrrolidinylidene carbenes, pyrimidinylidene carbenes, cyclic (alkyl)(amino)carbenes (CAACs), and "abnormal NHCs" where the carbene center is between N and C atoms), organic super bases (including the phosphazenes tBu-P2 and tBu-P4 as well as proazaphosphatranes), and versions of any of these organic catalysts that are used as supported catalysts, for example on organic polymers or inorganic oxides. While most often the descriptions herein describe solution-phase "NHC catalysts", it is straightforward for those skilled in the art to substitute NHC catalysts with the other catalysts described above (including organic super bases or supported versions of these catalysts). Accordingly, use of the term "NHC catalysts" is not meant to exclude these other embodiments of the invention.

Other embodiments include the use of other additives or promoters such as Lewis acids in order to facilitate, control or accelerate the polymerization reaction. These additives or promoters may be added in a catalytic or stoichiometric amount relative to the organic catalyst (e.g., 0.5 mol %, 1 mol %, 2 mol %, 3 mol %, 5 mol %, 10 mol %, 25 mol %, 50 mol %, or 100 mol %, or ranges in between any two of the aforementioned values). Example embodiments include the use of strong aluminum Lewis acids, e.g., $Al(C_6F_5)_3$, $AlR_3$, $Al(OR)_3$, $AlR(OR)_2$, $AlR_2(OR)$, $AlX_3$, $ZnR_2$, $ZnX_2$, where R is alkyl, aryl, or alkyl(aryl), and X is halide) Other additives that may be utilized include enolizable organic acids (such as ketones and esters), which may be used in combination with the organic catalysts such as NHCs, to control or modulate the molecular weight of the resulting polymers.

Thus, in various embodiments, the invention provides a method of polymerizing an optionally substituted α-methylene-γ-butyrolactone, the method comprising contacting an optionally substituted α-methylene-γ-butyrolactone monomer that includes an exocyclic methylene and an N-heterocyclic carbene catalyst. The N-heterocyclic carbene catalyst can be, for example, a 1,3-di-tert-butylimidazol-2-ylidene (I$^t$Bu) catalyst or a 1,3-bis(2,4,6-trimethyl-phenyl)imidazol-2-ylidene (IMes) catalyst, or an N-heterocyclic carbene catalyst described above. The polymerization can be run in a suitable and effective solvent system to provide the corresponding polymer product. Examples of products include polymers of Formula (II):

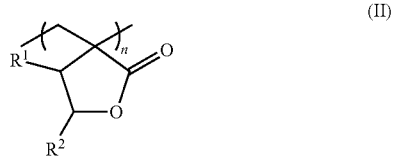

(II)

wherein
n is about 10 to about 45,000;
$R^1$ is H, $(C_1-C_6)$alkyl, phenyl, or benzyl;
$R^2$ is H, $(C_1-C_6)$alkyl, phenyl, or benzyl; and
one or both of $R^1$ and $R^2$ is H;
such as PMBL, P$_β$MMBL, or P$_γ$MMBL, or the product can be poly(furfuryl)acrylate when furfuryl acrylate is polymerized in the reaction.

In one embodiment, the catalyst is I$^t$Bu. In another embodiment, the catalyst is IMes. The turn-over frequency (TOF) of the catalyst in the polymerization reaction can be greater than about $4 \times 10^4$ h$^{-1}$, for example, when about 3000 or less equivalents of monomer per I$^t$Bu are used.

The polymerization can include up to 3000 equivalents of monomer per I$^t$Bu, wherein greater than 99% of the monomers are converted to the product polymer in less than about one minute from contacting the monomer and the catalyst (e.g., polymerization initiation). In other embodiments, the polymerization can include up to 10,000 equivalents of monomer per I$^t$Bu, wherein greater than 99% of the monomers are converted to the product polymer in less than about five minutes from contacting the monomer and the catalyst.

The optionally substituted α-methylene-γ-butyrolactone monomer can be, for example, α-methylene-γ-butyrolactone (MBL), γ-methyl-α-methylene-γ-butyrolactone (γMMBL), β-methyl-α-methylene-γ-butyrolactone (βMMBL), or furfuryl methacrylate (FMA).

The polymerization can be carried out at less than about 30° C. The polymer product has a molecular weight polymer of at least 1 kDa, at least 10 kDa, at least 50 kDa, at least 100 kDa.

In one embodiment, the solvent is a polar organic solvent, such as dimethylformamide (DMF). In various embodiments, the polymerization is carried out without the aid of initiating or catalyzing components other than the N-heterocyclic carbene catalyst.

Further methods, details, techniques, and embodiments are described below in Example 1.

B. Ansa-Rare-Earth Metal Catalysts for Rapid and Stereoselective Polymerizations Among many types of REM catalysts developed for the polymerization of polar olefins, bis(η$^5$-pentamethylcyclopentadienyl, Cp*) and related sandwich lanthanocenes, such as [Cp*$_2$SmH]$_2$ and Cp*$_2$LnMe(THF), typically exhibit the highest polymerization activity and control. On the other hand, mono-Cp-type, half-sandwich REM catalysts have demonstrated their remarkable versatility in the (co)polymerization of nonpolar olefins, especially styrene and isoprene, producing a series of new polymeric materials. However, when applied to the polymerization of polar olefins such as MMA and acrylates, a number of half-sandwich REM catalysts have been shown to be less active, efficient and controlled than sandwich lanthanocene catalysts (Chen, Chem. Rev. 2009, 109, 5157-5214). Likewise, several different types of ansa-lanthanocenes are also considerably less active and effective than the unbridged lanthanocene system.

Recently, f-block N-heterocyclic carbene (NHC) complexes have gained increasing interest (Arnold and Casely, Chem. Rev. 2009, 109, 3599). Noteworthy among such complexes are NHC-functionalized "constrained geometry"-type, half-sandwich REM complexes bearing ansa-ligation that links a strong η$^5$-bonded Cp-like anionic donor to a strong κ$^1$-bonded NHC neutral donor, such as ethylene-bridged indenyl-NHC and fluorenyl (Flu)-NHC REM complexes. In particular, the Flu-NHC complexes, upon appropriate activation, exhibit high activity and regioselectivity in the living polymerization of isoprene to produce semicrystalline, syndio-rich, 3,4-regulated polyisoprene (Wang et al., Macromolecules 2008, 41, 1983).

Synthesis of sustainable polymers using renewable feedstocks in a technologically and economically competitive fashion represents an imminent challenge and thus attracts increasing attention. In this context, biomass-derived renewable methylene butyrolactones, such as MBL and γMMBL, are of particular interest in exploring the prospects of substituting the petroleum-based methacrylate monomers for specialty chemicals and polymers production. The polymerization of MBL and γMMBL has been demonstrated previously, chiefly by various radical polymerization mechanisms, but also by other types of polymerizations including group-transfer polymerization, anionic polymerization, silylium-catalyzed polymerization, polymerization by classical and frustrated Lewis pairs, and metal-mediated coordination polymerization. The β-methyl derivative, βMMBL, to the best of our knowledge, has only been radically polymerized, by AIBN (2,2'-azobis(2-methyl propionitrile)) (Pittman and Lee, J. Polym. Sci. Part A. Polym. Chem. 2003, 41, 1759) or AIBMe (2,2'-azobis(2-methylpropionate)) (U.S. Pat. No. 7,512,309 (Aoyagi et al.)).

Significantly, the resulting PMBL and P$_γ$MMBL exhibit enhanced materials properties over PMMA. For example, the glass-transition temperature ($T_g$) of the atactic PMBL is 195° C., which is ~90° C. higher than that of atactic PMMA, and the atactic $P_\gamma$MMBL exhibits an even higher $T_g$ of 225° C. Compared to PMMA, PMBL also exhibits enhanced optical properties as well as resistance to solvent, heat, and scratching (see U.S. Pat. No. 7,465,498 (Pickett et al.); U.S. Patent Publication No. 2004/0230019 (Brandenburg)). Also noteworthy is that $P_\beta$MMBL and its copolymers show excellent optical properties and heat resistance, being superior core materials in plastic optical fibers. However, stereoselective polymerization of racemic monomers of this class has not been reported.

Recognizing the high reactivity of methylene butyrolactones, which makes them resemble more to acrylates than to methacrylates, and the notable success and advantage of REM catalysts for the polymerization of acrylates, the inventions studied the coordination polymerization of MBL and $_\gamma$MMBL using REM catalysts such as half-sandwich REM dialkyls [1,3-$(SiMe_3)_2C_9H_5$]RE($CH_2SiMe_3)_2$(THF) (RE=Sc, Y, Dy, Lu) and sandwich samarocene $Cp^*_2Sm$ (THF)$_2$. Half-sandwich REM dialkyls are described by Chen and coworkers (*Macromolecules* 2010, 43, 9328) and sandwich samarocenes are also described by Chen and coworkers (Miyake et al., *Dalton Trans.* 2010, 39, 6710).

Figure 3:
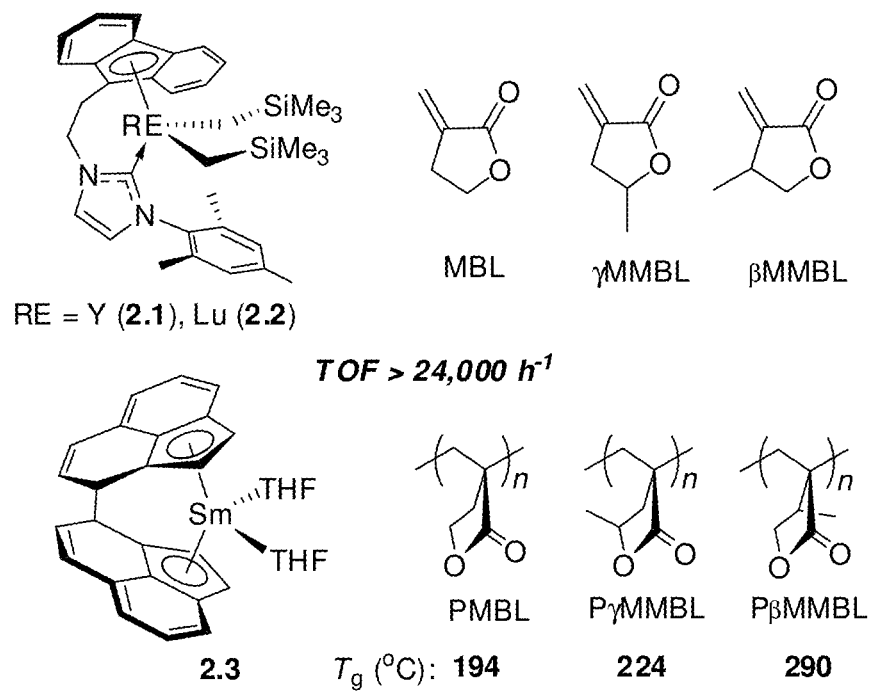
FIG. 3. Chemical structures of ansa-REM catalysts, methylene butyrolactone monomers, and resulting polymers.

While investigating effects of ansa-bridging, NHC donor, and $C_2$-chiral ligation on such polymerizations, the polymerizations by their bridged ansa-derivatives were studied: ethylene-bridged, NHC-functionalized half-sandwich $C_2H_4$(Flu-NHC)RE($CH_2SiMe_3)_2$ (RE=Y, 2.1; Lu, 2.2) (Wang and Cui, *Macromolecules* 2008, 41, 1983) and $C_2$-symmetric ansa-samarocene 2.3 (Fedushikin et al., *Angew. Chem. Int. Ed.* 2001, 40, 561) (see Scheme B1 and FIG. 3). Reported herein are four major advancements/findings in the field: (a) exceptional activity in the polymerization of $_\gamma$MMBL (0.25 mol % catalyst, 100% conversion, <1 min); (b) the first coordination polymerization of $_\beta$MMBL (which also proceeds rapidly); (c) the first synthesis of stereoregular $P_\beta$MMBL (91% mm) directly from the racemic monomer at RT; and (d) extremely high $T_g$ (290° C.) and excellent resistance to heat and common organic solvents shown by the resulting isotactic $P_\beta$MMBL.

Scheme B1. Structures of methylene butyrolactone monomers and resulting polymers.

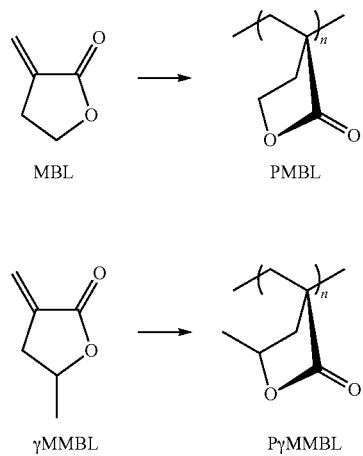

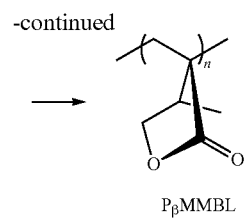

Ansa-half-sandwich REM catalysts supported by the ethylene-bridged Flu-NHC ligand, such as 2.1 (Y) and 2.2 (Lu) illustrated in FIG. 1B, exhibit exceptional activity for the polymerization of racemic $_\gamma$MMBL. The polymerizations can be carried out at room temperature (~23° C.) in polar organic solvents such as DMF. These conditions rapidly provide substantially 100% monomer conversion, for example, less than 1 minute with a high TOF of >24,000 h$^{-1}$. This TOF value represents a rate enhancement, by a factor of 8, 22, or 2400, over the polymerizations by unbridged samarocene $Cp^*_2Sm$ (THF)$_2$, bridged ansa-samarocene 2.3 (Scheme B2), or the corresponding REM trialkyls without the ansa-Flu-NHC ligation, respectively.

Scheme B2. bridged ansa-samarocene 2.3.

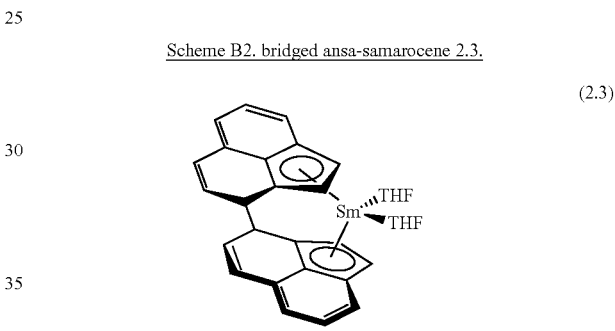

Kinetic experiments demonstrated first-order dependence on both [M] and [REM]. Chain-end group analysis of the $P_\gamma$MMBL produced by 2.1 showed that the polymerization in DMF was initiated by the dimethylamide and hydride groups, formed by the rapid reaction of the starting hydrocarbyl complex with the solvent DMF. Addition of excess organo acid 3-methyl-2-butanone (e.g., 1 to about 50 equiv, or 10 to about 100 equiv, relative to the catalyst) to the $_\gamma$MMBL polymerization by 2.1 in DMF at RT enhances the catalyst efficiency by one to several factors (e.g., 2.5) over the same polymerization without the organo acid.

Catalyst 1 is also highly active for the polymerization of other racemic butyrolactone compounds at RT, such as racemic $_\beta$MMBL, thereby providing coordination polymerization of $_\beta$MMBL and its copolymerization with $_\gamma$MMBL. The resulting products, such as $P_\beta$MMBL, can be highly stereoregular (for example, greater than about 90% mm). The materials can be thermally robust and resistant to common organic solvents at ambient or elevated temperature. For example, $P_\beta$MMBL prepared by these methods exhibits an extremely high $T_g$ of 290° C.

Thus, in certain embodiments, two ansa-half-sandwich rare-earth metal (REM) dialkyl complexes supported by an ethylene-bridged fluorenyl (Flu)-N-heterocyclic carbene (NHC) ligand, $C_2H_4(\eta^5$-Flu-$\kappa^1$-NHC)RE($CH_2SiMe_3)_2$ (RE=Y, 2.1; Lu, 2.2), and a chiral ansa-sandwich samarocene incorporating a $C_2$-ligand, $(\eta^5$-$C_{12}H_8)_2$Sm(THF)$_2$ (2.3), can be used for the coordination-addition polymerization of renewable methylene butyrolactones, such as α-methylene- γ-butyrolactone (MBL) and γ-methyl-α-methylene-γ-butyrolactone (γMMBL). The ansa-half-sandwich complexes 2.1 and 2.2 exhibit exceptional activity for the polymerization of γMMBL at room temperature (RT) in DMF. Low catalyst loading, such as 0.1 mol % to 1 mol % can be employed with efficient conversions and TOFs. For example, with a 0.25 mol % catalyst loading, quantitative monomer conversion can be achieved under 1 minute, thus providing a high turn-over frequency (TOF), for example, of greater than 20,000 h$^{-1}$. Thus, the methods herein provide increased rate enhancements, for example, by a factor of 8, 22, or 2400, over the polymerizations by unbridged samarocene Cp*$_2$Sm(THF)$_2$, by bridged ansa-samarocene 2.3 with C$_2$-ligation, or by the corresponding REM trialkyls without the ansa-Flu-NHC ligation.

Complexes 2.1 and 2.2 are also highly active for the polymerization of β-methyl-α-methylene-γ-butyrolactone ($_\beta$MMBL). The resulting P$_\beta$MMBL homopolymer can be highly stereoregular (e.g., greater than 80% or greater than 90% mm) and cnsa exhibit a high T$_g$, for example, greater than 280° C., or in a range of about 280° C. to 300° C.

Thus, the invention provides a method to polymerize α-methylene-γ-butyrolactone monomers such as β-methyl-α-methylene-γ-butyrolactone ($_\beta$MMBL) or α-methyl-α-methylene-γ-butyrolactone ($_\alpha$MMBL). The polymerization can be carried out by contacting the monomer and a suitable and effective amount of a rare earth metal catalyst, such as a complex of Formula (B):

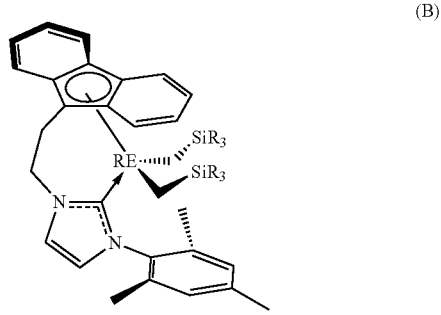

(B)

wherein RE is Y or Lu; and each R is independently alkyl or aryl or another suitable silyl substituent. The polymerization results in the formation of the corresponding polymers, for example, poly(β-methyl-α-methylene-γ-butyrolactone) (P$_\beta$MMBL) or poly(α-methyl-α-methylene-γ-butyrolactone) (P$_\alpha$MMBL). In various embodiments, the polymer product, such as P$_\beta$MMBL, is highly isotactic at the quaternary carbon, comprising at least 90% isotactic triads.

The method can be carried out at any suitable temperature. However, the polymerization can be effectively carried out at room temperature, or at a temperature of less than about 30° C.

The monomers can be racemic, thus various embodiments, the β-methyl-α-methylene-γ-butyrolactone ($_\beta$MMBL) is racemic, and/or the α-methyl-α-methylene-γ-butyrolactone ($_\alpha$MMBL) is racemic. The products can be highly isotactic.

The method can be highly efficient, wherein greater than about 99% of the monomers are polymerized in less than one minute, for example, when at least about 0.033 mol % of catalyst is used, with respect to the monomer. The reaction also provides product polymers having high T$_g$. For example, the T$_g$ of the P$_\beta$MMBL prepared can have a T$_g$ of at least 280° C.

In addition to the above described embodiments, other REM catalysts may be utilized in the polymerization methods described herein. For example, catalysts can be employed where Y or Lu in catalysts of Formula (B) or FIG. 1B is replaced by other Group 3 or lanthanide (rare earth) metals to provide new metal complexes. Examples of these alternate metals include Group 3 and Lanthanide (Rare Earth) metals such as Sc, La, Ce, Pr, Nd, Sm, Eu, Gd, Tb, Dy, Ho, Er, or Yb.

Other half-sandwich (half-metallocene) systems may also be utilized in the polymerization methods described herein. Examples include Cp*RE-X$_2$; where RE is a rare earth metal; X is anionic ligand such as hydride, alkyl, silylalkyl, silylamide, enolate, or the like; and Cp*=η$^5$-cyclopentadienyl (Cp); substituted derivatives of Cp* of may also be employed. For example, a Cp* ligand can be mono, di, tri, tetra, or penta-substituted, with substituents such as R— (alkyl or aryl) or RX— (where X is a heteroatom such as O, N, S, P, or Si); a Cp* ligand can also be η$^3$- or η$^5$-bonded indenyl, substituted indenyl, fluorenyl, or substituted fluorenyl ligands, with single or multiple substituents on the indenyl or fluorenyl ring. Functional groups such as N-heterocyclic carbenes, amides, amines or alkoxides bonded to Cp* can also be bonded to the RE metal center (i.e., as a bridged system).

Sandwich (metallocene) systems may also be utilized in the polymerization methods described herein. Examples include Cp*$_2$RE-X, where RE, X, and Cp* are as described above. The two Cp* ligands can be the same or different.

Ansa-metallocene systems may also be utilized in the polymerization methods described herein. Examples include Cp*$_2$RE-X, where the two Cp* ligands are either directly linked or bridged by a bridging moiety such as —C$_2$H$_4$—, R$_2$C<, R$_2$Si<, or other alkyl or heteroatom bridges. These molecules can adopt various symmetries such as C$_2$, C$_{2v}$, C$_1$, and C$_s$.

Non-metallocene systems may also be utilized in the polymerization methods described herein. Examples include LRE-X$_2$, where L is a non-Cp-containing mono- or di-anionic ligand such as amide (e.g., —NR$_2$ where R is alkyl, benzyl, or aryl), pyridyl, phosphino, N-heterocyclic carbene, alkoxide (e.g., methoxide), and aryloxy (e.g., phenoxide) based ligands. Other examples include non-metallocene systems L$_2$RE-X$_2$, where L is a non-Cp-containing mono- or di-anionic ligand, as described above. Additional non-metallocene catalyst systems include RE(X)$_3$, where X is alkyl, amide, alkoxy, or aryloxy groups, such as —CH$_2$SiMe$_3$, —N(CH$_2$SiMe$_3$)$_2$, —N(SiMe$_3$)$_2$, —O-alkyl, and —OAr.

Further methods, details, techniques, and embodiments are described below in Example 2.

C. Stereoselectivity in Metallocene-Catalyzed Coordination Polymerization

The invention also provides polymers and methods for obtaining high stereoselectivity in metallocene-catalyzed coordination polymerization. The methods described herein are particularly applicable to the polymerization of renewable methylene butyrolactones, and can be used to prepare stereo-random polymers, stereo-enriched polymers, and stereo-perfect polymers.

The inventors have investigated the polymerization catalysis of polar alkenes such as renewable methylene butyrolactones (Zhang and Chen, Angew. Chem. Int. Ed. 2012, 51, 2465-2469), including naturally occurring α-methylene-γ-butyrolactone (MBL) and plant biomass-derived γ-methyl-α-methylene-γ-butyrolactone (γMMBL). Several metal-based and organic catalyst systems exhibit remarkably high activity in converting such polar feedstocks into medium to high molecular weight polymers; however, the resulting polymers are essentially atactic, amorphous materials.

To achieve any appreciable level of stereoselectivity in this polymerization, attention was turned to chiral, single-site Group 4 metallocenium catalysts due to their demonstrated precision in the catalyst-site stereochemical control manifested in the coordination polymerization of both nonpolar alkenes and polar (conjugated) alkenes (see Chen, *Chem. Rev.* 2009, 109, 5157-5214). Initial studies revealed a significant challenge in achieving stereochemical control in the polymerization of such small, cyclic monomers containing a highly reactive exocyclic C=C double bond. For example, highly stereospecific zirconocenium catalysts, which readily produce highly syndiotactic and isotactic polymers in the polymerization of the linear analogue methyl methacrylate (MMA), yielded only syndio-biased or iso-biased atactic polymers.

Described herein is the discovery of the formation of highly isotactic to perfectly isotactic polymers derived from the polymerization of β-methyl-α-methylene-γ-butyrolactone ($_\beta$MMBL) by $C_2$-symmetric zirconocenium catalysts. The synthesis of $_\beta$MMBL and its polymerizations by a radical process (Pittman and Lee, *Polym. Sci. Part A. Polym. Chem.* 2003, 41, 1759-1777) has been reported, and a lanthanide catalyst-mediated synthesis was described above in Example 2 (see also, Hu et al., *Chem. Eur. J.* 2012, 18, 3345-3354). The monomer $_\beta$MMBL can also be prepared from 3-methyl-γ-butyrolactone, available from hydrogenation of the biomass-derived itaconic acid (Geilen et al., *Angew. Chem. Int. Ed.* 2010, 49, 5510-5514). This disclosure further describes various stereocontrol mechanisms governing these new polymerization reactions catalyzed by chiral metallocenes.

Two prototype $C_2$-ligated zirconocenium catalysts (FIG. 1C), rac-(EBI)Zr$^+$(THF) [OC(O$^i$Pr)=CMe$_2$][MeB(C$_6$F$_5$)$_3$]$^-$ (Zr catalyst 1, EBI=C$_2$H$_4$(η$^5$-indenyl)$_2$) and rac-(EBDMI)Zr$^+$(THF) [OC(O$^i$Pr)=CMe$_2$][MeB(C$_6$F$_5$)$_3$]$^-$ (Zr catalyst 2, EBDMI=C$_2$H$_4$(η$^5$-4,7-dimethylindenyl)$_2$) were employed for initial investigations. Additional details of these catalysts and reactions are described below in Example 3. Scheme C1 shows the conversion of three monomers to three corresponding polymers, according to various embodiments of the invention.

Scheme C1. Monomers and Polymer Products.

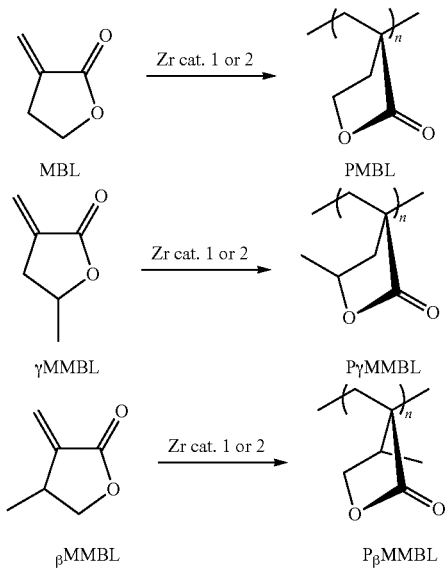

Polymerization of the parent MBL by either catalyst in CH$_2$Cl$_2$ at room temperature (RT; ~23° C.) was active, but with a low turn-over frequency (TOF) of ≤10 h$^{-1}$ and a low polymer yield of ≤40% (entries 1-2, Table C1). The resulting PMBL polymers had medium molecular weights and molecular weight distributions: number-average molecular weight (M$_n$)=17.4 kg/mol, polydispersity index (PDI)=1.39 by 1, and M$_n$=20.1 kg/mol, PDI=1.30 by 2. Surprisingly, the polymer is either an iso-biased atactic material (mm=42.0%, mr=30.5%) by 1, or a syndio-biased material (rr=47.4%, mr=35.5%) by 2, clearly indicating the inability of such chiral catalysts to exert site-control in this polymerization. The glass-transition temperatures (T$_g$) of 195° C. (entry 1) is identical to the atactic PMBL produced by radical polymerization.

TABLE C1

Selected Results of Polymerization by Zr Catalysts 1 and 2 in CH$_2$Cl$_2$ at 25° C.

| entry no. | monomer (M) | catalyst (cat) | [M]/[cat] ratio | time (min) | yield (%) | TOF (h$^{-1}$) |
|---|---|---|---|---|---|---|
| 1 | MBL | 1 | 125 | 300 | 40.2 | 10 |
| 2 | MBL | 2 | 400 | 1440 | 28.3 | 3.3 |
| 3 | $_\gamma$MMBL | 1 | 400 | 60 | 90.0 | 360 |
| 4 | $_\gamma$MMBL | 2 | 400 | 60 | >99 | 400 |
| 5 | $_\beta$MMBL | 1 | 245 | 60 | >99 | 245 |
| 6 | $_\beta$MMBL | 2 | 100 | 60 | >99 | 100 |
| 7 | (R)-$_\beta$MMBL | 1 | 200 | 60 | >99 | 200 |

| entry no. | monomer (M) | M$_n^a$ (kg/mol) | PDI$^a$ (M$_w$/M$_n$) | [mm]$^b$ (%) | [mr]$^b$ (%) | [rr]$^b$ (%) | T$_g^c$ (° C.) |
|---|---|---|---|---|---|---|---|
| 1 | MBL | 17.4 | 1.39 | 42.0 | 30.5 | 27.5 | 195 |
| 2 | MBL | 20.1 | 1.30 | 17.1 | 35.5 | 47.4 | 196 |
| 3 | $_\gamma$MMBL | 60.5$^d$ | 1.41 | 22.8 | 42.4 | 34.8 | n.d. |
| 4 | $_\gamma$MMBL | 64.5 | 1.14 | 12.7 | 41.8 | 45.5 | 227 |
| 5 | $_\beta$MMBL | n.d. | n.d. | >99 | — | — | n.d. |
| 6 | $_\beta$MMBL | n.d. | n.d. | 95.2 | 3.8 | 1.0 | 288 |
| 7 | (R)-$_\beta$MMBL | n.d. | n.d. | >99 | — | — | n.d. |

$^a$Measured by GPC in DMF relative to PMMA standards. M$_n$ and PDI of the resulting highly isotactic P$_\beta$MMBL were not determined (n.d.) due to its insolubility in common GPC solvents.
$^b$Polymer tacticity (quaternary carbon, rr, mr, mm) measured by $^{13}$C NMR.
$^c$Measured by DSC.
$^d$A small high molecular weight shoulder was visible.

Moving on to $_\gamma$MMBL, nearly all aspects of the polymerization were drastically enhanced, except for stereoselectivity. Nonetheless, the polymerization by both catalysts was rapid, achieving high to quantitative polymer yields within 1 hour and producing P$_\gamma$MMBL with M$_n$=60.5 kg/mol, PDI=1.41 by 1 (entry 3) and M$_n$=64.5 kg/mol, PDI=1.14 by 2 (entry 4). However, the polymers were still essentially atactic, amorphous materials with mr=42% by 1 or 2, again indicating the non-stereoselectivity of such chiral catalysts. The T$_g$ of 227° C. (entry 4) is the same as that reported for the atactic P$_\gamma$MMBL produced by other catalyst or initiator systems.

Figure 4A:
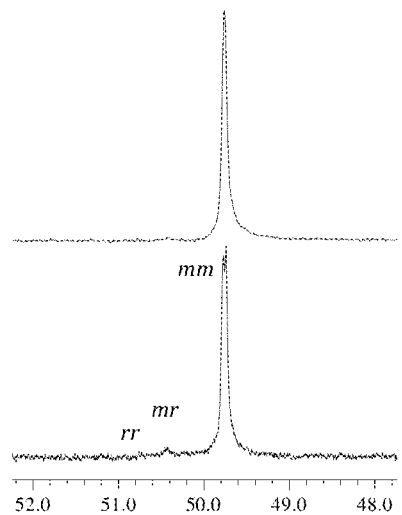
FIG. 4. A) Overlay of $^{13}C$ NMR (trifluoroacetic acid (TFA)-$d_1$, 125 MHz, 70° C.) spectra of $P_\beta$MMBL produced by catalyst 1 (top, entry 5; Table C1) and catalyst 2 (bottom, entry 6; Table C1), in the backbone quaternary carbon (m, mr, m) region. B) Overlay of $^{13}C$ NMR (TFA-$d_1$, 125 MHz, 70° C.) spectra of $P_\beta$MMBL produced by AIBN (top) and catalyst 1 (bottom, entry 5; Table C1), in the carbonyl carbon pentad region.
Figure 4B:
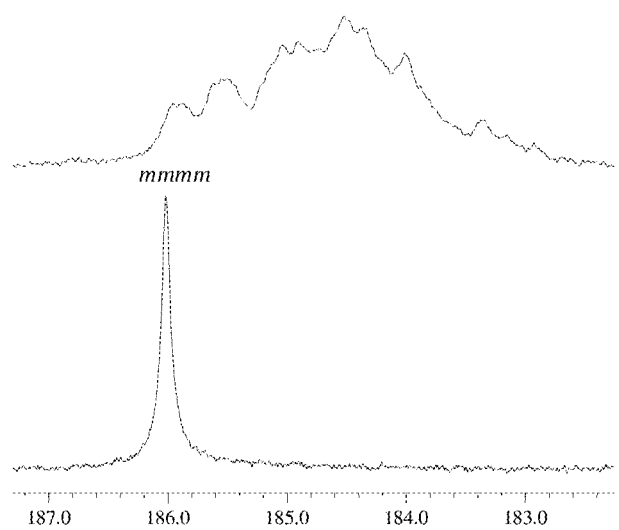

Switching from $_\gamma$MMBL to $_\beta$MMBL maintained high polymerization activity of both catalysts (entries 5-6), but most remarkably, a highly isotactic polymer (mm=95.2% by 2) or a perfectly isotactic polymer (mmmm>99% by 1) was produced. FIG. 4A depicts an overlay of $^{13}$C NMR spectra (125 MHz) of P$_\beta$MMBL produced by 1 and 2 (top and bottom, respectively) in the backbone quaternary carbon triad region, while FIG. 4B shows an overlay of $^{13}$C NMR spectra of P$_\beta$MMBL produced by AIBN and 1 (top and bottom, respectively) in the carbonyl carbon pentad region. The assignments of the quaternary carbon triads were based on those established for P$_\gamma$MMBL (Miyake et al., *Macromol-* ecules 2010, 43, 4902-4908; Suenaga et al., *Macromolecules* 1984, 17, 2913-2916), but were also confirmed by isotactic polymer derived from enantiopure monomers.

Figure 5:
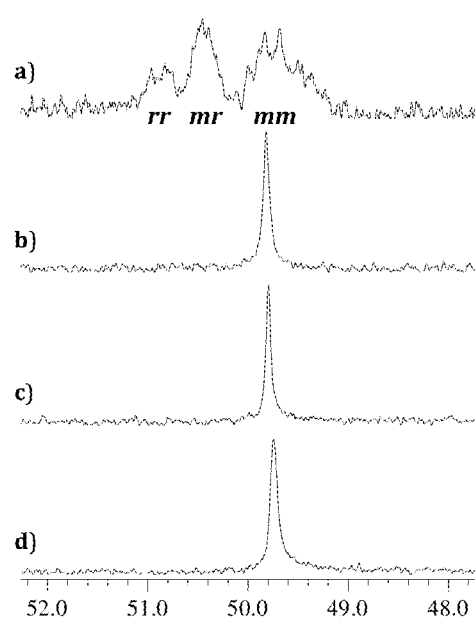
FIG. 5. Overlay of $^{13}C$ NMR (TFA-$d_1$, 75 MHz, 70° C.) spectra of $P_\beta$MMBL produced by AIBN (a) and catalyst 1 (b), and P[(R)-$_\beta$MMBL] produced by AIBN (c) and catalyst 1 (d), in the backbone quaternary carbon (m, mr, m).
Figure 6:
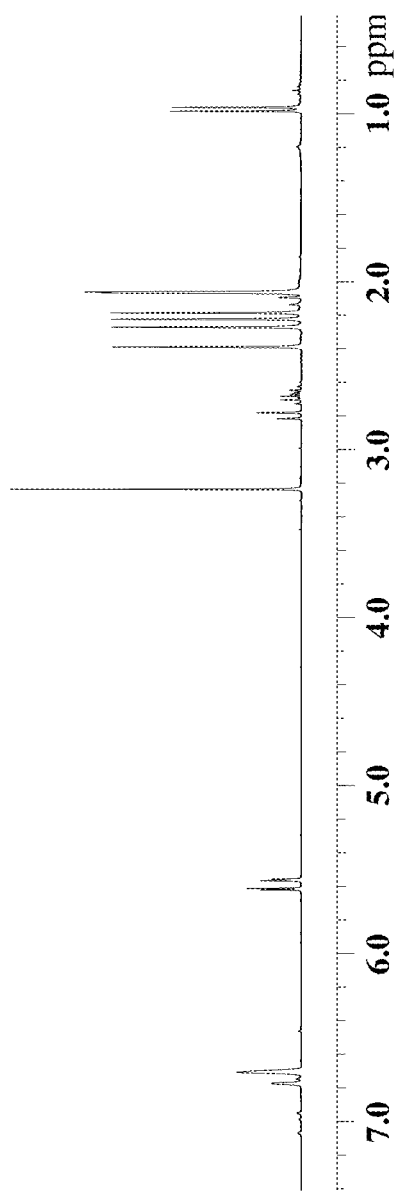
FIG. 6. $^1$H NMR spectrum (C$_7$D$_8$, 23° C.) of the single-addition product 1 (Scheme A2).

FIG. 5 displays the triad regions of atactic (a) and isotactic (b) $P_\beta MMBL$ from polymerization of racemic $_\beta MMBL$ by AIBN and 1, respectively, and isotactic P[(R)-$_\beta MMBL$] from polymerization of enantiopure (R)-$_\beta MMBL$ with AIBN (c) and 1 (d, entry 7). In sharp contrast to atactic $P_\beta MMBL$ prepared by AIBN initiated radical polymerization, which is soluble in common organic solvents such as N,N-dimethyl formamide, dimethyl sulfoxide, and acetonitrile, even at RT, the resulting highly isotactic $P_\beta MMBL$ is insoluble in the above or other common organic solvents, including dichlorobenzene, at RT or refluxing temperatures. This observation shows excellent solvent resistance of isotactic $P_\beta MMBL$, including insolubility in numerous organic solvents, even at refluxing temperatures. The high $T_g$ value of 288° C. (entry 6) is similar to that observed for the $P_\beta MMBL$ produced by a lanthanide catalyst (see Example 2, above).

It is striking that the same chiral catalysts polymerized MBL and $_\gamma MMBL$ into stereo-random polymers, but $_\beta MMBL$ into highly isotactic or perfectly isotactic polymers. To understand the stereocontrol mechanism governing these polymerization reactions, computational studies of these reactions were performed using the Amsterdam Density Functional (ADF) program (ADF2010, *Theoretical Chemistry, Vrije Universiteit, Amsterdam,* 2010, Users' Manual; Baerends et al., *Chem. Phys.* 1973, 2, 41-51) and following the procedures described previously for MMA polymerization by the Me$_2$C< bridged zirconocenium catalysts (Caporaso and Cavallo, *Macromolecules* 2008, 41, 3439-3445).

Starting from the MBL polymerization by 1 with an R,R-coordinated EBI ligand, eight transition states (TSs) were computed (see Example 3), considering both prochiral faces (re and si) of the growing chain, geometries where the O atoms of five-membered rings of the monomer and of the chain are located on the opposite (trans) or on the same (cis) side of the metallocene equatorial belt, and g$^+$ and g$^-$ conformations of the metallocene ethylene bridge. Concisely, in the case of MMA polymerization by (R,R)-1 (FIG. 1C), the most stable TSs present a trans disposition of the methoxy groups of monomer and chain, and a g$^-$ conformation on the EBI bridge. The overall selectivity in favor of the re face of the growing chain for MMA addition was calculated to be 4.1 kcal/mol (see, Chen et al, *J. Am. Chem. Soc.* 2012, 134, 7278-7281), in agreement with the high isotacticity (~95% mm) of PMMA achieved experimentally (Rodriguez-Delgado and Chen, *Macromolecules* 2005, 38, 2587-2594).

In contrast, in the polymerization of MBL the five membered rings of the monomer and chain prefer a cis orientation and addition at the si face of the growing chain is favored by only 1.3 kcal/mol over addition at the re face, thus being marginally stereoselective and conforming to the experimental data. The different behavior of MBL vs. MMA indicates that the cis orientation adopted by the less encumbered five-membered lactone rings of MBL does not interact significantly with the metallocene skeleton (Chen et al, *J. Am. Chem. Soc.* 2012, 134, 7278-7281).

For polymerization of racemic $_\beta MMBL$, addition of both R and S $_\beta MMBL$ to an R or S growing chain were considered, where R and S refer to the configuration of the last inserted $_\beta MMBL$ unit on an (R,R)-1 catalyst. For competitive TS geometries for both R and S chains, calculations indicate that, in case of an R chain, addition of another R $_\beta MMBL$ molecule on the re-face of the growing chain is clearly favored. Competition is created with addition of an S $_\beta MMBL$ molecule on the re-face, which is disfavored by 3.5 kcal/mol ($\Delta E_{S\text{-}R}$) due to steric repulsion between the β-Me groups of the chain and the monomer, and with addition of an S $_\beta MMBL$ molecule on the si-face, which is disfavored by 4.0 kcal/mol ($\Delta E_{si\text{-}re}$) as a result of steric interaction within the growing chain. By similar analysis, in the case of an S chain, addition of another S $_\beta MMBL$ molecule on the si-face of the growing chain is favored over addition of an R $_\beta MMBL$ molecule on the si-face by 4.1 kcal/mol. Addition of R $_\beta MMBL$ on the re-face of an S chain is disfavored by at least 6.8 kcal/mol.

In short, calculations indicate that for the R,R-ligated EBI catalyst the R chain clearly favors addition of another R $_\beta MMBL$ molecule on the re-face of the chain, while the S chain clearly favors addition of another S $_\beta MMBL$ molecule on the si-face of the chain. As the calculation yielded a high re over si and R over S selectivity for an R chain, and a high si over re and S over R selectivity for an S chain, the resulting $P_\beta MMBL$ should display a high regularity in the sequence of the configurations of the chiral β-C atom of the 5-membered ring, and should be highly isotactic. In fact, for both chains a $\Delta E_{stereo}$ of 4 kcal/mol was calculated, which corresponds to >99% of mmmm pentads at 25° C., in agreement with experimental results.

In sharp contrast to the computational results on $_\beta MMBL$ addition, similar calculations for $_\gamma MMBL$ clearly show that no selectivity is calculated for addition of an R or S $_\gamma MMBL$ on the R growing chain, with all the TS within 0.8 kcal/mol, and the most stable TS corresponding to addition of an S $_\gamma MMBL$ at the re face of an R chain. In case of an S chain, $_\gamma MMBL$ addition on the si face is somewhat favored, but there is no selectivity between additions of an R or S $_\gamma MMBL$.

In short, $_\gamma MMBL$ addition at both S and R chains is non-stereoselective, which is also in agreement with the experimental results. The steric interactions involving the monomer, the chain and the ligand, which are responsible of the high selectivity of $_\beta MMBL$ addition became negligible in the case of $_\gamma MMBL$ addition. This outcome is due to the fact that the γ-Me substituents protrude away from the reaction center, whereas the β-Me substituents are well located in the area where the C—C bond forming step occurs.

In summary, this disclosure demonstrates that renewable α-methylene-γ-butyrolactones can be readily converted into the corresponding polymers through coordination polymerization by chiral metallocenium catalysts, but the resulting polymer stereochemistry spans from stereo-random to stereo-perfect. Specifically, the polymerization of MBL and $_\gamma MMBL$ by two prototype C$_2$-zirconocenium catalysts (1 and 2) leads to atactic polymers, whereas the polymerization of $_\beta MMBL$ by 1 and 2 affords highly isotactic and perfectly isotactic polymers, respectively. Computational studies on the competitive monomer addition TS geometries have revealed that steric interactions involving the monomer, the chain, and the catalyst ligand are responsible for achieving or lacking the observed stereocontrol. In the case of $_\beta MMBL$ polymerization by the R,R-ligated EBI catalyst, the TS corresponding to S chain/S monomer/si facial addition is clearly favored for an S chain. Likewise, for an R chain the R chain/R monomer/re facial addition is clearly favored, thereby rationalizing highly isotactic polymer formation. In contrast, in the case of MBL or $_\gamma MMBL$ addition, such steric interactions become negligible, thus rendering the polymerization non-stereoselective by the current catalyst system.

The invention thus provides a highly isotactic polymers of Formula (I):

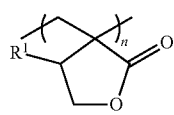
(II)

wherein n is about 10 to about 45,000 (e.g., a molecular weight of about 1.25 kDa to about 5,000 kDa); and $R^1$ is $(C_1-C_6)$alkyl (e.g., methyl, ethyl, straight or branched propyl, straight or branched butyl (e.g., tert-butyl or iso-butyl), straight or branched pentyl, or straight or branched hexyl), cycloalkyl, aryl (e.g., phenyl), or benzyl. In one embodiment, each of the carbons having substituent $R^1$ has an (R) stereochemical configuration. In another embodiment, each of the carbons having substituent $R^1$ has an (S) stereochemical configuration. In various embodiments, the invention provides a composition that includes both the (R) and (S) polymers. The polymer of Formula (I) can include at least 90% isotactic triads with respect to the quaternary carbons of the polymer chain. Typically, n is about 40 to about 1,000, or about 80 to about 900, but larger polymers can be prepared using longer reaction times, and/or higher catalyst loading, etc.

The polymers of Formula (I) can include at least 95% isotactic triads, at least 98% isotactic triads, at least 99% isotactic triads, or at least 99.9% isotactic triads at the quaternary carbon of the polymer main chain. In some embodiments, the polymer of Formula (I) can comprise at least 90% isotactic pentads, at least 95% isotactic pentads, at least 98% isotactic pentads, or at least 99% isotactic pentads, with respect to the quaternary carbon of the main chain.

In various embodiments, the glass transition temperature $(T_g)$ of the polymer is at least about 190° C., at least about 200° C., at least about 220° C., at least about 250° C., at least about 260° C., at least about 270° C., at least about 280° C., at least about 285° C., or at least about 290° C. The $T_g$ of the polymer can be as high as about 350° C.

In some embodiments, the polymer is a polymer of Formula (IA), (IB), or (IC):

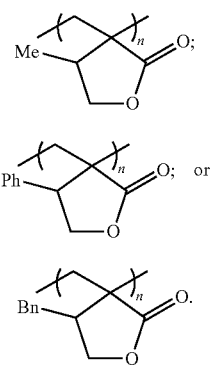

The polymer can be insoluble in water, methanol, toluene, methylene chloride, dichlorobenzene, trichlorobenzene, acetonitrile, THF, DMSO, and DMF at room temperature. Additionally, the polymer can be insoluble in insoluble in 1,2-dichlorobenzene at 180° C., THF at 60° C., DMSO at 100° C., and DMF at 100° C.

In one embodiment, the polymer of Formula (I) is:

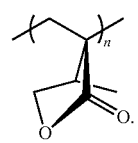
(I-S)

In another embodiment, the polymer of Formula (I) is:

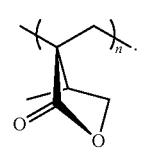
(I-R)

In another embodiment, the invention provides a method for preparing a polymer of Formula (I):

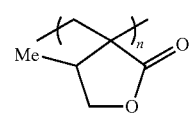
(I)

wherein n is about 40 to about 45,000; and the polymer of Formula (I) is highly isotactic at the quaternary carbon of the polymer chain, comprising at least 90% isotactic triads; the method comprising polymerizing β-methyl-α-methylene-γ-butyrolactone ($_β$MMBL) by coordination polymerization by contacting the $_β$MMBL and a suitable and effective Group 4 catalyst, such as a $C_2$-symmetric zirconocenium catalyst, in an organic solvent system under an inert atmosphere.

Group 4 metals such as Ti, Zr, or Hf can be used as the metal in the catalyst system for the coordination polymerizations described herein. Listed below are the neutral precatalysts, where an activator can be used to generate the corresponding cationic catalysts. Activators are strong Lewis or Bronsted acids or oxidizing agents, such as $B(C_6F_5)_3$, $Al(C_6F_5)_3$, $[Ph_3C][B(C_6F_5)_4]$, $[HNMe_2Ph][B(C_6F_5)_4]$, and $[H(OEt_2)][B(C_6F_5)_4]$, and the like. Examples of neutral precatalysts include:

(a) half-sandwich (half-metallocene) systems: Cp*M-$X_3$, where Cp* and X are as defined above in Section B, and M is Ti, Zr, or Hf;

(b) sandwich (metallocene) systems: Cp*$_2$M-$X_2$, where Cp* and X are as defined above, and M is Ti, Zr, or Hf;

(c) ansa-metallocene systems: Cp*$_2$M-$X_2$, where two Cp* ligands are either directly linked or bridged by a bridging moiety such as —$C_2H_4$—, $R_2$C<, $R_2$Si<, or other alkyl or heteroatom bridges (see, for example, FIG. 1B). These molecules can adopt various symmetries, as described above; and (d) non-metallocene systems: LM-$X_3$, where L is a non-Cp-containing mono- or di-anionic ligand, as described above.

In some embodiments, the $C_2$-symmetric zirconocenium catalyst can be, for example, (1) or (2):

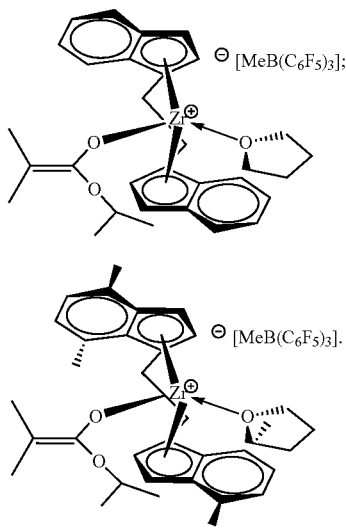

In one embodiment, the $C_2$-symmetric zirconocenium catalyst is (1) and the polymer of Formula (I) comprises at least 99% isotactic pentads. In some embodiment, the polymer has high solvent resistance and insolubility as described above.

Further methods, details, techniques, and embodiments are described below in Example 3.

Polymer Applications

The polymers described herein, including the sustainable, thermally robust and solvent-resisting high-performance bioplastics derived from renewable biomass, can be used in a variety of applications ranging from plastic optical fibers and electronic displays to furniture and automobile parts. Further examples include safety glazing and signage. The polymers described herein can be blended with other polymers. Examples of various applications of the polymers, as well as various blends and copolymers that can be prepared with the polymers described herein are discussed in U.S. Pat. No. 6,992,141 (Brandenburg et al.). The polymers and polymer compositions described herein may additionally comprise other materials commonly found in polymer compositions, such as fillers, reinforcing agents, dyes, pigments, antioxidants, and antiozonants. These materials may be present in conventional amounts (e.g., 0.1 wt. % to about 50 wt. %), which vary according to the type(s) of material(s) being added and their purpose in being added, as would be readily recognized by one of skill in the art.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

General Materials and Methods

Syntheses and manipulations of air- and moisture-sensitive materials were carried out in flamed Schlenk-type glassware on a dual-manifold Schlenk line, on a high-vacuum line, or in an inert gas (Ar or $N_2$)-filled glovebox. NMR-scale reactions were conducted in Teflon-valve-sealed J. Young-type NMR tubes. HPLC-grade organic solvents were first sparged extensively with nitrogen during filling of the solvent reservoirs and then dried by passage through activated alumina (for $Et_2O$, THF, and $CH_2Cl_2$) followed by passage through Q-5 supported copper catalyst (for toluene and hexanes) stainless steel columns. HPLC-grade DMF was degassed and dried over $CaH_2$ overnight, followed by vacuum distillation ($CaH_2$ was removed before distillation) or vacuum transfer (no distillation). Benzene-$d_6$ and toluene-$d_8$ were dried over sodium/potassium alloy and vacuum-distilled or filtered, whereas $CD_3SOCD_3$, $CD_2Cl_2$, $CDCl_3$ and DMSO-$d_6$ were dried over activated Davison 4 Å molecular sieves. NMR spectra were recorded on a Varian Inova 300 (FT 300 MHz, $^1$H; 75 MHz, $^{13}$C), a Varian Inova 400 MHz, or an Inova 500 MHz spectrometer. Chemical shifts for $^1$H and $^{13}$C spectra were referenced to internal solvent resonances and are reported as parts per million relative to tetramethylsilane. Elemental analyses were performed by Desert Analytics, Tucson, Ariz., and by Robertson Microlit Laboratories, Madison, N.J.

Methyl methacrylate (MMA), furfuryl methacrylate (FMA), and 3-methyl-2-butanone (MBO) was purchased from Sigma-Aldrich Chemical Co, while N,N-dimethyl acrylamide (DMAA), α-methylene-γ-butyrolactone (MBL) and γ-methyl-α-methylene-γ-butyrolactone ($_\gamma$MMBL) were purchased from TCI America. These monomers were first degassed and dried over $CaH_2$ overnight, followed by vacuum distillation; MMA was further purified by titration with neat tri(n-octyl)aluminum to a yellow end point and distillation under reduced pressure. Literature procedures were used to prepare the racemic monomer β-methyl-α-methylene-γ-butyrolactone ($_\beta$MMBL) (Hu et al., Chem. Eur. J. 2012, 18, 3345; Pittman and Lee, J. Polym. Sci. Part A. Polym. Chem. 2003, 41, 1759) and the enantiopure monomer (R)-(+)-β-methyl-α-methylene-γ-butyrolactone [(R)-$_\beta$MMBL] (Mattes et al., J. Med. Chem. 1987, 30, 1948). The purified monomers were stored in brown bottles inside a glovebox freezer at –30° C.

Butylated hydroxytoluene (BHT-H) was purchased from Sigma-Aldrich and was recrystallized from hexanes prior to use. N-Heterocyclic carbenes (NHCs), 1,3-bis(2,4,6-trimethyl-phenyl)imidazol-2-ylidene (IMes) and 1,3-di-tert-butylimidazol-2-ylidene (I$^t$Bu), were purchased from Strem Chemical Co. A literature procedures was used to prepare 1,3,4-triphenyl-4,5-dihydro-1H-1,2,4-triazol-5-ylidene (TPT) (Pittman and Lee, Polym. Sci. Part A. Polym. Chem. 2003, 41, 1759).

Example 1

Conjugate-Addition Organopolymerization: Rapid Production of Acrylic Bioplastics by N-Heterocyclic Carbenes In contrast to dimerization (umpolung) of α,β-unsaturated esters (acrylics) by the triazolylidene carbene TPT, the more nucleophilic imidazolylidene carbene IMes forms selectively the single-addition product, while I$^t$Bu, the most nucleophilic carbene of the series, polymerizes acrylics, especially the biomass-derived methylene butyrolactones, producing medium to high molecular weight bioplastics rapidly at ambient temperature (Scheme A1).

Reaction of IMes with MMA.

A Teflon-valve-sealed J. Young-type NMR tube was charged with IMes (33.4 mg, 0.11 mmol) and 0.3 mL of $C_7D_8$. A solution of MMA (11.0 mg, 0.11 mmol, 0.3 mL $C_7D_8$) was added to this NMR tube via pipette at ambient temperature, and the yellow mixture was allowed to react for 10 minutes before NMR analysis, which showed the clean and quantitative formation of the single-addition product (1). Another equivalent of MMA was added to this mixture, but no further reaction was observed after 3 days. All volatiles were removed and the residue was extracted with hexanes. After filtration the resulting clear yellow solution was left in a freezer inside the glovebox. Single crystals suitable for X-ray diffraction were formed after a week. See Scheme A2 and FIG. 2.

Figure 7:
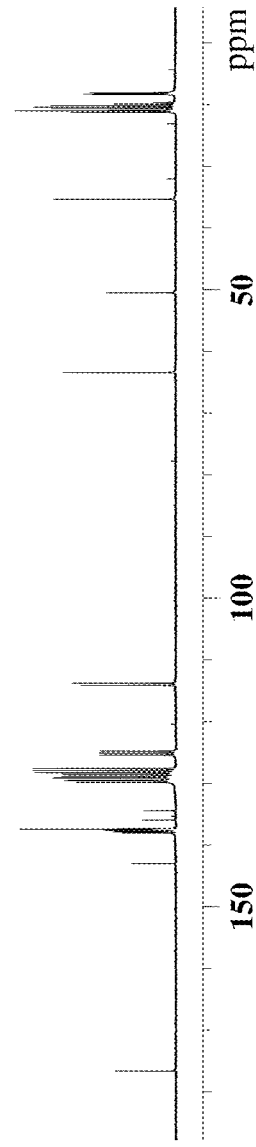
FIG. 7. $^{13}$C NMR spectrum (C$_7$D$_8$, 23° C.) of the single-addition product 1 (Scheme A2).

$^1$H NMR (C$_7$D$_8$, 23° C.) for enamine compound 1: δ 6.77 (s, br, 1H, Ph), 6.71 (s, br, 2H, NHC=CHN), 6.71 (s, br, 1H, Ph), 5.62 (dd, J=2.4 Hz, 1H, Ph), 5.56 (dd, J=2.4 Hz, 1H, Ph), 3.24 (s, 3H, OMe), 2.80 (d, J=10.5 Hz, 1H, =CH), 2.68 (dq, J=10.5 Hz, J=6.9 Hz, 1H, CH), 2.39 (s, 3H, o-MePh), 2.27 (s, 3H, o-MePh), 2.22 (s, 3H, o-MePh), 2.19 (s, 3H, o-MePh), 2.07 (s, 3H, p-MePh), 2.06 (s, 3H, p-MePh), 0.97 (d, J=6.9 Hz, 3H, CHCH$_3$). $^{13}$C NMR (C$_7$D$_8$, 23° C.) for compound 1: δ 176.7 [C(OMe)=O], 143.0, 138.1, 137.9, 137.8, 137.6, 137.5, 137.4, 136.0, 134.5, 129.8, 129.6, 129.5, 129.1, 114.1, 113.8 (Ph, NC=CN, N$_2$C=CH), 63.42 (OMe), 50.49 (CH), 35.34 (CHCH$_3$), 21.27, 21.00, 18.38, 18.30, 18.17, 18.07 (Me-Ph). See FIGS. 7 and 7.

X-Ray Crystallographic Analysis of Single-Addition Product 1.

Single crystals of compound 1 were quickly covered with a layer of Paratone-N oil (Exxon, dried and degassed at 120° C./10$^{-6}$ Torr for 24 hours) after decanting the mother liquor. A crystal was then mounted on a thin glass fiber and transferred into the cold nitrogen stream of a Bruker SMART CCD diffractometer. The structure was solved by direct methods and refined using the Bruker SHELXTL program library (SHELXTL, Version 6.12; Bruker Analytical X-ray Solutions: Madison, Wis., 2001). The structure was refined by full-matrix least-squares on F$^2$ for all reflections. All non-hydrogen atoms were refined with anisotropic displacement parameters, whereas hydrogen atoms were included in the structure factor calculations at idealized positions. Selected crystallographic data for 1: C$_{26}$H$_{32}$N$_2$O$_2$, monoclinic, space group C2/c, a=40.091(5) Å, b=7.8348(9) Å, c=16.111(2) Å, β=113.260(8)°, V=4649.3(10) Å$^3$, Z=8, D$_{calcd}$=1.156 Mg/m$^3$, GOF=1.018, R1=0.0440 [I>2σ(I)], wR2=0.1357. See FIG. 2. CCDC-853379 contains the supplementary crystallographic data for this structure. These data can be obtained free of charge from The Cambridge Crystallographic Data Centre via www.ccdc.cam.ac.uk/data_request/cif.

General Polymerization Procedures.

Polymerizations were performed in 30 mL oven-dried glass reactors inside the glovebox under ambient conditions (ca. 25° C.) or in 25-mL flame-dried Schlenk flasks interfaced to the dual-manifold Schlenk line for runs at other temperatures with an external temperature bath. A predetermined amount of I$^t$Bu (4.2 mg, 23.2 μmol) was first dissolved in 4.5 mL of solvent (DMF, THF, or toluene) inside a glovebox, and the polymerization was started by rapid addition of MMBL (0.5 mL, 200 equiv relative to I$^t$Bu), via a gastight syringe to the above solution under vigorous stirring. For runs in higher [MMBL]/[I$^t$Bu] ratios, i.e., 400 or 800, the amount of the monomer was doubled or tripled, while keeping the amount of constant.

For the polymerizations in the presence of MBO, I$^t$Bu (4.2 mg, 23.2 μmol) was first dissolved in 2.0 mL of DMF inside a glovebox, and the polymerization was started by rapid addition of a mixture of MMBL (0.5 mL, 200 equiv relative to I$^t$Bu) and MBO (10 or 50 equiv relative to I$^t$Bu) in 2.5 mL of DMF to the above solution under vigorous stirring.

After the measured time interval, a 0.2 mL aliquot was taken from the reaction mixture via syringe and quickly quenched into a 4-mL vial containing 0.6 mL of undried "wet" CDCl$_3$ stabilized by 250 ppm of BHT-H; the quenched aliquots were later analyzed by $^1$H NMR to obtain the percent monomer conversion data. The polymerization was immediately quenched after the removal of the aliquot by addition of 5 mL 5% HCl-acidified methanol. The quenched mixture was precipitated into 100 mL of methanol, stirred for 1 hour, filtered, washed with methanol, and dried in a vacuum oven at 50° C. overnight to a constant weight.

The isolated polymers were analyzed by $^1$H or $^{13}$C NMR for tacticity measurements where appropriate (vide infra). The quenched aliquots were analyzed by $^1$H NMR to obtain the percent monomer conversion (1−[M]$_t$/[M]$_o$) data.

For MMA polymerizations, the [M]$_0$/[M]$_t$ ratio at a given time t was determined by integration of the peaks for MMA (5.2 and 6.1 ppm for the vinyl signals; 3.4 ppm for the OMe signal) and PMMA (centered at 3.4 ppm for the OMe signals) according to [M]$_0$/[M]$_t$=2A$_{3.4}$/3A$_{5.2+6.1}$, where A$_{3.4}$ is the total integrals for the peaks centered at 3.4 ppm (typically in the region 3.2-3.6 ppm) and A$_{5.2+6.1}$ is the total integrals for both peaks at 5.2 and 6.1 ppm.

For MMBL polymerizations, the [M]$_0$/[M]$_t$ ratio at a given time t was determined by integration of the peaks for MMBL (5.2 and 5.7 ppm for the vinyl signals; 4.2 ppm for the CH signal) and PMMBL (centered at 4.2 ppm for the CH signals) according to [M]$_0$/[M]$_t$=2A$_{4.2}$/A$_{5.2+5.7}$, where A$_{4.2}$ is the total integrals for the peaks centered at 4.2 ppm (typically in the region 4.0-4.4 ppm) and A$_{5.2+5.7}$ is the total integrals for both peaks at 5.2 and 5.7 ppm.

For MBL polymerizations, monomer percent conversions were calculated by comparing the integration of the vinyl protons of the unreacted monomer to the methyl protons of toluene added as the internal standard.

Polymer Characterizations.

Figure 8:
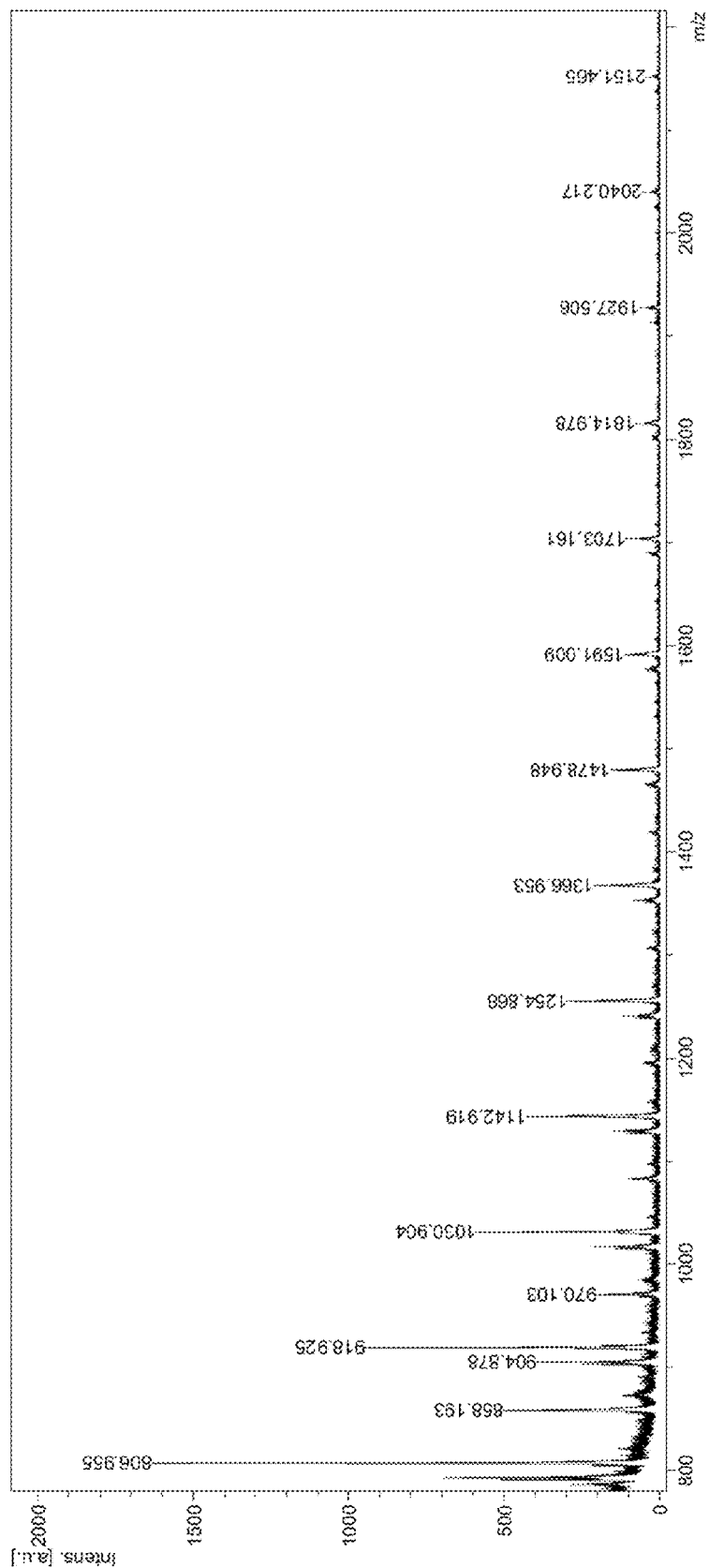
FIG. 8. MALDI-TOF MS spectrum of a low molecular weight MMBL oligomer produced by TPT in toluene at RT.
Figure 9:
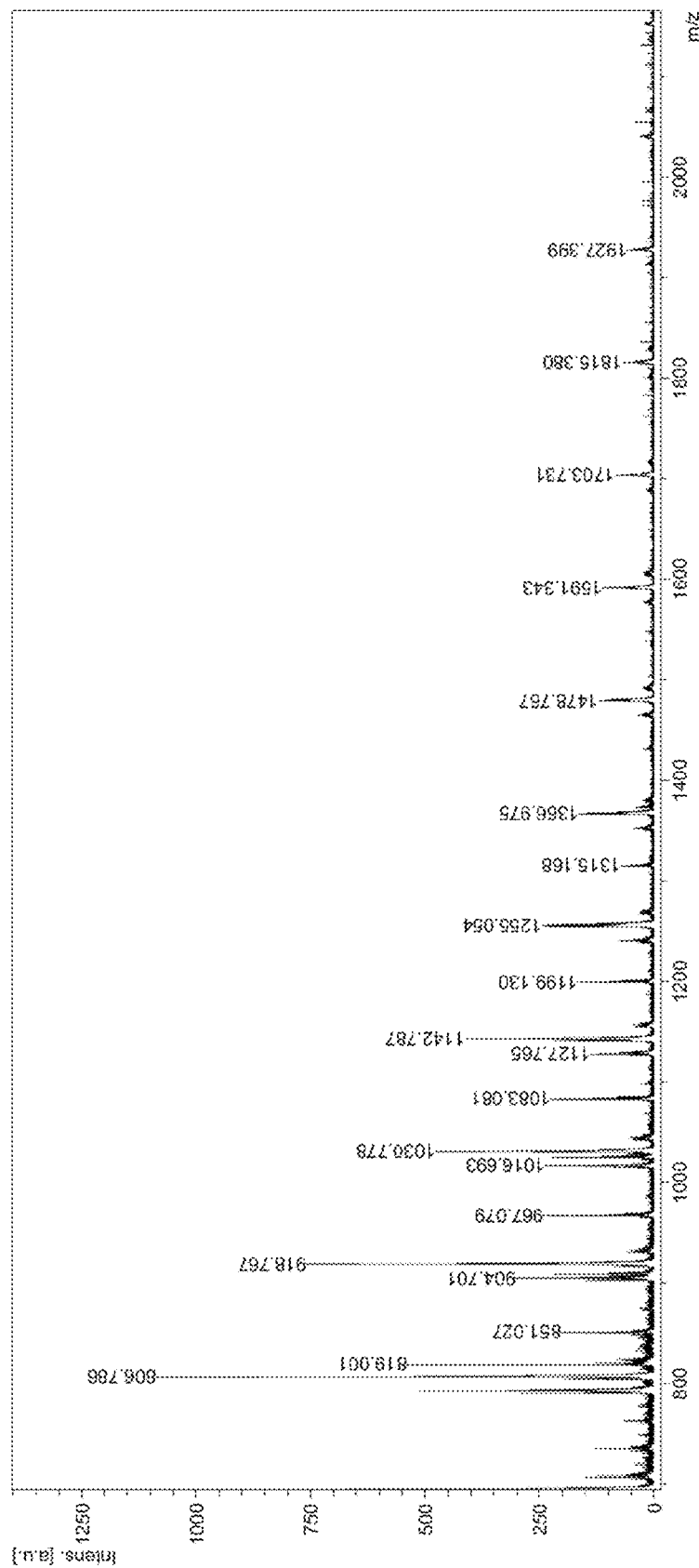
FIG. 9. MALDI-TOF MS spectrum of a low molecular weight MMBL oligomer produced by I$^t$Bu in toluene at RT.

Low-molecular-weight MMBL oligomers produced by TPT and I$^t$Bu in toluene at RT were analyzed by matrix-assisted laser desorption/ionization time-of-flight mass spectroscopy (MALDI-TOF MS). The experiment was performed on an Ultraflex MALDI-TOF mass spectrometer (Bruker Daltonics) operated in positive ion, reflector mode using a Nd:YAG laser at 355 nm and 25 kV accelerating voltage. A thin layer of a 1% NaI solution was first deposited on the target plate, followed by 1 μL of both sample and matrix (2,5-dihydroxy benzoic acid, 10 mg/mL in 50% ACN, 0.1% TFA). External calibration was done using a peptide calibration mixture (4 to 6 peptides) on a spot adjacent to the sample. The raw data was processed in the FlexAnalysis software (version 2.4, Bruker Daltonics). Spectra for the samples produced by TPT and I$^t$Bu were shown in FIG. 8 and FIG. 9, respectively. Plots of m/z values of the major series of peaks in both spectra were made against the number of MMBL repeat units (n). Both plots yielded straight lines with the same slope of 112 (the mass of MMBL).

Figure 10:
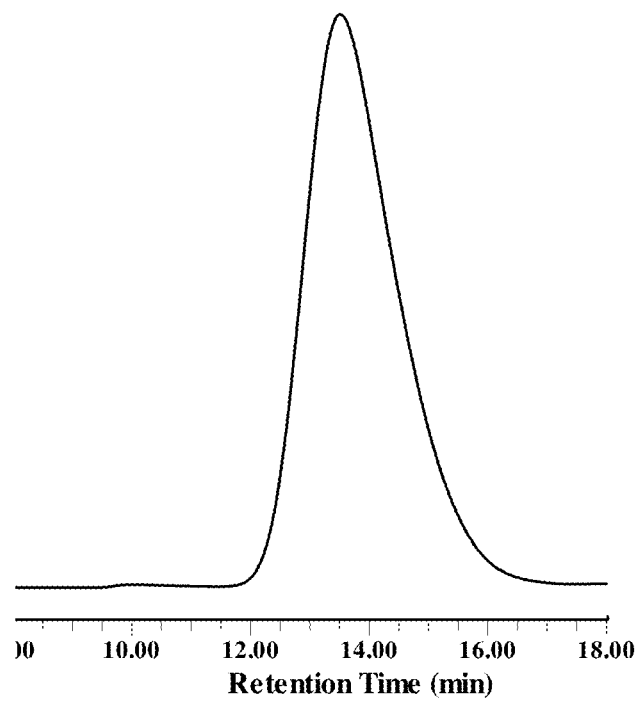
FIG. 10. A representative GPC trace of PMMBL produced by I$^t$Bu in DMF at RT: $M_n$=38.5 kg/mol, PDI=1.68 (run 7, Table A1).

Polymer number (M0 and weight (M$_w$) average molecular weights and polydispersity index (PDI=M$_w$/M$_n$) were measured by gel permeation chromatography (GPC) analyses carried out at 40° C. and a flow rate of 1.0 mL/min with DMF as the eluent, on a Waters University 1500 GPC instrument coupled with a Waters RI detector and equipped with four PLgel 5 μm mixed-C columns (Polymer Laboratories; linear range of molecular weight=200-2,000,000). See FIG. 10. The instrument was calibrated with 10 PMMA standards, and chromatograms were processed with Waters Empower software (version 2002). $^1$H NMR and $^{13}$C NMR spectra for the analysis of PMMA (Rodriguez-Delgado et al., *Macromolecules* 2004, 37, 3092; Bovey et al., *NMR of Polymers*; Academic Press: San Diego, Calif., 1996; Subramanian et al., *Polym. Prepr.* 1985, 26, 238) and PMMBL (Miyake et al., Macromolecules 2010, 43, 4902; Suenaga et al., *Macromolecules* 1984, 17, 2913) microstructures were recorded and analyzed according to the literature methods.

Example 2

Ansa-Rare-Earth Metal Catalysts for Rapid and Stereoselective Polymerizations of Renewable Methylene Methylbutyrolactones Ansa-half-sandwich rare-earth metal catalysts supported by the N-heterocyclic carbene-functionalized fluorenyl ligand exhibit exceptional activity in the coordination polymerization of renewable polymers such as methylene methylbutyrolactones at RT; in the case of the β-methyl derivative, both high activity and stereoselectivity are achieved at RT, producing the corresponding polymer with high stereoregularity as well as excellent resistance to heat and common solvents.

Characteristics of MMA, MBL, and $_\gamma$MMBL Polymerizations.

Initial catalyst screening was performed for MMA polymerization in toluene and DMF at RT with 0.25 mol % catalyst (i.e., [monomer (M)]/[initiator (I)]=400). As can be seen from Table 2.1, the polymerizations in either solvent achieved only modest monomer conversions of <50% up to 24 hours, giving low turn-over frequency (TOF) values of ≤24 h$^{-1}$ (runs 1-5). The polymers produced had syndiotacticity values ranging from 61% rr to 69% rr and relatively broad molecular weight distributions (MWDs) with PDI=1.5-3.5.

These tacticity results are similar to several other types of ansa-lanthanocenes with $C_2$- or $C_s$-symmetry, which produce also syndio-rich (~60% rr) atactic PMMA with modest activity (Chen, *Chem. Rev.* 2009, 109, 5157). Monitoring of the MMA polymerization by catalyst 2.1 (FIG. 1B, RE=Y) revealed that the reaction reached 42% conversion in 10 minutes, at which time the polymerization slowed down drastically and there was no significant further increase in monomer conversion, with only 45% conversion in 60 minutes and 49% conversion in 24 hours. These results show substantial catalyst deactivation occurring after the initial stage of the polymerization. Likewise, MBL polymerizations by all three catalysts did not achieve high conversions (<59%), with low TOFs (runs 6-8).

Exceptional activity, however, was observed for the polymerization of $_\gamma$MMBL in DMF at RT by ansa-half-sandwich catalysts. With 0.25 mol % catalyst, both 2.1 and 2.2 (FIG. 1B) achieved 100% conversion in <1 minute, thus giving a high TOF of >24,000 h$^{-1}$ (runs 9 and 10). This TOF value is comparable to that achieved by the half-sandwich REM catalyst (Hu et al., *Macromolecules* 2010, 43, 9328) and represents a rate enhancement, by a factor of 8, 22, or 2400, over the $_\gamma$MMBL polymerizations by samarocene Cp$^*{}_2$Sm(THF)$_2$ (Miyake et al., *Dalton Trans.* 2010, 39, 6710), ansa-samarocene 3 (run 11), or the corresponding REM trialkyls without the ansa-Flu-NHC ligation, RE(CH$_2$SiMe$_3$)$_3$(THF)$_2$ (RE=Y, Lu; TOF=10 h$^{-1}$), respectively.

The polymerizations by the ansa-half-sandwich catalysts under these conditions were too fast to measure the rate

TABLE 2.1

Selected results of polymerization by ansa-REM (Y, Lu, Sm) complexes.[a]

| run no. | REM | M | [M]/[RE] | solvent | time (min) | conv.[b] (%) | TOF (h$^{-1}$) | $M_n$[c] (kg/mol) | PDI[c] ($M_w/M_n$) | [rr][d] (%) | [mr][d] (%) | [mm][d] (%) |
|---|---|---|---|---|---|---|---|---|---|---|---|---|
| 1 | 2.1 | MMA | 400 | TOL | 1440 | 48.7 | 8 | 31.9 | 3.52 | 61.0 | 31.9 | 7.1 |
| 2 | 2.2 | MMA | 400 | TOL | 1440 | 34.5 | 6 | 45.5 | 2.91 | 68.9 | 28.5 | 2.6 |
| 3 | 2.1 | MMA | 400 | DMF | 1440 | 46.0 | 8 | 30.3 | 2.46 | 62.5 | 34.0 | 3.5 |
| 4 | 2.2 | MMA | 400 | DMF | 1440 | 41.2 | 7 | 30.4 | 3.16 | 61.4 | 35.1 | 3.5 |
| 5 | 2.3 | MMA | 400 | DMF | 210 | (20.6) | 24 | 14.7 | 1.45 | 63.8 | 32.9 | 3.3 |
| 6 | 2.1 | MBL | 400 | DMF | 1440 | 58.2 | 10 | 22.3 | 1.57 | n.d. | n.d. | n.d. |
| 7 | 2.2 | MBL | 400 | DMF | 1440 | 43.5 | 7 | 21.9 | 1.41 | n.d. | n.d. | n.d. |
| 8 | 2.3 | MBL | 182 | DMF | 180 | (40.5) | 25 | (17.7) | 1.14 | n.d. | n.d. | n.d. |
| 9 | 2.1 | $_\gamma$MMBL | 400 | DMF | <1 | 100 | >24000 | 61.7 | 1.78 | n.d. | n.d. | n.d. |
| 10 | 2.2 | $_\gamma$MMBL | 400 | DMF | <1 | 100 | >24000 | 33.9 | 2.49 | n.d. | n.d. | n.d. |
| 11 | 2.3 | $_\gamma$MMBL | 182 | DMF | 10 | 100 | 1090 | (70.7) | 1.26 | 33.1 | 46.5 | 20.4 |
| 12 | 2.1 | $_\gamma$MMBL | 400 | DCM | 16 | 100 | 1500 | 41.2 | 2.79 | 32.5 | 51.4 | 16.1 |
| 13 | 2.2 | $_\gamma$MMBL | 400 | DCM | 50 | 90.2 | 433 | 35.8 | 2.09 | 32.9 | 54.4 | 12.7 |
| 14 | 2.1 | $_\gamma$MMBL | 800 | DCM | 60 | 100 | 800 | 67.9 | 2.49 | n.d. | n.d. | n.d. |
| 15 | 2.1 | $_\gamma$MMBL | 1200 | DCM | 210 | 98.8 | 339 | 71.5 | 2.54 | n.d. | n.d. | n.d. |
| 16 | 2.1 | $_\gamma$MMBL | 1600 | DCM | 300 | 98.2 | 314 | 137 | 2.03 | n.d. | n.d. | n.d. |
| 17 | 2.1 | $_\beta$MMBL | 400 | DCM | 5 | (94) | 4490 | n.d. | n.d. | 2.7 | 6.3 | 91.0 |
| 18 | 2.1 | $_\beta$MMBL | 20 | DCM | <1 | (>99) | n.d. | 0.84 | 1.10 | n.d. | n.d. | n.d. |
| 19 | 2.1 | $_\beta$MMBL/$_\gamma$MMBL | 200/200 | DCM | 720 | (98) | n.d. | 141 | 1.77 | n.d. | n.d. | n.d. |
| 20 | 2.1 | $_\beta$MMBL/$_\gamma$MMBL | 50/350 | DCM | 720 | (91) | n.d. | 79.0 | 2.06 | n.d. | n.d. | n.d. |

[a]All runs arried out at ~25° C. Conditions: 4.5 mL solvent (TOL = toluene, DCM = CH$_2$Cl$_2$) or 3.0 mL (DMF = dimethylformamide); n.d. = not determined.

[b]Monomer conversions measured by $^1$H NMR or isolated polymer yields reported in parenthesis.

[c]$M_n$ and polydispersity index (PDI) measured by GPC relative to PMMA standards, or $M_w$ *(values in parenthesis) by light scattering, except for run 18, by MALDI-TOF MS.*

[d]Tacticity measured by $^1$H NMR (PMMA) or by $^{13}$C NMR (P$_\beta$MMBL and P$_\beta$MMBL).

difference between 2.1 (Y) and 2.2 (Lu), but slower polymerizations in the less polar dichloromethane (DCM) showed that 1 (TOF=1,500 h$^{-1}$, run 12) is ~3.5 faster than 2.1 (TOF=433 h$^{-1}$, run 13). However, all three catalysts produced essentially atactic P$_\gamma$MMBL (mr=51.4% for 2.1, run 12; 54.4% for 2.2, run 13; and 46.5% for 2.3, run 11). Using the most active Y catalyst of this series in DCM at RT, all polymerizations with the [M]/[I] ratio from 400 to 1600 achieved quantitative or near quantitative conversions in short times (runs 12 and 14-16). The $M_n$ of P$_\gamma$MMBL increased from $4.12 \times 10^4$ g/mol to $1.37 \times 10^5$ g/mol, according to an increase in the [M]/[I] ratio from 400 to 1600.

Figure 11:
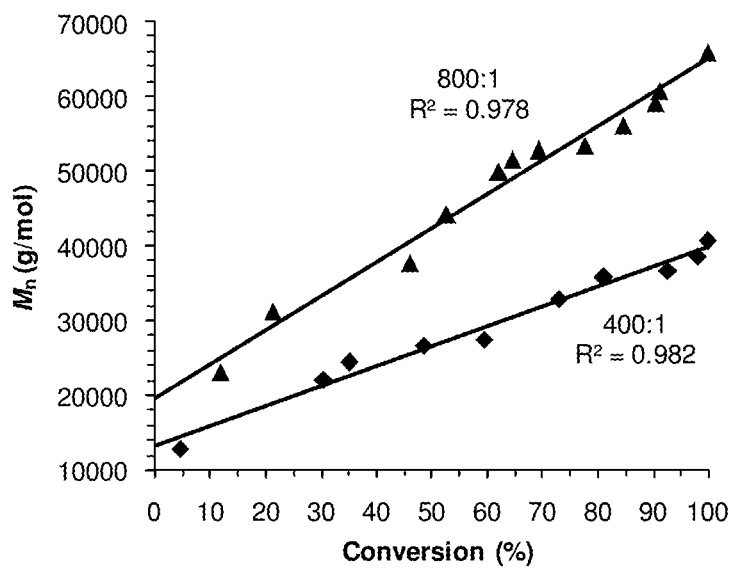
FIG. 11. Plots of $M_n$ of PMMBL vs. monomer conversion. Conditions: [$_\gamma$MMBL]$_0$/[2.1]$_0$=400 (♦), 800 (▲); DCM; 25° C.

FIG. 11 overlays two plots of $M_n$ of P$_\gamma$MMBL vs. monomer conversion for the polymerization by 2.1 in DCM at RT with [$_\gamma$MMBL]$_0$/[2.1]$_0$=400 and 800. The ability of the catalyst to control the polymer MW is apparent from the plots that showed a linear increase in the polymer $M_n$ with increasing monomer conversion for both ratio runs. However, the MWDs for all polymers yielded at different conversions were relatively broad, with PDI values ranging from 1.8 to 2.9, and the intercepts were non-zero, both of which indicate a considerable deviation of the polymerization from ideal "living" behavior. Overall, the herein observed drastically higher activity and effectiveness of the $_\gamma$MMBL polymerization than that of the MBL polymerization by the current ansa-Flu-NHC REM catalysts could be attributed to the high sensitivity of coordination polymerization to monomer structure (steric and electronic effects of the methyl substituent on the butyrolactone ring), catalyst-substrate structural matching (more easily accommodating larger monomers by sterically more accessible ansa-catalysts), and prevention of β-alkoxide elimination (effective blocking by the γ-Me group in $_\gamma$MMBL).

Kinetics and Mechanism of $_\gamma$MMBL Polymerization by Catalyst 2.1.

Figure 12:
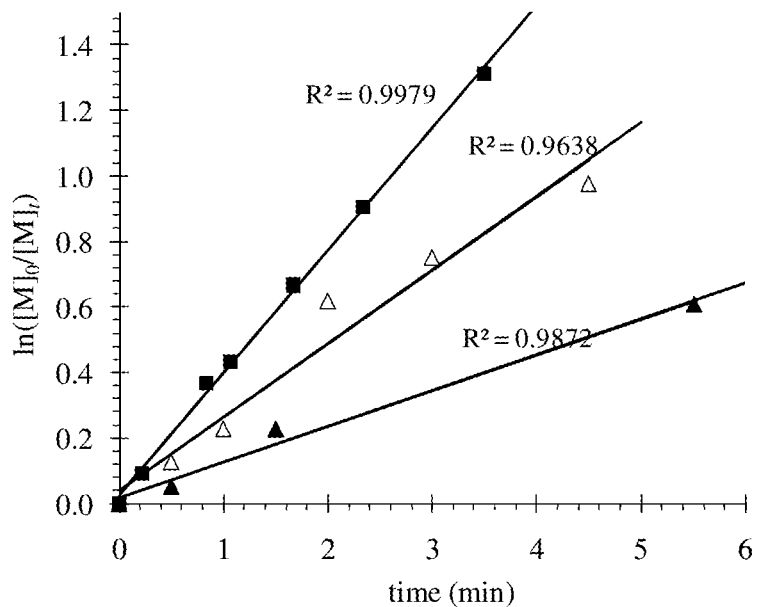
FIG. 12. First-order plots of ln([M]$_0$/[M]$_t$) vs time for the $_\gamma$MMBL polymerization by catalyst 2.1 in DCM at 25° C. with varied catalyst concentrations: [$_\gamma$MMBL]$_0$=0.87 M; [2.1]$_0$=2.17 mM (■), 1.08 mM (Δ), 0.725 mM (▲).
Figure 13:
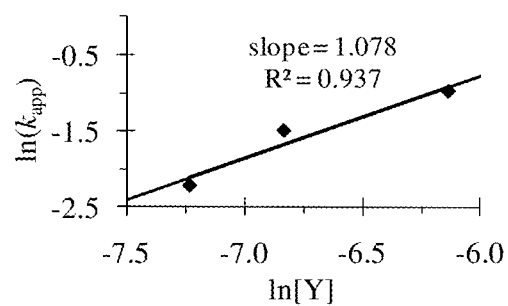
FIG. 13. Plot of ln(k$_{app}$) vs. ln [Y] for the $_\gamma$MMBL polymerization by catalyst 2.1 in DCM at 25° C.

The $_\gamma$MMBL polymerization kinetic experiments employed the [M]$_0$/[2.1]$_0$ ratio from 400 to 1200 in DCM at 25° C. and used the conversion data (up to 73% conversion) from the early stage of polymerization (up to 5.5 min) to minimize effects of potential side reactions at the later stage of the polymerization. The results, plotted in FIG. 12, showed a first-order dependence on [M]. A double logarithmic plot of apparent rate constants (k$_{app}$), obtained from the slopes of the best-fit lines to the plots of ln([M]$_0$/[M]$_t$) vs. time as a function of ln [2.1]$_0$, was fit to a straight line with a slope of 1.08 (FIG. 13). Thus, the kinetic order with respect to [2.1], given by the slope of 1, reveals that the polymerization is also first order in [catalyst]. These results indicates a unimolecular propagation, analogous to the unimetallic mechanism established for the MMA polymerization by isoelectronic, group IV ansa-metallocenium catalysts, but different from the bimetallic mechanism observed for the $_\gamma$MMBL polymerization by the indenyl half-sandwich REM catalysts.

A propagation "catalysis" cycle for the $_\gamma$MMBL polymerization catalyzed by the ansa-half-sandwich catalyst is outlined in Scheme 2.1, which involves the fast intramolecular Michael addition within a catalyst-monomer complex leading to the eight-membered cyclic ester enolate chelate (the resting active intermediate), followed by the slower, rate-limiting ring-opening of the chelate via associative displacement of the coordinated penultimate ester group of the growing chain by the incoming monomer to regenerate the catalyst-monomer complex.

Scheme 2.1. Propagation "catalysis" cycle for γMMBL polymerization.

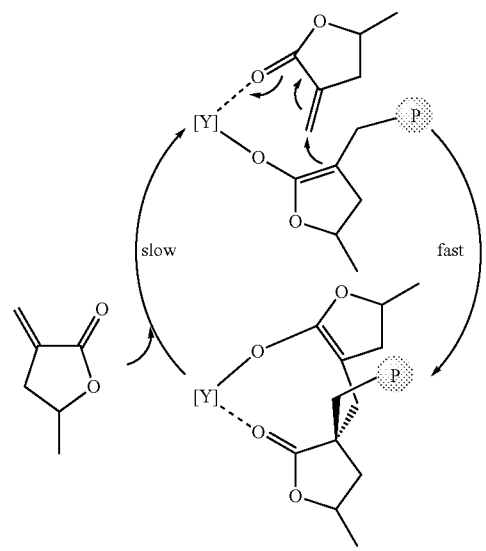

Figure 14:
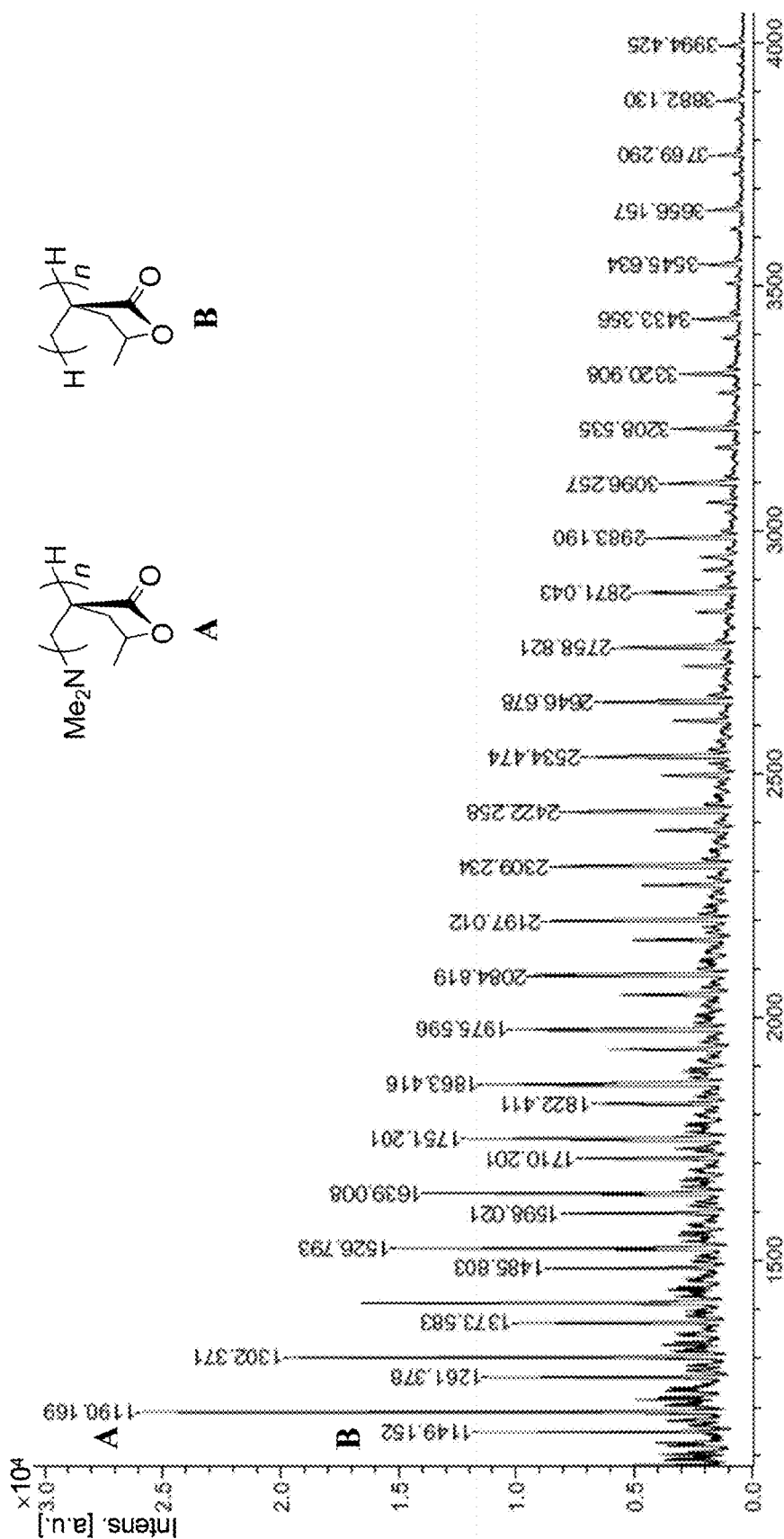
FIG. 14. MALDI-TOF mass spectrum of the low MW P$_\gamma$MMBL produced by 2.1 in DMF at 25° C. The sample analyzed was as quenched and unpurified, and polymer structures A and B correspond to the major (A) and minor (B) series of the peaks.
Figure 15:
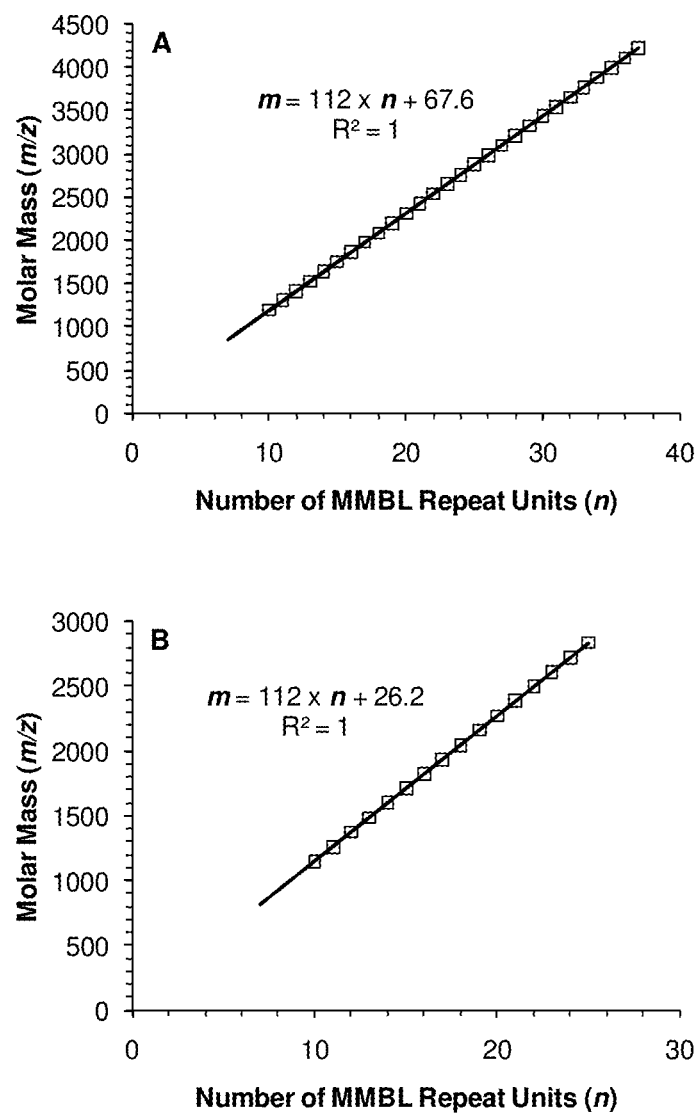
FIG. 15. Plots of m/z values of the major (A) and minor (B) series of the peaks from FIG. 14 vs. the number of $_\gamma$MMBL repeat units (n).

To determine the chain initiation and termination end-groups of the resulting P$_\gamma$MMBL, a low MW sample produced by 2.1 in a [M]$_0$/[I]$_0$ ratio of 40:1 in DMF at RT was analyzed by MALDI-TOF MS (FIG. 14). There were two series of mass distributions, both of which had mass differences between the peaks representing the molar mass of the $_\gamma$MMBL repeat unit (112 g/mol). A plot of m/z values of the major series (A) of peaks in the spectrum vs. the number of $_\gamma$MMBL repeat units (n) yielded a straight line with a slope of 112 and an intercept of 67.6 (FIG. 15). The slope corresponds to the mass of the $_\gamma$MMBL monomer, whereas the intercept is a sum of the masses of Na$^+$ (from the added NaI) and the chain-end groups which correspond to a formula of C$_2$H$_7$N (45). Hence, this analysis showed that major structure A has a formula of Me$_2$N-($_\gamma$MMBL)$_n$-H, while the same analysis (FIG. 15) revealed that minor structure B corresponds to H-($_\gamma$MMBL)$_n$-H.

The termination chain end (H) is formed as expected (from the HCl-acidified methanol during the work-up), but the anticipated initiating group (—CH$_2$SiMe$_3$) from the starting complex was absent in the polymer. Instead, two unexpected initiating groups, —NMe$_2$ and —H, were found in the polymer produced in DMF. The origin of such groups can be explained by a reaction of the starting hydrocarbyl complex with DMF (note that such initiating end-groups were not observed from the polymer produced in DCM), as outlined in Scheme 2.2. In the proposed reaction sequence, insertion of DMF into the Ln-C bond generates a transient alkoxide species, which undergoes β-amide elimination or β-hydride elimination to give the amide or hydride complex, likely existing as dimers or oligomers, thereby serving as the actual catalyst/initiator in the polymerization. Indeed, in situ mixing of the Lu hydrocarbyl complex with 1 equiv of DMF caused immediate disappearance of the DMF resonances and the characteristic resonances for the Lu—CH$_2$SiMe$_3$ group (δ −2.18, −1.90), with a new singlet appearing at δ 2.3 ppm, which is attributable to the newly formed Lu—NMe$_2$ methyl group (the hydride was not detectable under these conditions).

Scheme 2.2. Pathways for in situ generation of amide and hydride initiating species in DMF.

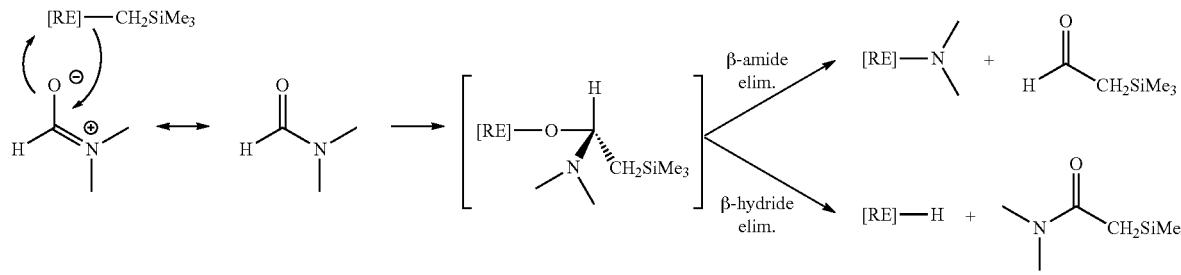

Catalytic Polymerization of γMMBL in the Presence of an Organo Acid.

In the metal-mediated coordination-addition polymerization of polar conjugated olefins, the use of the term "catalyst" emphasizes the catalyzed monomer enchainment by activating the enchaining monomer via metal-monomer complexation/coordination (i.e., the fundamental catalytic event of monomer enchainment in the propagation "catalysis" cycle). However, the metal complex (initiator) is not a "true" catalyst, if the catalytic production of polymer chains is concerned, but it can be achieved by adding a suitable chain-transfer agent (CTA), which must effectively cleave the growing polymer chain from the active center and the resulting new species containing part of the CTA moiety (typically in its deprotonated form) must efficiently reinitiate the polymerization.

It has been shown that organic acids such as alkyl thiols and enolizable ketones are effective CTAs to transform the living MMA polymerization by Cp*$_2$SmMe(THF) into a catalytic polymerization, although the effectiveness for the catalytic polymer production is still limited (Nodono et al., *Macromol. Chem. Phys.*, 2000, 201, 2282). It was found that among several organic acids investigated to promote the catalytic polymerization of MBL by Cp*$_2$Sm(THF)$_2$, 3-methyl-2-butanone (MBO) is highly effective, producing 10 polymer chains per metal in the presence of 20 equiv of MBO.

Considering these findings, MBO was chosen as a possible CTA for the current ansa-half-sandwich Y catalyst in this example, the results of which were summarized in Table 2.2. Addition of MBO to the γMMBL polymerization in DMF catalyzed by 2.1 in a fixed [M]/[2.1] ratio of 400/1 increased the catalyst efficiency (I* values) from 73% to 118%, 141%, and 185%, upon variations of equiv of MBO per metal from 0 to 10, 30, and 50 (runs 21-24, Table 2.2), respectively, at the expense of a sharp drop in activity. In comparison, the polymerizations in DCM (runs 25-28, Table 2.2) experienced smaller enhancements over catalyst efficiency with increasing the amount of CTA. Overall, the organo acid MBO promotes only modest catalytic polymerization of γMMBL catalyzed by the Y catalyst, enhancing the catalyst efficiency by a factor of 2.5 when carried out in DMF in the presence of 50 equiv of MBO, over the same polymerization without MBO.

TABLE 2.2

Results of γMMBL Polymerization by 2.1 (Y) in the Presence of CTA[a].

| run no. | solvent | organo acid | [γMMBL]/[CTA]/[Y] | time (min) | conv. (%) | $10^{-4} M_n$ (g/mol) | PDI ($M_w/M_n$) | I* (%) |
|---|---|---|---|---|---|---|---|---|
| 21 | DMF | none | 400/0/1 | 1 | 100 | 6.17 | 1.78 | 73 |
| 22 | DMF | MBO | 400/10/1 | 960 | 47.2 | 1.79 | 1.46 | 118 |
| 23 | DMF | MBO | 400/30/1 | 1440 | 54.2 | 1.73 | 1.54 | 141 |
| 24 | DMF | MBO | 400/50/1 | 1440 | 68.2 | 1.65 | 1.54 | 185 |
| 25 | DCM | none | 400/0/1 | 20 | 100 | 4.12 | 2.79 | 108 |
| 26 | DCM | MBO | 400/10/1 | 120 | 100 | 3.49 | 1.95 | 128 |
| 27 | DCM | MBO | 400/30/1 | 420 | 100 | 3.11 | 1.92 | 144 |
| 28 | DCM | MBO | 400/50/1 | 420 | 100 | 3.04 | 2.07 | 148 |

[a]Conditions: 3.0 mL DMF, 4.08 mmol γMMBL, 10.27 μmol Y complex for a [γMMBL]/[Y] ratio of 400/1; 25° C.; CTA = 3-methyl-2-butanone (MBO).
Initiator efficiency (I*) = $M_n$(calcd)/$M_n$(exptl), where $M_n$(calcd) = MW(M) × [M]/[I] × conversion % + MW of chain-end groups.
See footnotes in Table 2.1 for other explanations.

Stereoselective Polymerization of βMMBL by Catalyst 2.1.

The most active and effective yttrium catalyst 2.1 of the series was further investigated for the polymerization of βMMBL. The polymerization in DCM at RT was heterogeneous but proceeded rapidly; a polymer gel was formed almost instantaneously upon addition of the catalyst to the monomer solution, and within 5 minutes 400 equiv of βMMBL was converted to the polymer in 94% isolated yield, giving a high TOF of 4,490 h$^{-1}$ (run 17, Table 2.1). The resulting P$_\beta$MMBL is insoluble in DCM or other common organic solvents tested, including DMF, DMSO, ACN and trichlorobenzene (at RT or refluxing temperatures). The insolubility of the P$_\beta$MMBL produced herein limited our ability to characterize this polymer by GPC, but a possibility of the insolubility being due to its ultra high MW was ruled out because the P$_\beta$MMBL produced with a low [M]/[I] ratio of 20, which showed to have an accordingly low $M_n$ of 840 g/mol (PDI=1.1) measured by MALDI-TOF MS (run 18), is still insoluble in any of the solvents mentioned above.

To enable characterizations of βMMBL-containing polymers by GPC and NMR in common organic solvents, we synthesized statistical copolymers of βMMBL and γMMBL in two different compositions: (P$_\beta$MMBL)$_x$-co-(P$_\gamma$MMBL)$_y$ (x/y=1/1, run 19; 1/7, run 20). Both copolymers are soluble in DMSO and DMF and were characterized by NMR in DMSO-$d_6$ and by GPC in DMF, giving $M_n$=141 kg/mol (PDI=1.77) and $M_n$=79.0 kg/mol (PDI=2.06) for the 1:1 and 1:7 copolymers, respectively.

The observed excellent solvent resistance of the $P_\beta$MMBL produced by the coordination polymerization with the current REM catalyst attracted our attention because it is in sharp contrast to the $P_\beta$MMBL prepared by the free-radical polymerization with AIBN as initiator, the polymer of which is readily soluble in DMF, DMSO, or ACN, even at ambient temperature (Pittman and Lee, *J. Polym. Sci. Part A. Polym. Chem.* 2003, 41, 1759). This finding indicates the $_\beta$MMBL produced herein may be a stereoregular polymer (which is typically more solvent resistant than the atactic counterpart).

Figure 16:
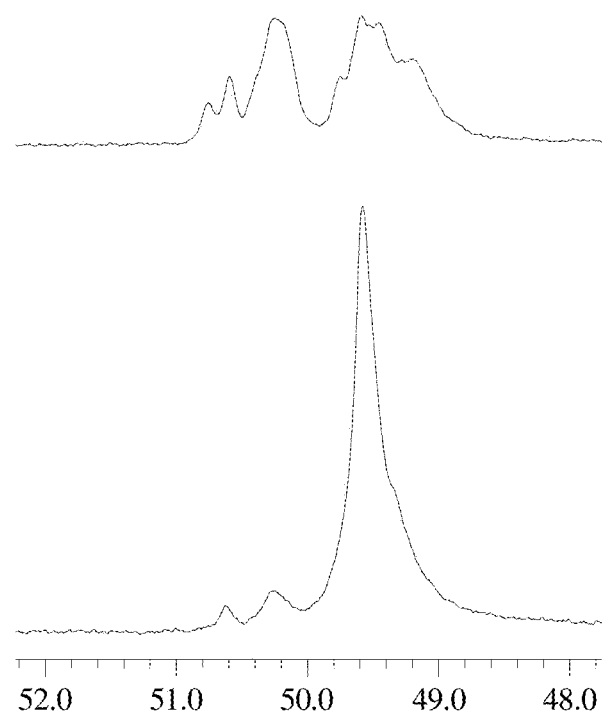
FIG. 16. Overlay of $^{13}$C NMR (TFA-d$_1$, 125 MHz, 70° C.) spectra, in the backbone quaternary carbon (m, mr, m) region, of P$_\beta$MMBL produced by AIBN (top) and catalyst 2.1 (bottom, run 17, Table 2.1).

To ascertain this possibility, both types of homopolymers were analyzed by 500 MHz NMR in TFA-$d_1$ at 70° C. Analysis of $^{13}$C NMR spectra (FIG. 16) of the polymers clearly shows that the polymer by free-radical polymerization is an iso-rich atactic polymer with mm=56.5%, mr=35.5%, and rr=8.0%, whereas the polymer by coordination polymerization is a highly stereoregular, isotactic polymer, with mm=91.0%. This tacticity assignment was based on the backbone quaternary carbon triads, following the order of stereosequences (m, mr, m) shown by $^{13}$C NMR spectra and reported for both PMBL and $P_\gamma$MMBL. The triads of the $P_\beta$MMBL by radical polymerization conform to Bernoullian statistics ($P_{m/r}+P_{r/m}$~1), but the triads of the $P_\beta$MMBL by coordination polymerization do not follow Bernoullian statistics ($P_{m/r}+P_{r/m}$~0.6, <<1).

Figure 17:
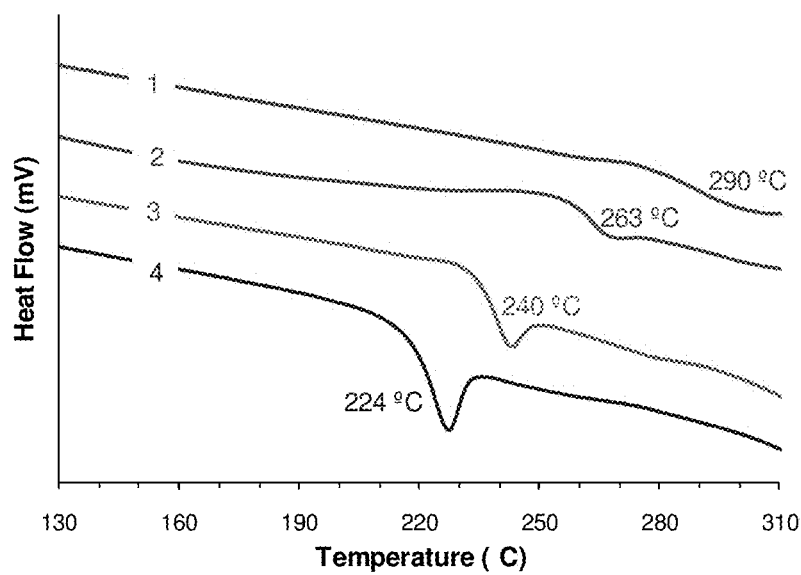
FIG. 17. DSC overlay plots of (1) P$_\beta$MMBL (run 17); (2) (P$_\beta$MMBL)$_x$-co-(P$_\gamma$MMBL)$_y$ (x/y=1/1, run 19); (3) (P$_\beta$MMBL)$_x$-co-(P$_\gamma$MMBL)$_y$ (x/y=1/7, run 20); and (4) P$_\gamma$MMBL (run 12), all produced by 2.1 at RT, Table 2.1.
Figure 18:
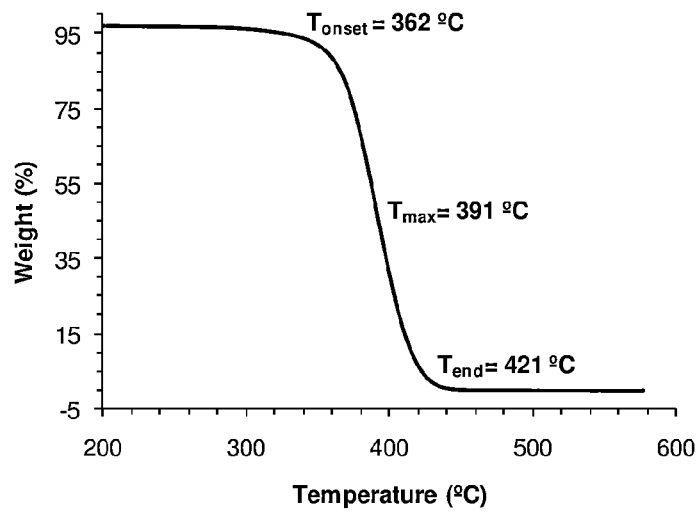
FIG. 18. TGA plot of the P$_\beta$MMBL produced by the Y catalyst (run 17, Table 2.1).

Remarkably, the $_\beta$MMBL produced herein exhibit an extremely high $T_g$ ranging from 288° C. for the low MW polymer (run 18) to 290° C. (run 17), which is ~65° C. higher than that of $P_\gamma$MMBL (224° C., run 12) and ~185° C. higher than the $T_g$ of the typical atactic PMMA. Consistent with these findings, DSC analysis of the copolymers, ($P_\beta$MMBL)$_x$-co-($P_\gamma$MMBL)$_y$, showed that the 1:1 (run19) and 1:7 (run 20) copolymers have $T_g$'s of 263° C. and 240° C., respectively, compared well with $T_g$'s of 290° C. and 224° C. for $P_\beta$MMBL and $P_\gamma$MMBL homopolymers, respectively (FIG. 17). Furthermore, $P_\beta$MMBL (run 17) also exhibits excellent thermal stability as shown by TGA analysis, with $T_{onset}$=362° C., $T_{max}$=391° C., and $T_{end}$=421° C. (FIG. 18).

It is striking that stereocontrol of the polymerization of racemic $_\gamma$MMBL and $_\beta$MMBL in the same solvent (DCM) at the same temperature (RT) by the same catalyst (2.1) is drastically different: atactic $P_\gamma$MMBL (51% mr) and highly isotactic $P_\beta$MMBL (91% mm). The position of the ring-methyl group relative to the exocyclic C=C double bond in the two derivatives must be the reason for the observed large stereocontrol difference. In fact, to date all methods employed for the polymerization of racemic $_\gamma$MMBL, including radical, anionic and group-transfer polymerizations, as well as coordination polymerization, including the present system, led to an essentially atactic polymer (see, Hu et al., *Macromolecules* 2010, 43, 9328). In the case of the coordination polymerization of $_\beta$MMBL, it is conceivable that the isotactic monomer placement, dictated by energetics of the transition state emerged from the coordination intermediate (i.e., catalyst-monomer complex) involving the coordinated monomer, the growing chain end, and the penultimate unit, is energetically favored (Scheme 2.4).

Scheme 2.4. Catalyst-monomer complexes (intermediates) leading to formation of isotactic $P_\beta$MMBL from racemic monomer.

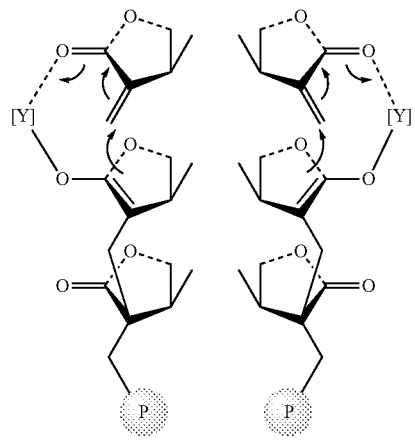

Thus, ansa-half-sandwich REM catalysts 2.1 (Y) and 2.2 (Lu) supported by the ethylene-bridged Flu-NHC ligand exhibit exceptional activity for the polymerization of racemic $_\gamma$MMBL at RT in DMF, achieving 100% monomer conversion in <1 minute with a high TOF of >24,000 h$^{-1}$. This TOF value represents a rate enhancement, by a factor of 8, 22, or 2400, over the polymerizations by unbridged samarocene Cp*$_2$Sm(THF)$_2$, bridged ansa-samarocene 2.3, or the corresponding REM trialkyls without the ansa-Flu-NHC ligation, respectively.

Kinetic experiments have revealed the first-order dependence on both [M] and [REM], thus establishing unimolecular propagation for this coordination polymerization. Chain-end group analysis of the $P_\gamma$MMBL produced by 2.1 has uncovered that the polymerization in DMF was actually initiated by the dimethylamide and hydride groups, formed by the rapid reaction of the starting hydrocarbyl complex with the solvent DMF. Addition of excess organo acid 3-methyl-2-butanone (up to 50 equiv relative to the catalyst) to the $_\gamma$MMBL polymerization by 2.1 in DMF at RT enhances the catalyst efficiency by a factor of 2.5 over the same polymerization without the organo acid, showing a limited degree of catalytic polymerization rendered by this chain-transfer agent (CTA). More significantly, catalyst 2.1 is also highly active for the polymerization of racemic $_\beta$MMBL at RT, realizing the first coordination polymerization of $_\beta$MMBL and its copolymerization with $_\gamma$MMBL. Most remarkably, the resulting $P_\beta$MMBL is highly stereoregular (91% mm). This material is thermally robust and resistant to common organic solvents at ambient or elevated temperature, as well as exhibits an extremely high $T_g$ of 290° C.

Materials and Methods.

Acenaphthylene was purchased from TCI America, while samarium metal, iodine, acetaldehyde (freshly distilled), methyl acrylate, N-bromosuccinimide, dimethyl sulfide, 1,4-diazabicyclo[2.2.2]octane (DABCO), formaldehyde (37 wt % in water), tin powder, and p-toluenesulfonic acid were purchased from Sigma-Aldrich and used as received. Literature procedures were employed to prepare C$_2$H$_4$(Flu-NHC)RE(CH$_2$SiMe$_3$)$_2$ (RE=Y, 2.1; Lu, 2.2) (Wang and Cui, *Macromolecules* 2008, 41, 1983), racemic ansa-samarocene ($\eta^5$-C$_{12}$H$_8$)$_2$Sm(THF)$_2$ (3) (Fedushikin et al., *Angew. Chem. Int. Ed.* 2001, 40, 561), and RE(CH$_2$SiMe$_3$)$_3$(THF)$_2$ (RE=Y, Lu) (Estler et al., *Organometallics* 2003, 22, 1212).

Preparation of β-Methyl-α-Methylene-γ-Butyrolactone ($_\beta$MMBL).

Figure 19:
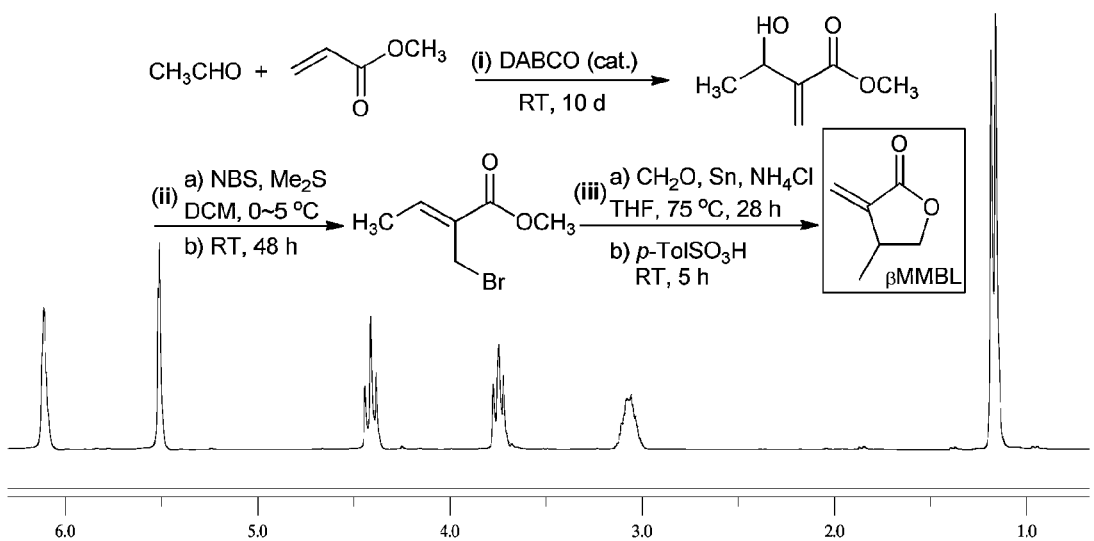
FIG. 19. A synthesis of $_\beta$MMBL and its $^1$H NMR (CDCl$_3$) spectrum. Other methylene butyrolactone monomers can be prepared by using an appropriately substituted acetaldehyde as a starting material (e.g., propanal, 2-phenylethanal, or 4,4-dimethylpentanal).

This monomer can be prepared from the biomass-derived itaconic acid, but in this work literature procedures (Pittman and Lee, *J. Polym. Sci. Part A. Polym. Chem.* 2003, 41, 1759) were modified for its preparation. As highlighted as follows, the modifications were made in steps (ii) and (iii) of the synthesis shown in FIG. 19. Specifically, in step (ii), a complex mixture of N-bromosuccinimide and dimethyl sulfide pre-prepared in DCM at 0° C. was cooled to −20° C., and to this solution mixture was added dropwise methyl-2-methylidene-3-hydroxybutanoate, prepared from step (i), in DCM (100 mL) over 1 hour. In step (iii), the crude product was purified by column chromatography (silica gel stationary phase, 8.5 hexanes:1.5 ethyl acetate eluent). The purified product was dried over $CaH_2$ over night in the presence of a small amount of hydroquinone and distilled under reduced pressure (~40° C./0.5 mm Hg) to give the pure monomer (see $^1H$ NMR spectrum depicted in FIG. 19) ready for polymerization experiments.

General Polymerization Procedures.

Polymerizations were performed either in 30-mL glass reactors inside the glovebox for runs at ambient temperature (ca. 25° C.) or 25-mL flame-dried Schlenk flasks interfaced to the dual-manifold Schlenk line for runs at other temperatures with an external temperature bath. In a typical polymerization procedure, a predetermined amount of REM catalyst (11.7 μmol for runs with a [MMA]/[RE] ratio of 400, or 10.27 μmol for runs with a [(M)MBL]/[RE] ratio of 400) was dissolved in a solvent (4.5 mL toluene, or 3.0 mL DMF or DCM). With vigorous stirring, monomer (MMA, 4.68 mmol; (M)MBL, 4.11 mmol) was quickly added to the above catalyst solution via syringe to start the polymerization. For polymerizations with an added chain-transfer agent (CTA), the monomer and CTA were premixed before the mixture was added to the catalyst solution. For (M)MBL polymerizations, toluene (291 μL) was added as an internal standard, to the reaction mixture.

After the measured time interval, a 0.2 mL aliquot was taken from the reaction mixture via syringe and quickly quenched into a 4-mL vial containing 0.6 mL of undried "wet" $CDCl_3$ stabilized by 250 ppm of BHT-H, except for the $_\beta$MMBL polymerization due to gellation. The polymerization was immediately quenched after the removal of the aliquot by addition of 5 mL 5% HCl-acidified methanol. The quenched mixture was precipitated into 100 mL of methanol, stirred for 1 hour, filtered, washed with methanol, and dried in a vacuum oven at 50° C. overnight to a constant weight.

The isolated polymers were analyzed by $^1H$ or $^{13}C$ NMR for tacticity measurements (vide infra). The quenched aliquots were analyzed by $^1H$ NMR to obtain the percent monomer conversion (1−[M]$_t$/[M]$_0$) data. For MMA polymerizations, the [M]$_0$/[M]$_t$ ratio at a given time t was determined by integration of the peaks for MMA (5.2 and 6.1 ppm for the vinyl signals; 3.4 ppm for the OMe signal) and PMMA (centered at 3.4 ppm for the OMe signals) according to [M]$_0$/[M]$_t$=2$A_{3.4}$/3$A_{5.2+6.1}$, where $A_{3.4}$ is the total integrals for the peaks centered at 3.4 ppm (typically in the region 3.2-3.6 ppm) and $A_{5.2+6.1}$ is the total integrals for both peaks at 5.2 and 6.1 ppm. For (M)MBL polymerizations, monomer percent conversions were calculated by comparing the integration of the vinyl protons of the unreacted monomer to the methyl protons of toluene added as the internal standard.

Polymerization Kinetics.

Kinetic experiments were carried out in a stirred glass reactor at ambient temperature (ca. 25° C.) inside an argon-filled glovebox using the procedure already described above and with [$_\gamma$MMBL]$_0$/[2.1]$_0$ ratios of 400:1, 800:1, and 1200:1, where [$_\gamma$MMBL]$_0$=0.87 M, [2.1]$_0$=2.17 mM, 1.08 mM, and 0.725 mM in 3.73 mL of DCM+$_\gamma$MMBL+toluene solutions. At appropriate time intervals, 0.2 mL aliquots were withdrawn from the reaction mixture using syringe and quickly quenched into 1 mL septum-sealed vials containing 0.6 mL of undried "wet" $CDCl_3$ mixed with 250 ppm BHT-H. The quenched aliquots were analyzed by $^1H$ NMR to obtain monomer conversions. Apparent first-order rate constants ($k_{app}$) were extracted by linearly fitting a line to the plot of ln([$_\gamma$MMBL]$_0$/[$_\gamma$MMBL]$_t$) vs. time.

Polymer Characterizations.

The low-molecular-weight P$_\gamma$MMBL sample was analyzed by matrix-assisted laser desorption/ionization time-of-flight mass spectroscopy (MALDI-TOF MS). The experiment was performed on an Ultraflex MALDI-TOF mass spectrometer (Bruker Daltonics) operated in positive ion, reflector mode using a Nd:YAG laser at 355 nm and 25 kV accelerating voltage. A thin layer of a 1% NaI solution was first deposited on the target plate, followed by 1 μL of both sample and matrix (2,5-dihydroxy benzoic acid, 10 mg/mL in 50% ACN, 0.1% TFA). External calibration was done using a peptide calibration mixture (4 to 6 peptides) on a spot adjacent to the sample. The raw data was processed in the Flex-Analysis software (version 2.4, Bruker Daltonics).

Gel permeation chromatography (GPC) and Light Scattering (LS) analyses of the polymers were carried out at 40° C. and a flow rate of 1.0 mL/min, with $CHCl_3$ as the eluent for PMMA or with DMF for PMBL and P$_\gamma$MMBL, on a Waters University 1500 GPC instrument coupled with a Waters RI detector and a Wyatt miniDAWN Treos LS detector equipped with four 5 μm PL gel columns (Polymer Laboratories; linear range of molecular weight=200-2,000,000). Chromatograms were processed with Waters Empower software (version 2002); number-average molecular weight ($M_n$) and polydispersity index (PDI=$M_w$/$M_n$) of polymers were given relative to PMMA standards. Weight-average molecular weight ($M_w$) was obtained from the analysis of the LS data which was processed with Wyatt Astra Software (version 5.3.2.15), and do/dc values were determined assuming 100% mass recovery of polymers with known concentrations.

Glass transition temperatures ($T_g$) of the polymers were measured by differential scanning calorimetry (DSC) on a DSC 2920, TA Instrument. Polymer samples were first heated to 250° C. at 20° C./min, equilibrated at this temperature for 4 minutes, then cooled to 30° C. at 20° C./min, held at this temperature for 4 minutes, and reheated to 320° C. at 10° C./min. All $T_g$ values were obtained from the second scan. Maximum rate decomposition temperatures ($T_{max}$) and decomposition onset temperatures ($T_{onset}$) of the polymers were measured by thermal gravimetric analysis (TGA) on a TGA 2950 Thermogravimetric Analyszer, TA Instrument. Polymer samples were heated from ambient temperature to 600° C. at a rate of 20° C./min. Values for $T_{10\%}$ and $T_{onset}$ (initial and end temperatures) were obtained from wt % versus temperature (° C.) plots, while values for $T_{max}$ were obtained from derivative weight wt %/° C. versus temperature (° C.) plots.

$^1H$ NMR and $^{13}C$ NMR spectra for the analysis of PMMA microstructures were recorded in $CDCl_3$ at 50° C. and analyzed according to the literature methods (Zhang et al., *J. Am. Chem. Soc.* 2010, 132, 2695), while tacticities of PMBL and P$_\gamma$MMBL were measured by $^{13}C$ NMR in DMSO-$d_6$ at 100° C. (see Zhang et al., *J. Am. Chem. Soc.* 2011, 133, 13674). The tacticity of the P$_\beta$MMBL produced by the radical polymerization was measured by $^{13}C$ NMR in either DMSO-$d_6$ at 100° C. or in TFA-$d_1$ at 70° C., while the tacticity of the P$_\beta$MMBL produced by the coordination polymerization was measured in TFA-d$_1$ at 70° C.; the assignments of the triads were based on the backbone quaternary carbon resonances, following the assignments for P$_\gamma$MMBL (Suenaga et al., *Macromolecules* 1984, 17, 2913).

$^1$H NMR (CDCl$_3$, 300 MHz, 50° C.) for PMMA: δ 3.60 (s, OMe), 2.05 (d, J=14.8 Hz, CH$_2$), 1.99-1.90 (m, CH$_2$), 1.82 (s, CH$_2$), 1.48 (d, J=14.8 Hz, CH$_2$), 1.22 (s, CH$_3$, m), 1.02 (s, CH$_3$, m), 0.85 (s, CH$_3$, m). $^1$H NMR (DMSO-d$_6$, 300 MHz, 100° C.) for PMBL: δ 4.34 (b.s, 2H, OCH$_2$), 2.24-1.99 (m, 4H, CH$_2$, CH$_2$). $^{13}$C NMR (DMSO-d$_6$, 125 MHz, 100° C.) for PMBL: δ 179 (m, C=O), 64.4 (OCH$_2$), 44.2, 43.9, 43.7 (quaternary carbon, rr, mr, m), 41.9-40.6 (main-chain CH$_2$, unresolved tetrads), 30.5 (β-CH$_2$).

$^1$H NMR (DMSO-d$_6$, 300 MHz, 100° C.) for P$_\gamma$MMBL: δ 4.64 (b.s, 1H, OCH), 2.31 (b.s, 2H, CH$_2$), 1.99 (b.s, 2H, CH$_2$), 1.39 (b.s, 3H, CH$_3$). $^{13}$C NMR (DMSO-d$_6$, 125 MHz, 100° C.) for P$_\gamma$MMBL: δ 178 (m, C=O), 72.7 (OCH), 46.5, 46.2, 45.8 (quaternary carbon, rr, mr, m), 43.1 (CH$_2$), 40.5, 39.2, 37.7 (main-chain CH$_2$), 19.5 (CH$_3$). DEPT experiments were used to remove the DMSO signals in the $^{13}$C NMR experiments.

$^1$H NMR (DMSO-d$_6$, 300 MHz, 100° C.) for P$_\beta$MMBL (by AIBN in DMF at 60° C., as a comparative example): δ 4.24, 3.72 (b.s, 2H, OCH$_2$), 3.28 (b.s, 1H, CH), 2.49-1.36 (m, 2H, CH$_2$), 0.98, 0.78 (b.s, 3H, CH$_3$).

$^{13}$C NMR (DMSO-d$_6$, 75 MHz, 100° C.) for P$_\beta$MMBL (by AIBN): δ 179 (m, C=O), 69.7 (OCH$_2$), 46.7, 46.1, 45.5 (quaternary carbon, rr, mr, m), 36.5 (m, main-chain CH$_2$), 32.2 (CH), 8.55 (CH$_3$).

$^{13}$C NMR (TFA-d$_1$, 125 MHz, 70° C.) for P$_\beta$MMBL (by AIBN): δ 184 (m, C=O), 73.9 (OCH$_2$), 50.4, 50.0, 49.2 (m, quaternary carbon, rr, mr, m), 39.5 (m, main-chain CH$_2$), 35.8 (CH), 8.90 (CH$_3$).

$^1$H NMR (DMSO-d$_6$, 300 MHz, 100° C.) for (P$_\beta$MMBL)$_x$-co-(P$_\gamma$MMBL)$_y$ (x/y=1/1): δ 4.58, 4.32, 3.81 (b.s, 4H, OCH, OCH$_2$, CH), 2.49-1.65 (m, 6H, CH$_2$), 1.33 (b.s, 3H, CH$_3$), 0.95, 0.83 (b.s, 3H, CH$_3$). $^{13}$C NMR (DMSO-d$_6$, 75 MHz, 100° C.) for (P$_\beta$MMBL)$_x$-co-(P$_\gamma$MMBL)$_y$ (x/y=1/1): δ 179 (m, C=O), 73.2 (OCH), 69.6 (OCH$_2$), 46.3 (m, quaternary carbon, rr, mr, m), 43.1 (β-CH$_2$), 36.8 (m, main-chain CH$_2$), 32.2 (β-CH), 19.7 (CH$_3$), 8.19 (CH$_3$).

$^{13}$C NMR (TFA-d$_1$, 125 MHz, 70° C.) for P$_\beta$MMBL (by catalyst 1): δ 185 (C=O), 74.1 (OCH$_2$), 50.6, 50.2, 49.5 (quaternary carbon, rr, mr, m), 40.2 (main-chain CH$_2$), 35.6 (CH), 9.52 (CH$_3$).

Example 3

Stereoselectivity in Metallocene-Catalyzed Coordination Polymerization of Renewable Methylene Butyrolactones: From Stereo-Random to Stereo-Perfect Polymers Coordination polymerization of renewable feedstocks such as α-methylene-γ-(methyl)butyrolactones and α-methylene-β-(methyl)butyrolactones by chiral C$_2$-symmetric zirconocene catalysts has been achieved. The polymerization provides stereo-random, highly stereoregular, or perfectly stereoregular polymers, depending on the monomer and catalyst structures. Computational studies yield a fundamental understanding of the stereocontrol mechanism governing these new polymerization reactions mediated by chiral metallocenium catalysts.

Materials, Reagents, and Methods.

Cyclopentadiene, n-BuLi (1.6 M in hexanes), butylated hydroxytoluene (BHT-H; 2,6-di-tert-butyl-4-methylphenol), methanol, 1,2-dibromoethane, zirconium tetrachloride, triflic acid, lithium dimethylamide, diisopropylamine, potassium hydride, and lithium aluminum hydride were purchased from Sigma-Aldrich. 2,5-Hexandione, diphenylamine, dihydropyran (DHP), p-toluenesulfonic acid, 4-toluensulfonyl chloride, pyridine, sodium cyanide, iodomethane, and 2,2-azobisisobutyronitrile (AIBN) were purchased from Alfa Aesar. Trimethylaluminum (neat) was purchased from Strem Chemical Co. Isopropyl isobutyrate and methyl (S)-(+)-3-hydroxylisobutyrate were purchased from TCI America. Eschenmoser's salt was purchased from Acros Organics.

1,2-Dibromoethane was degassed using three freeze-pump-thaw cycles. Diisopropylamine and cyclopentadiene were vacuum-distilled. Methanol and isopropyl isobutyrate were degassed and dried over Mg and CaH$_2$ overnight, followed by vacuum distillation. BHT-H was recrystallized from hexanes prior to use. 1,4-Dioxane (Fisher Scientific) was degassed, dried over sodium/potassium alloy, and vacuum-distilled. AIBN was recrystallized from dried methanol in the dark and under nitrogen, dried under vacuum (0.5 mm Hg) at room temperature for 6 hours. All other commercial reagents were used as received.

Tris(pentafluorophenyl)borane, $_B$(C$_6$F$_5$)$_3$, was obtained as a research gift from Boulder Scientific Co. and further purified by recrystallization from hexanes at −30° C. The adduct THF·B(C$_6$F$_5$)$_3$ was prepared by addition of THF to a toluene solution of the borane at ambient temperature, followed by removal of the volatiles and drying in vacuo.

Literature procedures were employed or modified for the preparation of the following ligands or complexes:

Me$_2$C=C(O$^i$Pr)OLi: Ning et al., *Macromolecules* 2008, 41, 6910; Rodriguez-Delgado and Chen, *J. Am. Chem. Soc.* 2005, 127, 961.

(EBI)H$_2$ [EBI=C$_2$H$_4$(η$^5$-indenyl)$_2$]: Grossman et al., *Organometallics* 1991, 10, 1501.

rac-(EBI)Zr(NMe$_2$)$_2$: Diamond et al., *J. Am. Chem. Soc.* 1996, 118, 8024.

rac-(EBI)ZrMe$_2$: Diamond et al., *J. Am. Chem. Soc.* 1996, 118, 8024.

rac-(EBI)ZrMe[OC(O$^i$Pr)=CMe$_2$] (pre-1): Bolig and Chen, *J. Am. Chem. Soc.* 2004, 126, 4897.

rac-(EBI)Zr$^+$(THF)[OC(O$^i$Pr)=CMe$_2$][MeB(C$_6$F$_5$)$_3$]$^-$ (1): Bolig and Chen, *J. Am. Chem. Soc.* 2004, 126, 4897.

4,7-dimethylindene: Erker et al., *Tetrahedron* 1995, 51, 4347; Coe et al., *Tetrahedron Lett.* 1994, 35, 6627.

(EBDMI)H$_2$ [EBDMI=ethylene-bis(4,7-dimethyl-1-indenyl)]: Resconi et al., *Organometallics* 1996, 15, 5046.

rac-(EBDMI)ZrCl$_2$: Resconi et al., *Organometallics* 1996, 15, 5046.

Synthesis of rac-(EBDMI)ZrMe[OC(O$^i$Pr)=CMe$_2$] (pre-2).

There were a total of four steps in this synthesis. The first step was the synthesis of rac-(EBDMI)Zr(NMe$_2$)$_2$, using the modified literature procedure for the preparation of the analogous ethylene-bis(indenyl) derivative, rac-(EBI)Zr(NMe$_2$)$_2$ (Diamond et al., *J. Am. Chem. Soc.* 1996, 118, 8024). In an argon-filled glovebox, a 50-mL Schlenk flask was equipped with a stir bar and charged with Zr(NMe$_2$)$_4$ (1.02 g, 3.70 mmol), (EBDMI)H$_2$ (1.28 g, 4.08 mmol), and 20 mL toluene. The flask was sealed with a rubber septum, removed from the glovebox, and interfaced to a Schlenk line. The reaction mixture was stirred and heated to 100° C. for 17 hours, and NMe$_2$H was allowed to escape via an oil bubbler. The reaction mixture was filtered, concentrated under reduced pressure, and cooled to −30° C. for 3 days. Filtration afforded 0.77 g (48%) of the pure rac-(EBDMI)Zr(NMe$_2$)$_2$ as orange crystals. $^1$H NMR (C$_6$D$_6$, 300 MHz, 23° C.): δ 6.82 (d, J=3.3 Hz, 2H, Ind), 6.65 (d, J=6.6 Hz, 2H, Ind), 6.42 (d, J=6.6 Hz, 2H, Ind), 6.14 (d, J=3.3 Hz, 2H, Ind), 3.69-3.62 (m, 2H, CH$_2$), 3.16-3.12 (m, 2H, CH$_2$), 2.59 (s, 6H, CH$_3$), 2.47 (s, 12H, NMe$_2$), 2.30 (s, 6H, CH$_3$). $^{13}$C NMR (C$_6$D$_6$, 125 MHz, 23° C.): δ 131.0, 129.8, 129.0, 126.8, 124.6, 123.6, 117.3, 110.8, 106.0 (C of Ind), 47.22 (NMe$_2$), 37.12 (CH$_2$CH$_2$), 21.92 (CH$_3$), 19.41 (CH$_3$).

The second step was the synthesis of rac-(EBDMI)ZrMe$_2$, also following the modified literature procedure of Diamond et al. for the preparation of the analogous ethylene-bis(indenyl) derivative, rac-(EBI)ZrMe$_2$. To a toluene (30 mL) solution of rac-(EBDMI)Zr(NMe$_2$)$_2$ (0.70 g, 1.43 mmol) pre-cooled to −10° C. was added AlMe$_3$ (0.58 g, 8.00 mmol) over 15 min, during which period the solution turned from orange to yellow. The reaction was allowed to gradually warm to room temperature and stirred for 3 hours. The solvent was removed under reduced pressure, and the solid was dried under vacuum. The solid was washed with hexane and dried under vacuum to give 0.31 g (50% yield) of the pure rac-(EBDMI)ZrMe$_2$. $^1$H NMR (C$_6$D$_6$, 300 MHz, 23° C.): δ 6.80 (d, J=6.9 Hz, 2H, Ind), 6.70 (d, J=3.6 Hz, 2H, Ind), 6.60 (d, J=6.9 Hz, 2H, Ind), 5.76 (d, J=3.6 Hz, 2H, Ind), 3.34-3.22 (m, 2H, CH$_2$), 2.88-2.75 (m, 2H, CH$_2$), 2.30 (s, 6H, CH$_3$), 2.23 (s, 6H, CH$_3$), −0.98 (s, 6H, ZrCH$_3$).

The third step was the synthesis of rac-(EBDMI)ZrMe (OTf), using the modified literature procedure for the preparation of the analogous ethylene-bis(indenyl) derivative, rac-(EBI)ZrMe(OTf) (Bolig and Chen, *J. Am. Chem. Soc.* 2004, 126, 4897). In an argon-filled glovebox, a glass reactor was equipped with a stir bar and charged with 15 mL toluene and 0.31 g (0.72 mmol) rac-(EBDMI)ZrMe$_2$. To this yellow solution was added 0.16 g (0.72 mmol) Me$_3$SiOTf at 0° C. The color of the reaction solution changed from yellow to orange. Stirring was maintained for 21 hours at ambient temperature, after which the solution was filtered. The filtrate was concentrated under reduced pressure and cooled to −30° C. overnight. The resulting orange crystalline solid collected after filtration was dried in vacuo to give 0.44 g (>99% yield) of the pure rac-(EBDMI)ZrMe(OTf). $^1$H NMR (C$_6$D$_6$, 300 MHz, 23° C.): δ 7.04 (d, J=3.6 Hz, 1H, Ind), 6.81-6.73 (m, 3H, Ind), 6.69 (d, J=3.6 Hz, 1H, Ind), 6.47 (d, J=6.9 Hz, 2H, Ind), 6.01 (d, J=3.6 Hz, 1H, Ind), 5.44 (d, J=3.6 Hz, 1H, Ind), 3.60-3.51 (m, 1H, CH$_2$), 3.25-3.11 (m, 1H, CH$_2$), 2.87-2.78 (m, 2H, CH$_2$), 2.39 (s, 3H, CH$_3$), 2.35 (s, 3H, CH$_3$), 2.18 (s, 3H, CH$_3$), 2.12 (s, 3H, CH$_3$), −0.35 (s, 3H, ZrCH$_3$).

Figure 20:
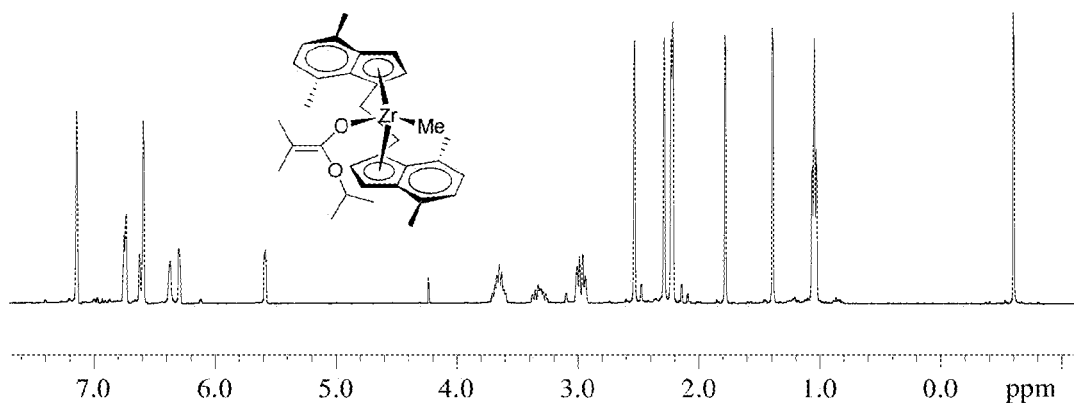
FIG. 20. $^1$H NMR spectrum of rac-(EBDMI)ZrMe[OC(O$^i$Pr)=CMe$_2$] (pre-2).

The fourth (last) step is the synthesis of the final complex, rac-(EBDMI)ZrMe[OC(O$^i$Pr)=CMe$_2$] (pre-2). In an argon-filled glovebox, a 50 mL glass reactor was equipped with magnetic stir bar, charged with 15 mL toluene and 0.44 g (0.78 mmol) rac-(EBDMI)ZrMe(OTf), and then cooled to −30° C. inside a freezer. To this prechilled reactor was added 0.11 g (0.78 mmol) Me$_2$C=C(O$^i$Pr)OLi. The resulting suspension was stirred overnight at ambient temperature, after which it was filtered through a pad of Celite. The solvent of the filtrate was removed in vacuo, yielding 0.38 g (88%) of pre-2 as a yellow powder. The analytically pure sample was obtained by recrystallization from toluene layered with hexanes at −30° C. for two days, producing 0.25 g (59% yield) of pre-2 in pure state. $^1$H NMR (C$_6$D$_6$, 300 MHz, 23° C., FIG. 20): δ 6.75-6.73 (m, 2H, Ind), 6.62-6.59 (m, 3H, Ind), 6.37 (d, J=3.3 Hz, 1H, Ind), 6.30 (d, J=3.3 Hz, 1H, Ind), 5.59 (d, J=3.6 Hz, 1H, Ind), 3.70-3.59 (m, 2H, CH$_2$), 3.37-3.25 (m, 1H, CH(Me)$_2$), 3.00-2.93 (m, 2H, CH$_2$), 2.53 (s, 3H, CH$_3$), 2.28 (s, 3H, CH$_3$), 2.24 (s, 3H, CH$_3$), 2.21 (s, 3H, CH$_3$), 1.78 (s, 3H, CMe$_2$), 1.39 (s, 3H, CMe$_2$), 1.04 (m, 6H, CHMe$_2$), −0.61 (s, 3H, ZrCH$_3$). $^{13}$C NMR (C$_6$D$_6$, 125 MHz, 23° C.): δ 154.1 (OC(O$^i$Pr)=), 132.8, 130.8, 130.7, 127.0, 126.9, 126.8, 126.6, 126.2, 123.8, 123.7, 123.3, 123.0, 119.3, 115.3, 113.1, 110.2, 106.8, 104.9 (C of Ind), 83.16 (=CMe$_2$), 66.79 (OCHMe$_2$), 29.96 (Zr—CH$_3$), 29.64 (CH$_2$CH$_2$), 29.18 (CH$_2$CH$_2$), 21.97 (OCHMe$_2$), 21.70 (OCHMe$_2$), 21.71 (CH$_3$), 21.38 (CH$_3$), 18.80 (CH$_3$), 18.38 (CH$_3$), 17.35 (=CMe$_2$), 17.16 (=CMe$_2$). Anal. Calcd for C$_{32}$H$_{40}$O$_2$Zr: C, 70.15; H, 7.36. Found: C, 70.36; H, 7.06.

In Situ Generation of rac-(EBDMI)Zr$^+$(THF)[OC(O$^i$Pr)=CMe$_2$][MeB(C$_6$F$_5$)$_3$]$^-$ (2).

Cationic zirconocene ester enolate 2 was generated from in situ mixing of pre-2 with in (C$_6$F$_5$)$_3$B.THF in CD$_2$Cl$_2$ at room temperature, following the procedure demonstrated for the clean and quantitative generation of cationic ester enolate rac-(EBI)Zr$^+$(THF)[OC(O$^i$Pr)=CMe$_2$][MeB(C$_6$F$_5$)$_3$]$^-$ (1) via in situ mixing of pre-1 with (C$_6$F$_5$)$_3$B.THF (Bolig and Chen, *J. Am. Chem. Soc.* 2004, 126, 4897; Rodriguez-Delgado and Chen, *Macromolecules* 2005, 38, 2587). In an argon-filled glovebox, a 4 mL glass vial was charged with 11.0 mg (0.02 mmol) pre-2 and 0.4 mL of CD$_2$Cl$_2$, while another vial was charged with 11.7 mg (C$_6$F$_5$)$_3$B.THF (0.020 mmol) and 0.4 mL of CD$_2$Cl$_2$. The two vials were mixed via pipette at ambient temperature to give instantaneously a red solution; subsequent analysis of this red solution by NMR showed the clean and quantitative formation of ion pair 2. $^1$H NMR (CD$_2$Cl$_2$, 23° C.) for 2: $^1$H NMR (CD$_2$Cl$_2$, 23° C.) for 2: δ 7.01 (d, J=3.6 Hz, 1H), 6.93-6.89 (m, 3H), 6.83 (d, J=6.9 Hz, 1H), 6.60 (d, J=3.3 Hz, 1H), 6.51 (d, J=3.6 Hz, 1H), 6.46 (d, J=3.3 Hz, 1H), 4.44 (m, 2H, CH$_2$CH$_2$), 3.85 (m, 2H, CH$_2$CH$_2$), 3.69 (m, 3H, CHMe$_2$, overlapping with α-CH$_2$, THF), 3.61 (m, 2H, α-CH$_2$, THF), 2.83 (s, 6H, PhMe), 2.29 (s, 3H, PhMe), 2.27 (s, 3H, PhMe), 1.91 (m, 4H, β-CH$_2$, THF), 1.54 (s, 3H, =CMe$_2$), 1.23 (s, 3H, =CMe$_2$), 1.16 (d, J=6.0 Hz, 3H, —CHMe$_2$), 1.06 (d, J=6.0 Hz, 3H, —CHMe$_2$), 0.51 (s, br, 3H, β-CH$_3$). $^{19}$F NMR (CD$_2$Cl$_2$, 23° C.): δ −133.60 (d, $^3$J$_{F-F}$=21.3 Hz, 6F, o-F), −165.82 (t, $^3$J$_{F-F}$=21.6 Hz, 3F, p-F), −168.42 (m, 6F, m-F).

General Polymerization Procedures.

Polymerizations were performed in 30-mL glass reactors inside the glovebox in toluene or methylene chloride at ambient temperature, following the procedure established for the polymerization of methacrylates and acrylamides by the analogous EBI (C$_2$H$_4$(η$^5$-indenyl)$_2$) or other types of metallocene precatalysts where showed in-reactor activation and pre-catalyst activation gave similar polymerization results (Bolig and Chen, *J. Am. Chem. Soc.* 2004, 126, 4897; Rodriguez-Delgado and Chen, *Macromolecules* 2005, 38, 2587; Zhang et al., *J. Am. Chem. Soc.* 2010, 132, 2695; Mariott and Chen, *Macromolecules* 2005, 38, 6822).

In a typical polymerization procedure, the activator B(C$_6$F$_5$)$_3$ (5.21 mg, 10.2 μmol) and 400 equiv of MMBL (0.44 mL, 4.07 mmol) or MBL (0.36 mL, 4.07 mmol) were premixed in 3 mL of toluene or CH$_2$Cl$_2$ as indicated. The polymerization was timed immediately after addition of the precatalyst 1 or 2. After the measured time interval, a 0.2 mL aliquot was taken from the reaction mixture via syringe and quickly quenched into a 4 mL vial containing 0.6 mL of undried "wet" CDCl$_3$ stabilized by 250 ppm of BHT-H; the quenched aliquots were later analyzed by $^1$H NMR to obtain monomer conversion data. The polymerization was immediately quenched after the removal of the aliquot by adding 5 mL of 5% HCl-acidified methanol. The quenched mixture was precipitated into 100 mL of methanol, stirred for 1 hour, filtered, and washed with methanol. The polymer collected was dried in a vacuum oven at 50° C. overnight to a constant weight.

Polymer Characterizations.

Polymer number-average molecular weight (M$_n$) and molecular weight distributions (MWD=M$_w$/M$_n$) were measured by gel permeation chromatography (GPC) analyses carried out at 40° C. and a flow rate of 1.0 mL/min, with DMF for PMBL and PMMBL, on a Waters University 1500 GPC instrument coupled to a Waters RI detector and equipped with four PLgel 5 μm mixed-C columns (Polymer Laboratories; linear range of MW=200-2,000,000). The instrument was calibrated with 10 PMMA standards, and chromatograms were processed with Waters Empower software (version 2002); $M_n$ and polydispersity index (PDI=$M_w/M_n$) of polymers were given relative to PMMA standards.

Figure 21:
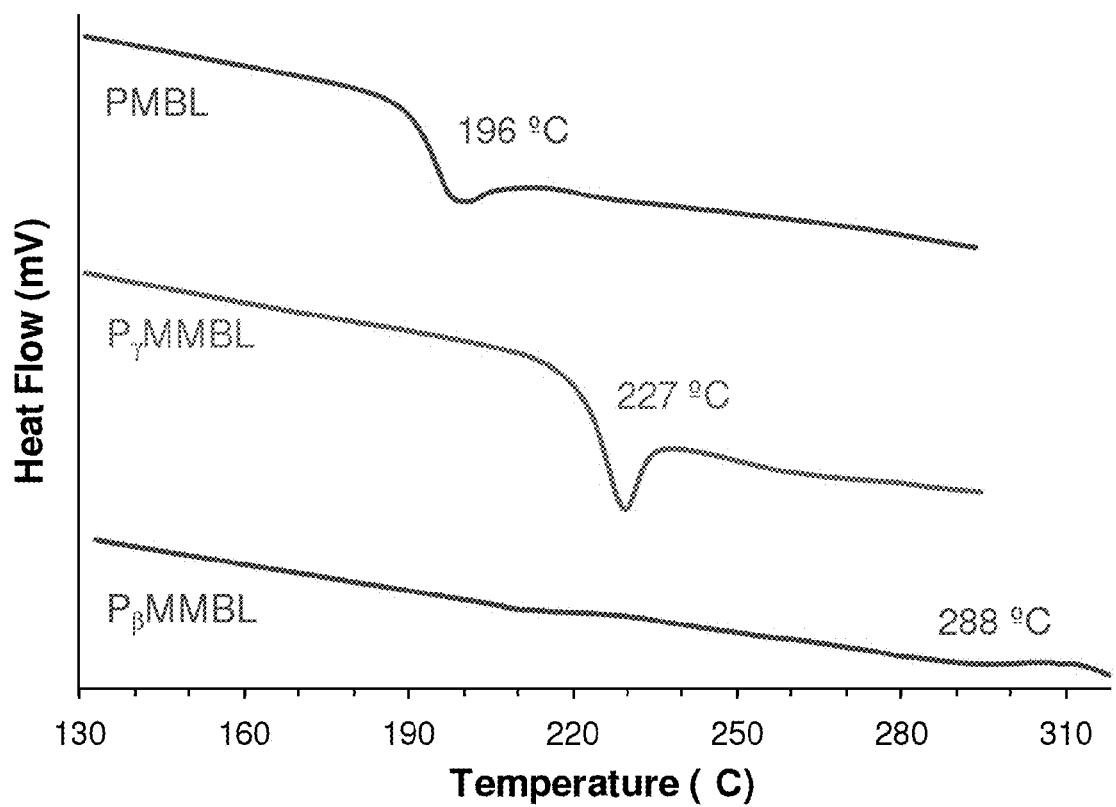
FIG. 21. Representative DSC traces of polymers described in Example 3.

Glass-transition temperatures ($T_g$) of the polymers were measured by differential scanning calorimetry (DSC) on a DSC 2920, TA Instrument. Polymer samples were first heated to 250° C. at 20° C./min, equilibrate at this temperature for 4 minutes, and reheated to 300° C. (for PMBL and P$_\gamma$MMBL) or 320° C. (for P$_\beta$MMBL) at 10° C./min. All $T_g$ values were obtained from the second scan after the thermal history was removed from the first scan. See FIG. 21.

$^1$H NMR and $^{13}$C NMR spectra for the analysis of PMMA microstructures were recorded in CDCl$_3$ at 50° C. and analyzed according to the literature methods (e.g., Brar et al., *J. Mol. Struc.* 2004, 703, 69), while tacticities of PMBL (Miyake et al., *Macromolecules* 2010, 43, 4902) and P$_\gamma$MMBL (Miyake et al., *Macromolecules* 2010, 43, 4902; Suenaga et al., *Macromolecules* 1984, 17, 2913) were measured by $^{13}$C NMR in DMSO-d$_6$ at 100° C. The tacticity of the P$_\beta$MMBL produced by the radical polymerization was measured by $^{13}$C NMR in either DMSO-d$_6$ at 100° C. or in TFA-d$_1$ at 70° C., while the tacticity of the P$_\beta$MMBL produced by the coordination polymerization with metallocene catalysts was measured in TFA-d$_1$ at 70° C. (the polymer is insoluble in DMSO-d$_6$ but soluble in TFA at 70° C.; there was no evidence for ring-opening of the butyrolactone ring or polymer hydrolysis under the NMR conditions); the assignments of the triads were based on the backbone quaternary carbon resonances (see Example 2), following the assignments for P$_\gamma$MMBL, which were confirmed by the isotactic polymer produced from the enantiomerically pure monomer (R)-$_\beta$MMBL. $^1$H NMR (DMSO-d$_6$, 300 MHz, 100° C.) for P$_\beta$MMBL (by AIBN in DMF at 60° C., as a comparative example): δ 4.24, 3.72 (b.s, 2H, OCH$_2$), 3.28 (b.s, 1H, CH), 2.49-1.36 (m, 2H, CH$_2$), 0.98, 0.78 (b.s, 3H, CH$_3$). $^{13}$C NMR (DMSO-d$_6$, 75 MHz, 100° C.) for P$_\beta$MMBL (by AIBN): δ 179 (m, C=O), 69.7 (OCH$_2$), 46.7, 46.1, 45.5 (quaternary carbon, rr, mr, m), 36.5 (m, main-chain CH$_2$), 32.2 (CH), 8.55 (CH$_3$). $^{13}$C NMR (TFA-d$_1$, 125 MHz, 70° C.) for P$_\beta$MMBL (by AIBN): δ 184 (m, C=O), 73.9 (OCH$_2$), 50.4, 50.0, 49.2 (m, quaternary carbon, rr, mr, m), 39.5 (m, main-chain CH$_2$), 35.8 (CH), 8.90 (CH$_3$). $^{13}$C NMR (TFA-d$_1$, 125 MHz, 70° C.) for P$_\beta$MMBL (by metallocene catalysts): δ 185 (C=O), 74.1 (OCH$_2$), 50.6, 50.2, 49.5 (quaternary carbon, rr, mr, m), 40.2 (main-chain CH$_2$), 35.6 (CH), 9.52 (CH$_3$).

Solubility parameters of the various polymer products were analyzed and the results are summarized in Table 3.1 below.

TABLE 3.1

Solubility of the polymers produced in this study ("+" = soluble and "−" = insoluble).

| solvent | temp (° C.) | PMBL (atactic) | P$_\gamma$MMBL (atactic) | P$_\beta$MMBL (atactic) | P$_\beta$MMBL (isotactic) |
|---|---|---|---|---|---|
| water | 25 | − | − | − | − |
| methanol | 25 | − | − | − | − |
| toluene | 25 | − | − | − | − |
| CH$_2$Cl$_2$ | 25 | − | + | − | − |
| 1,2-dichlorobenzene | 25 or 180 | − | − | − | − |
| THF | 25 or 60 | − | + | − | − |
| DMSO | 25 or 100 | + | + | + | − |
| DMF | 25 or 100 | + | + | + | − |
| TFA | 25 or 70 | + | + | − | + |

Computational Details.

Calculations followed the procedures described in prior publications (Caporaso and Cavallo, *Macromolecules* 2008, 41, 3439; Caporaso et al., *J. Am. Chem. Soc.* 2006, 128, 16649). Specifically, the Amsterdam Density Functional (ADF) program was used to obtain all the results (ADF2007, *Theoretical Chemistry, Vrije Universiteit, Amsterdam*, 2007, Users' Manual; Baerends et al., *Chem. Phys.* 1973, 2, 41). The electronic configuration of the molecular systems was described by a triple-ζ STO basis set on zirconium for 4s, 4p, 4d, 5s, 5p (ADF basis set TZV). Triple-ζ basis sets, augmented by one polarization function, were used for C and O (2s, 2p), and H (ADF basis sets TZVP) (ADF basis set TZV). The inner shells on zirconium (including 3d), carbon, and oxygen (1s) were treated within the frozen core approximation. Energies and geometries were evaluated using the local exchange-correlation potential by Vosko et al. (*Can. J. Phys.* 1980, 58, 1200), augmented in a self-consistent manner with Becke's exchange gradient correction (*Phys. Rev. A* 1988, 38, 3098) and Perdew's correlation gradient correction (BP86 functional) (Perdew, *Phys. Rev. B* 1986, 33, 8822; Perdew, *Phys. Rev. B* 1986, 34, 7406). The transition states (TSs) were approached through a linear transit procedure starting from the coordination intermediates. The forming C—C bond was assumed as the reaction coordinate during the linear transit scans. Full transition state searches were started from the maxima along the linear transit paths.

All geometries were localized in the gas phase. However, since the polymerizations described herein have been performed in a rather polar solvent, such as CH$_2$Cl$_2$, single point energy calculations were performed on the final geometries to take into account solvent effects. The ADF implementation of the conductor-like screening model (COSMO) was used (Klamt et al., *Chem. Soc., Perkin Trans.* 1993, 799; Pye et al., *Theor. Chem. Acc.* 1999, 101, 396). A dielectric constant of 8.9 and a solvent radius of 2.94 Å were used to represent CH$_2$Cl$_2$ as the solvent. The following radii, in Å, were used for the atoms: H, 1.16; C, 2.00; 0, 1.50; and Zr, 2.40. All the reported energies included solvent effects.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A highly isotactic polymer of Formula (I):

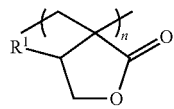

(I)

wherein
n is about 10 to about 45,000;
$R^1$ is $(C_1\text{-}C_6)$alkyl, phenyl, or benzyl; and
each of the carbons having substituent $R^1$ has an (R) stereochemical configuration, or each of the carbons having substituent $R^1$ has an (S) stereochemical configuration; wherein the polymer of Formula (I) comprises at least 90% isotactic triads with respect to the quaternary carbons of the polymer chain.

2. The polymer of claim 1 wherein the polymer comprises at least 99% isotactic triads with respect to the quaternary carbons of the polymer chain.

3. The polymer of claim 2 wherein the polymer comprises at least 99% isotactic pentads with respect to the quaternary carbons of the polymer chain.

4. The polymer of claim 1 wherein the polymer is insoluble in water, methanol, toluene, methylene chloride, 1,2-dichlorobenzene, acetonitrile, THF, DMSO, and DMF at room temperature.

5. The polymer of claim 1 wherein the polymer is insoluble in 1,2-dichlorobenzene at 180° C., THF at 60° C., DMSO at 100° C., and DMF at 100° C.

6. The polymer of claim 1 wherein the polymer has a glass transition temperature ($T_g$) of at least about 250° C.

7. The polymer of claim 1 wherein the polymer has a glass transition temperature ($T_g$) of at least about 280° C.

8. A composition comprising highly isotactic polymers of claim 1, wherein the composition comprises a first set of polymers wherein each of the carbons having substituent $R^1$ have an (R) stereochemical configuration and a second set of polymers wherein each of the carbons having substituent $R^1$ have an (S) stereochemical configuration.

9. The composition of claim 8 wherein the polymers comprise at least 99% isotactic pentads with respect to the quaternary carbons of the polymer chains.

10. A method for preparing a polymer of Formula (II):

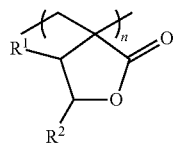

(II)

wherein
n is about 10 to about 45,000; $R^1$ is H, $(C_1\text{-}C_6)$alkyl, phenyl, or benzyl; $R^2$ is H, $(C_1\text{-}C_6)$alkyl, phenyl, or benzyl; and one or both of $R^1$ and $R^2$ is H;
the method comprising polymerizing a monomer of Formula (III):

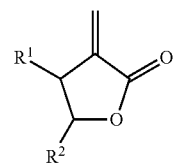

(III)

wherein $R^1$ is H, $(C_1\text{-}C_6)$alkyl, phenyl, or benzyl; $R^2$ is H, $(C_1\text{-}C_6)$alkyl, phenyl, or benzyl; and one or both of $R^1$ and $R^2$ is H;
in the presence of an effective amount of a catalyst, wherein the catalyst is the $C_2$-symmetric zirconocenium catalyst (1) or (2):

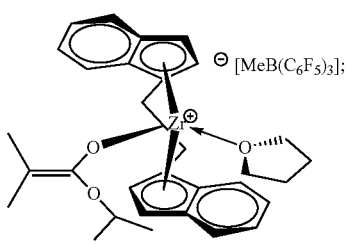

(1)

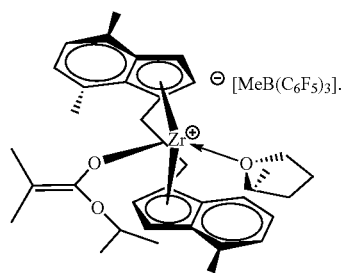

(2)

wherein the polymer of Formula (II) is formed by coordination polymerization with the catalyst and the glass transition temperature ($T_g$) of the product polymer is greater than about 190° C.

11. The method of claim 10 wherein the monomer of Formula (III) is β-methyl-α-methylene-γ-butyrolactone ($_\beta$MMBL), and the polymer of Formula (II) is highly isotactic at the main chain quaternary carbons, comprising at least 90% isotactic triads.

12. The method of claim 11 wherein the $C_2$-symmetric zirconocenium catalyst is (1):

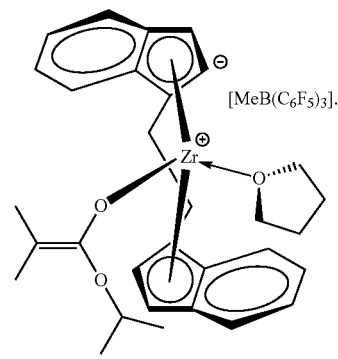

(1)

13. The method of claim 12 wherein the polymer of Formula (II) comprises at least 99% isotactic pentads.

14. The method of claim 13 wherein the polymer of Formula (II) is insoluble in water, methanol, toluene, methylene chloride, 1,2-dichlorobenzene, acetonitrile, THF, DMSO, and DMF at room temperature, and insoluble in 1,2-dichlorobenzene at 180° C., THF at 60° C., DMSO at 100° C., and DMF at 100° C.

15. The method of claim 10 wherein the monomer of Formula (III) is α-methylene-γ-butyrolactone (MBL), γ-methyl-α-methylene-γ-butyrolactone ($_\gamma$MMBL), or β-methyl-α-methylene-γ-butyrolactone ($_\beta$MMBL).

16. The method of claim 10 wherein the polymer product has a molecular weight polymer of at least 10 kDa.

17. The method of claim 13 wherein the polymer of Formula (II) has a glass transition temperature ($T_g$) of greater than about 290° C.

18. The polymer of claim 1 wherein $R^1$ is methyl.

19. The polymer of claim 3 wherein $R^1$ is methyl.

20. The polymer of claim 7 wherein $R^1$ is methyl.

21. The method of claim 13 wherein the monomer of Formula (III) is β-methyl-α-methylene-γ-butyrolactone ($_\beta$MMBL).

\* \* \* \* \*